US012712738B2

(12) United States Patent
Zamani et al.

(10) Patent No.: US 12,712,738 B2
(45) Date of Patent: Aug. 18, 2026

(54) NETWORK FOR IMPROVED VERIFICATION SPEED WITH TAMPER RESISTANT DATA

(71) Applicants: Visa International Service Association, San Francisco, CA (US); Yale University, New Haven, CT (US)

(72) Inventors: Mahdi Zamani, Palo Alto, CA (US); Mahnush Movahedi, New Haven, CT (US); Mariana Raykova, New Haven, CT (US)

(73) Assignees: Visa International Service Association, San Francisco, CA (US); Yale University, New Haven, CT (US)

( * ) Notice: Subject to any disclaimer, the term of this patent is extended or adjusted under 35 U.S.C. 154(b) by 18 days.

(21) Appl. No.: 18/176,989

(22) Filed: Mar. 1, 2023

(65) Prior Publication Data

US 2023/0239157 A1 Jul. 27, 2023

Related U.S. Application Data

(62) Division of application No. 16/615,341, filed as application No. PCT/US2018/033958 on May 22, 2018, now Pat. No. 11,626,993.

(Continued)

(51) Int. Cl.

| | |
|---|---|
| ***H04L 29/06*** | (2006.01) |
| ***H04L 9/32*** | (2006.01) |

(Continued)

(52) U.S. Cl.

CPC .......... *H04L 9/3247* (2013.01); *H04L 9/3239* (2013.01); *H04L 9/3297* (2013.01);

(Continued)

(58) Field of Classification Search

None

See application file for complete search history.

(56) References Cited

U.S. PATENT DOCUMENTS 12,169,709 B2 * 12/2024 Suto ........................ G06F 8/658
12,381,886 B1 * 8/2025 Brandwine ............ H04L 63/12

(Continued)

FOREIGN PATENT DOCUMENTS

CN 101543107 A 9/2009
CN 105591753 A 5/2016

(Continued)

OTHER PUBLICATIONS

Loi Luu, SCP: A Computationally-Scalable Byzantine Consensus Protocol For Blockchains, 12/24/20215 (Year: 2015).*

(Continued)

*Primary Examiner* — Eleni A Shiferaw
*Assistant Examiner* — Hassan A Hussein
(74) *Attorney, Agent, or Firm* — Kilpatrick Townsend & Stockton LLP

(57) ABSTRACT

A method is disclosed. The method includes: a) receiving node identifiers from nodes of a plurality of nodes in a computer network; b) determining a plurality of node committees in a sampler graph comprising a plurality of nodes, wherein the node is present in a node committee in the plurality of node committees; c) and i) generating a random string; ii) performing a proof of work process using the random string and a hash function; iii) if the proof of work process yields a solution that is acceptable, then broadcasting the solution to all other nodes in the plurality of nodes, wherein the other nodes verify the solution; and iv) if the other nodes verify the solution, the node is elected to a subcommittee for the node committee, wherein the subcom- (Continued)

mittee updates the sampler graph; and d) repeating steps b) and c) until a leader committee is determined.

14 Claims, 26 Drawing Sheets

Related U.S. Application Data

(60) Provisional application No. 62/668,122, filed on May 7, 2018, provisional application No. 62/509,655, filed on May 22, 2017.

(51) Int. Cl.
*H04L 12/18* (2006.01)
*G06Q 20/06* (2012.01)
*G06Q 20/22* (2012.01)
*H04L 9/00* (2022.01)
*H04L 9/40* (2022.01)

(52) U.S. Cl.
CPC ..... *H04L 12/1886* (2013.01); *G06Q 20/0655* (2013.01); *G06Q 20/223* (2013.01); *G06Q 2220/00* (2013.01); *H04L 9/50* (2022.05); *H04L 63/1441* (2013.01); *H04L 2209/56* (2013.01)

(56) References Cited

U.S. PATENT DOCUMENTS

2016/0034547 A1* 2/2016 Lerios ............... G06F 16/24537 707/602
2016/0300234 A1* 10/2016 Moss-Pultz ........... H04L 9/3247
2016/0330034 A1* 11/2016 Back .................... G06Q 20/065
2017/0012780 A1* 1/2017 Kaliski, Jr. ........... H04L 9/3247
2017/0034197 A1* 2/2017 Daniel ................. G06Q 20/065
2017/0103468 A1* 4/2017 Orsini .................. H04L 9/3239
2017/0116693 A1* 4/2017 Rae ...................... G06Q 50/184
2017/0132621 A1 5/2017 Miller et al.
2017/0134937 A1* 5/2017 Miller .................. H04L 9/3236
2017/0222875 A1* 8/2017 Neria .................. H04L 67/1048
2017/0228822 A1* 8/2017 Creighton, IV ....... G06Q 40/04
2017/0302663 A1* 10/2017 Nainar ................. H04L 63/123
2017/0331746 A1* 11/2017 Qiang ..................... H04L 47/15
2017/0364450 A1* 12/2017 Struttmann ........... H04L 9/3297
2017/0364698 A1* 12/2017 Goldfarb ............... H04L 9/3239
2017/0364699 A1* 12/2017 Goldfarb ............. G06F 21/6218
2017/0364700 A1* 12/2017 Goldfarb ............... H04L 9/3247
2017/0364701 A1* 12/2017 Struttmann ......... G06F 21/6218
2017/0366353 A1* 12/2017 Struttmann ......... G06F 21/6218
2018/0025166 A1* 1/2018 Daniel .................. G06F 9/5011 713/189
2018/0097638 A1* 4/2018 Haldenby ......... H04W 12/0433
2018/0101842 A1* 4/2018 Ventura ................. G06F 16/235
2018/0139278 A1* 5/2018 Bathen .................. H04L 9/3247
2018/0145836 A1* 5/2018 Saur ................... G06Q 20/3829
2018/0158022 A1* 6/2018 Fu .................... G06Q 10/08355
2018/0183587 A1* 6/2018 Won ...................... H04L 63/166
2018/0183601 A1* 6/2018 Campagna ............ G06F 21/602
2018/0183796 A1* 6/2018 Smith ..................... H04L 67/10
2018/0205552 A1* 7/2018 Struttmann ........... H04L 9/3242
2018/0253702 A1* 9/2018 Dowding .............. H04L 63/123
2018/0267539 A1* 9/2018 Shih ..................... G05D 1/0295
2018/0276626 A1* 9/2018 Laiben ............... G06Q 20/3829
2018/0307857 A1* 10/2018 Beecham ............ G06F 16/9024
2019/0139047 A1* 5/2019 Rønnow ........... G06Q 20/1235
2019/0164153 A1* 5/2019 Agrawal .............. G06Q 20/065
2019/0238318 A1* 8/2019 Williams .............. H04L 9/0643
2019/0288850 A1* 9/2019 Beecham ............ G06F 21/6209
2019/0318117 A1* 10/2019 Beecham ............ G06F 21/6218
2019/0340379 A1* 11/2019 Beecham .............. H04L 9/3239
2019/0384748 A1* 12/2019 Roennow ............ G06F 16/1837
2020/0007558 A1* 1/2020 Inokuchi ................. H04L 63/20
2020/0021446 A1* 1/2020 Roennow .............. H04L 9/0819
2020/0026699 A1* 1/2020 Zhang ................... H04L 9/0643
2020/0059369 A1* 2/2020 Li ......................... H04L 9/0643
2020/0137082 A1* 4/2020 Jimenez-Delgado ........................ H04L 9/0643
2020/0252221 A1* 8/2020 Zamani ................. H04L 63/123
2021/0209077 A1* 7/2021 Snellman ................ G06F 9/541
2021/0406872 A1* 12/2021 Thai .......................... H04L 9/50

FOREIGN PATENT DOCUMENTS

| | | |
|---|---|---|
| CN | 106060036 A | 10/2016 |
| CN | 106529951 A | 3/2017 |
| CN | 106530088 A | 3/2017 |
| KR | 101727525 B1 | 4/2017 |

OTHER PUBLICATIONS

Loi "SCP: A Computationally-Scalable Byzantine Consensus Protocol For Blockchains" (Year: 2015).*

U.S. Appl. No. 16/615,341 , "Advisory Action", Oct. 28, 2022, 5 pages.

U.S. Appl. No. 16/615,341 , "Final Office Action", Aug. 12, 2022, 31 pages.

U.S. Appl. No. 16/615,341 , "Non-Final Office Action", Apr. 18, 2022, 25 pages.

U.S. Appl. No. 16/615,341 , "Notice of Allowance", Dec. 1, 2022, 17 pages.

Bano et al., "SoK: Consensus in the Age of Blockchains", Available Online at: https://pdfs.semanticscholar.org/919e/32847097416aada92dff7c8274cd9ca55582.pdf XP55513744, Nov. 14, 2017, pp. 1-17.

CN201880041576.9 , "Notice of Decision to Grant", Sep. 5, 2022, 6 pages.

CN201880041576.9 , "Office Action", Mar. 3, 2022, 12 pages.

EP18805749.1 , "Extended European Search Report", Feb. 19, 2020, 9 pages.

EP18805749.1 , "Office Action", Mar. 11, 2021, 9 pages.

Kiayias et al., "Ouroboros: A Provably Secure Proof-of-Stake Blockchain Protocol", IACR, International Association for Cryptologic Research, vol. 061833, Apr. 7, 2017, pp. 1-47.

Luu et al., "SCP: A Computationally-Scalable Byzantine Consensus Protocol for Blockchains", IACR, International Association for Cryptologic Research, vol. 030215, Dec. 14, 2015, pp. 1-16.

PCT/US2018/033958 , "International Preliminary Report on Patentability", Dec. 5, 2019, 14 pages.

PCT/US2018/033958 , "International Search Report and Written Opinion", Sep. 12, 2018, 17 pages.

SG11201910787V , "Notice of Decision to Grant", Mar. 9, 2022, 7 pages.

SG11201910787V , "Written Opinion", May 12, 2021, 8 pages.

Zamani et al., "RapidChain: A Fast Blockchain Protocol via Full Sharding", ACM Conference on Computer and Communications Security (CCS 2018), May 16, 2018, pp. 1-30.

Zamani et al., "RapidChain: Scaling Blockchain via Full Sharding", Session 5C: Blockchain 2, CCS '18: Proceedings of the 2018 ACM SIGSAC Conference on Computer and Communications Security, Oct. 15-19, 2018, pp. 931-948.

EP18805749.1 , "Office Action", Nov. 13, 2023, 4 pages.

CN202211216321.6 , "Office Action", Nov. 13, 2024, 12 pages.

* cited by examiner

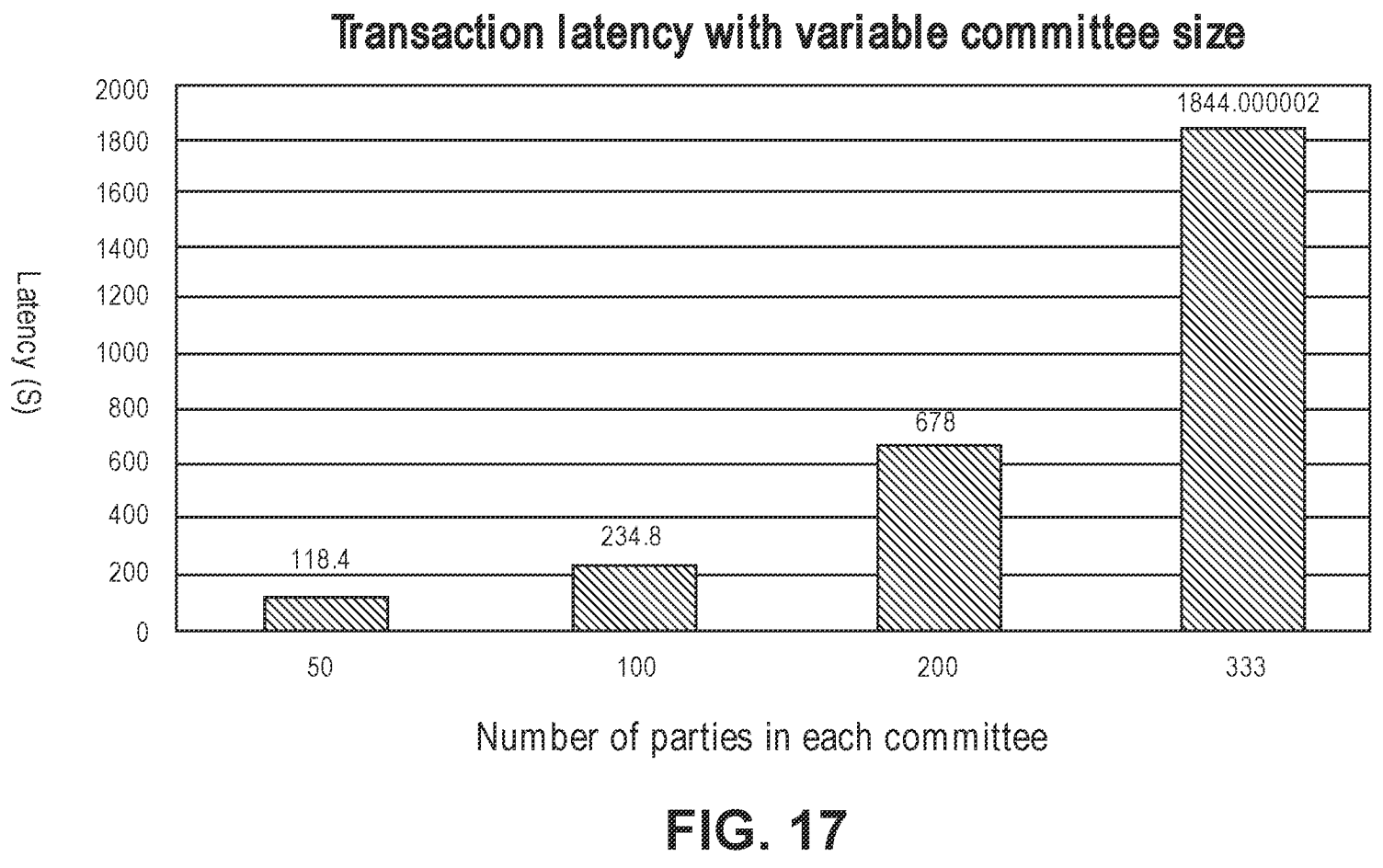

Transaction latency with variable committee size

Latency (S)

2000
1800
1600
1400
1200
1000
800
600
400
200
0

118.4
234.8
678
1844.000002

50
100
200
333

Number of parties in each committee

FIG. 17

NETWORK FOR IMPROVED VERIFICATION SPEED WITH TAMPER RESISTANT DATA

CROSS-REFERENCES TO RELATED APPLICATIONS

This application is a divisional application of U.S. patent application Ser. No. 16/615,341, filed on Nov. 20, 2019, which is a National Stage of International Application No. PCT/US2018/033958, International Filing Date May 22, 2018, which claims the benefit of U.S. Provisional Application 62/509,655, filed on May 22, 2017 and 62/668,122, filed May 7, 2018, the disclosures of all applications being incorporated herein by reference.

BACKGROUND

The global financial system is highly centralized making it resistant to change, vulnerable to failures and attacks, and inaccessible to billions of people in need of basic financial tools. Cryptocurrencies such as Bitcoin [Satoshi Nakamoto. Bitcoin: A peer-to-peer electronic cash system, 2008. Available at https://bitcoin.org/bitcoin.pdf.]aim to avoid these limitations by replacing the central system with a large decentralized network that allows "open membership" of participants. In this model, the participants do not require established identities to join the system and may join or leave the protocol at any time.

Decentralization poses new challenges of ensuring a consistent view among a group of mutually-untrusted (i.e., Byzantine) participants. A permissionless mode of operation which allows open membership and entails constant churn (i.e., join and leave) of its participants further complicates this task. Additionally, any agile financial system, including a distributed one, should be able to adequately serve realistic market loads. This implies that it should scale easily to a large number of participants, and it should handle a high throughput of transactions with relatively low delays in making outputs available. Achieving these properties together should also not use significant resources from each of the participants since it then runs contrary to the idea of constructing a tool easily accessible to anyone.

Existing solutions currently either fail to solve the above challenges or make security and/or performance trade-offs that, unfortunately, make them no longer truly-decentralized solutions. In particular, traditional Byzantine consensus mechanisms [Leslie Lamport. The part-time parliament. ACM Trans. Comput. Syst., 16(2):133-169, May 1998., and Miguel Castro and Barbara Liskov. Practical byzantine fault tolerance. In Proceedings of the Third Symposium on Operating Systems Design and Implementation, OSDI '99, pages 173-186, 1999., and Christian Cachin, Klaus Kursawe, and Victor Shoup. Random oracles in Constantinople: Practical asynchronous Byzantine agreement using cryptography. In Proceedings of the 19$^{th}$ ACM Symposium on Principles of Distributed Computing (PODC), pages 123-132, 2000.] can only work in a closed membership setting, where the set of participants is fixed and their identities are known to everyone via a trusted third party. If used in an open setting, these protocols can be easily compromised using Sybil attacks [John Douceur. The Sybil attack. In Proceedings of the Second International Peer-to-Peer Symposium (IPTPS), 2002.], where the adversary repeatedly rejoins malicious parties with fresh identities to gain significant influence on the protocol outcome. Moreover, most traditional schemes assume a static adversary who can select the set of corrupt parties only at the start of the protocol. Existing protocols that are secure against an adaptive adversary [Gabriel Bracha. An asynchronous [(n−1)/3]-resilient consensus protocol. In Proceedings of the Third Annual ACM Symposium on Principles of Distributed Computing, PODC '84, pages 154-162, New York, NY, USA, 1984. ACM. and Ran Canetti and Tal Rabin. Fast asynchronous byzantine agreement with optimal resilience. In Proceedings of the Twenty-fifth Annual ACM Symposium on Theory of Computing, STOC '93, pages 42-51, New York, NY, USA, 1993. ACM. and Valerie King and Jared Saia. Breaking the o(n^2) bit barrier: Scalable byzantine agreement with an adaptive adversary. In Proceedings of the 29th ACM SIGACT-SIGOPS Symposium on Principles of Distributed Computing, PODC '10, pages 420-429, New York, NY, USA, 2010. ACM.] either scale poorly with the number of participants or are inefficient.

Most cryptocurrencies such as Bitcoin and Ethereum [Vitalik Buterin. Ethereum's white paper. https://github.com/ethereum/wiki/wiki/White-Paper, 2014.]maintain a distributed transaction ledger called a blockchain over a large peer-to-peer (P2P) network, where every node maintains an updated, full copy of the entire ledger via a Byzantine consensus protocol, dubbed as Nakamoto consensus. Unlike traditional consensus mechanisms, the Nakamoto consensus allows new participants to join the protocol using a proof-of-work (PoW) process [Cynthia Dwork and Moni Naor. Pricing via processing or combatting junk mail. In Advances in Cryptology—CRYPTO' 92: 12th Annual International Cryptology Conference Santa Barbara, California, USA August 16{20, 1992 Proceedings, pages 139-147, Berlin, Heidelberg, 1993. Springer Berlin Heidelberg.], where a node demonstrates that it has done a certain amount of work by presenting a solution to a computational puzzle. The use of PoW not only allows the consensus protocol to impede Sybil attacks by limiting the rate of malicious participants joining the system, but also provides a lottery mechanism through which a random leader is elected in every round to initiate the consensus process.

Unfortunately, it is now well-known that Bitcoin's PoW-based consensus comes with serious drawbacks such as very low transaction throughput, high latency, poor energy efficiency [Eric Limer. The world's most powerful computer network is being wasted on Bitcoin. May 2013. Available at http://gizmodo.com/the-worlds-most-powerful-computer-network-is-being-was-504503726.], and mining-pool centralization [Egor Homakov. Stop. calling. Bitcoin. decentralized. https://medium.com/@homakov/stop-calling-bitcoin-decentralized-cb703d69dc27, 2017., and Blockchain charts: Hashrate distribution, March 2017. Available at https://blockchain.info/pools.]. Moreover, the protocol cannot scale out its transaction processing capacity with the number of participants joining the protocol [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.]. Another major scalability issue of Bitcoin is that every party needs to initially download the entire blockchain from the network to independently verify all transactions. The size of the blockchain is currently about 165 GB and has nearly doubled in the past year [Blockchain charts: Blockchain size, March 2017. Available at https://blockchain.info/charts/blocks-size.]. One can expect a larger growth in the size of blockchains that are updated via higher-throughput consensus protocols than that of Bitcoin.

Recently, several protocols have been proposed to mitigate the performance and scalability issues of Bitcoin's blockchain [Christian Decker, Jochen Seidel, and Roger Wattenhofer. Bitcoin meets strong consistency. In Proceedings of the 17th International Conference on Distributed Computing and Networking, ICDCN '16, pages 13:1-13:10, New York, NY, USA, 2016. ACM., and Ittay Eyal, Adem Efe Gencer, Emin Gun Sirer, and Robbert Van Renesse. Bitcoin-NG: A scalable blockchain protocol. In Proceedings of the 13th Usenix Conference on Networked Systems Design and Implementation, NSDI '16, pages 45-59, Berkeley, CA, USA, 2016. USENIX Association., and Eleftherios Kokoris-Kogias, Philipp Jovanovic, Nicolas Gailly, Ismail Khoffi, Linus Gasser, and Bryan Ford. Enhancing bitcoin security and performance with strong consistency via collective signing. In 25th USENIX Security Symposium, USENIX Security '16, pages 279-296, 2016., and Andrew Miller, Yu Xia, Kyle Croman, Elaine Shi, and Dawn Song. The honey badger of bft protocols. In Proceedings of the 2016 ACM SIGSAC Conference on Computer and Communications Security, CCS '16, pages 31-42, New York, NY, USA, 2016. ACM., and Rafael Pass and Elaine Shi. Hybrid consensus: Efficient consensus in the permissionless model. Cryptology ePrint Archive, Report 2016/917, 2016. http://eprint.iacr.org/2016/917., and Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Yossi Gilad, Rotem Hemo, Silvio Micali, Georgios Vlachos, and Nickolai Zeldovich. Algorand: Scaling byzantine agreements for cryptocurrencies. In Proceedings of the 26th Symposium on Operating Systems Principles, SOSP '17, pages 51-68, New York, NY, USA, 2017. ACM., and Ittai Abraham, Dahlia Malkhi, Kartik Nayak, Ling Ren, and Alexander Spiegelman. Solida: A blockchain protocol based on reconfigurable byzantine consensus. In Proceedings of the 21st International Conference on Principles of Distributed Systems, OPODIS '17, Lisboa, Portugal, 2017., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.] using hybrid architectures that combine the open-membership nature of Bitcoin with traditional Byzantine fault tolerance [M. Pease, R. Shostak, and L. Lamport. Reaching agreements in the presence of faults. Journal of the ACM, 27(2):228-234, April 1980, and M. Castro and B. Liskov. Practical Byzantine fault tolerance and proactive recovery. ACM Transactions on Computer Systems (TOCS), 20(4):398-461, 2002.]. While most of these protocols can reportedly improve the throughput and latency of Bitcoin, all of them still require the often-overlooked assumption of a trusted setup to generate an unpredictable initial common randomness in the form of a common genesis block to bootstrap the blockchain. Similar to Bitcoin, these protocols essentially describe how one can ensure agreement on new blocks given an initial agreement on some genesis block. Such an assumption plays a crucial role in achieving consistency among nodes in these protocols, and if compromised, can easily affect the security of the entire consensus protocol, casting a major contradiction to the decentralized nature of cryptocurrencies.

In addition to being partially decentralized, most of these solutions have either large per-node storage requirements [Christian Decker, Jochen Seidel, and Roger Wattenhofer. Bitcoin meets strong consistency. In Proceedings of the 17th International Conference on Distributed Computing and Networking, ICDCN '16, pages 13:1-13:10, New York, NY, USA, 2016. ACM., and Ittay Eyal, Adem Efe Gencer, Emin Gun Sirer, and Robbert Van Renesse. Bitcoin-NG: A scalable blockchain protocol. In Proceedings of the 13th Usenix Conference on Networked Systems Design and Implementation, NSDI'16, pages 45-59, Berkeley, CA, USA, 2016. USENIX Association., and Eleftherios Kokoris-Kogias, Philipp Jovanovic, Nicolas Gailly, Ismail Khoffi, Linus Gasser, and Bryan Ford. Enhancing bitcoin security and performance with strong consistency via collective signing. In 25th USENIX Security Symposium, USENIX Security '16, pages 279-296, 2016., and Andrew Miller, Yu Xia, Kyle Croman, Elaine Shi, and Dawn Song. The honey badger of bft protocols. In Proceedings of the 2016 ACM SIGSAC Conference on Computer and Communications Security, CCS '16, pages 31-42, New York, NY, USA, 2016. ACM., and Rafael Pass and Elaine Shi. Hybrid consensus: Efficient consensus in the permissionless model. Cryptology ePrint Archive, Report 2016/917, 2016. http://eprint.iacr.org/2016/917., and Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Ittai Abraham, Dahlia Malkhi, Kartik Nayak, Ling Ren, and Alexander Spiegelman. Solida: A blockchain protocol based on reconfigurable byzantine consensus. In Proceedings of the 21st International Conference on Principles of Distributed Systems, OPODIS '17, Lisboa, Portugal, 2017.], incomplete specifications [Christian Decker, Jochen Seidel, and Roger Wattenhofer. Bitcoin meets strong consistency. In Proceedings of the 17th International Conference on Distributed Computing and Networking, ICDCN '16, pages 13:1-13:10, New York, NY, USA, 2016. ACM., and Eleftherios Kokoris-Kogias, Philipp Jovanovic, Nicolas Gailly, Ismail Khoffi, Linus Gasser, and Bryan Ford. Enhancing bitcoin security and performance with strong consistency via collective signing. In 25th USENIX Security Symposium, USENIX Security '16, pages 279-296, 2016.], or security issues [Eleftherios Kokoris-Kogias, Philipp Jovanovic, Nicolas Gailly, Ismail Khoffi, Linus Gasser, and Bryan Ford. Enhancing bitcoin security and performance with strong consistency via collective signing. In 25th USENIX Security Symposium, USENIX Security '16, pages 279-296, 2016., and Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.]. Furthermore, all previous protocols require every participant in the consensus protocol to broadcast a message to the entire network to either submit their consensus votes [Ittay Eyal, Adem Efe Gencer, Emin Gun Sirer, and Robbert Van Renesse. Bitcoin-NG: A scalable blockchain protocol. In Proceedings of the 13th Usenix Conference on Networked Systems Design and Implementation, NSDI'16, pages 45-59, Berkeley, CA, USA, 2016. USENIX Association., and Andrew Miller, Yu Xia, Kyle Croman, Elaine Shi, and Dawn Song. The honey badger of bft protocols. In Proceedings of the 2016 ACM SIGSAC Conference on Computer and Communications Security, CCS '16, pages 31-42, New York, NY, USA, 2016. ACM.], verify transactions [Ittay Eyal, Adem Efe Gencer, Emin Gun Sirer, and Robbert Van Renesse. Bitcoin-NG: A scalable blockchain protocol. In Proceedings of the 13th Usenix Conference on Networked Systems Design and Implementation, NSDI'16, pages 45-59, Berkeley, CA, USA, 2016. USENIX Association., and Andrew Miller, Yu Xia, Kyle Croman, Elaine Shi, and Dawn Song. The honey badger of bft protocols. In Proceedings of the 2016 ACM SIGSAC Conference on Computer and Communications Security, CCS '16, pages 31-42, New York, NY, USA, 2016. ACM.], and/or update every node's local blockchain replica [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Rafael Pass and Elaine Shi. Hybrid consensus: Efficient consensus in the permissionless model. Cryptology ePrint Archive, Report 2016/917, 2016. http://eprint.iacr.org/2016/917., and Yossi Gilad, Rotem Hemo, Silvio Micali, Georgios Vlachos, and Nickolai Zeldovich. Algorand: Scaling byzantine agreements for cryptocurrencies. In Proceedings of the 26th Symposium on Operating Systems Principles, SOSP '17, pages 51-68, New York, NY, USA, 2017. ACM., and Ittai Abraham, Dahlia Malkhi, Kartik Nayak, Ling Ren, and Alexander Spiegelman. Solida: A blockchain protocol based on reconfigurable byzantine consensus. In Proceedings of the 21st International Conference on Principles of Distributed Systems, OPODIS '17, Lisboa, Portugal, 2017.]. While the large overhead of such a broadcast for every participant is usually reduced from a linear number of messages (with respect to the number of participants) to nearly a constant using a peer-to-peer gossiping protocol [R. Karp, C. Schindelhauer, S. Shenker, and B. Vocking. Randomized rumor spreading. In Proceedings of the 41st Annual Symposium on Foundations of Computer Science, FOCS '00, pages 565-, Washington, DC, USA, 2000. IEEE Computer Society.], the relatively high latency of such a "gossip-to-all" invocation (e.g., 12.6 seconds per block on average [C. Decker and R. Wattenhofer. Information propagation in the Bitcoin network. In P2P, pages 1-10. IEEE, 2013.]) increases the overall latency of the consensus protocol significantly (the gossip-to-all latency roughly quadruples the consensus time in [Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.]). Moreover, due to the very high transaction throughput of most scalable blockchain protocols (e.g., about 4,000 TPS in [Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.]), the bandwidth usage of each node is relatively large (e.g., more than 6 MB/s), if transactions are gossiped to the entire network.

Embodiments of the invention address these and other problems individually and collectively.

BRIEF SUMMARY

Embodiments can enable an election of a leader committee in a computer network. The leader committee may be capable of partitioning a plurality of nodes in the computer network into sharding committees. Embodiments may allow new nodes to join the computer network. The sharding committees can receive interaction data which can be verified and stored in a shard of a blockchain.

One embodiment of the invention is directed to a method performed by a node in a computer network including a plurality of nodes, each node having a node identifier, the method comprising: a) receiving, by the node, node identifiers from other nodes of the plurality of nodes in the computer network; b) determining, by the node, a plurality of node committees in a sampler graph comprising a plurality of nodes, wherein the node is present in a node committee in the plurality of node committees; c) the node, further i) generating a random string; ii) performing a proof of work process using the random string and a hash function; iii) if the proof of work process yields a solution that is acceptable, then broadcasting the solution to all other nodes in the plurality of nodes, wherein the other nodes verify the solution; iv) if the other nodes verify the solution, the node is elected to a subcommittee for the node committee, wherein the subcommittee updates the sampler graph; and d) repeating steps b) and c) until a leader committee is determined.

Another embodiment of the invention is directed to a node comprising: a processor; a memory device; and a computer-readable medium coupled to the processor, the computer-readable medium comprising code executable by the processor for implementing a method performed by a node in a computer network including a plurality of nodes, each node having a node identifier, the method comprising: a) receiving node identifiers from other nodes of the plurality of nodes in the computer network; b) determining a plurality of node committees in a sampler graph comprising a plurality of nodes, wherein the node is present in a node committee in the plurality of node committees; c) the node, further i) generating a random string; ii) performing a proof of work process using the random string and a hash function; iii) if the proof of work process yields a solution that is acceptable, then broadcasting the solution to all other nodes in the plurality of nodes, wherein the other nodes verify the solution; iv) if the other nodes verify the solution, the node is elected to a subcommittee for the node committee, wherein the subcommittee updates the sampler graph; and d) repeating steps b) and c) until a leader committee is determined.

Another embodiment of the invention is directed to a method comprising: receiving, by a first node in a first committee in a computer network, a request including a node identifier to join a committee by a second node; providing, by the first node of the first committee to the second node, a proof of work process to the second node; receiving, by first node of the first committee, a solution to the proof of work process from the second node, wherein a plurality of nodes in the first committee verifies the solution; generating, by the first node of the first committee a random string, which is used by the first node to determine a second committee for the second node; introducing, by the first node to second committee, the second node, wherein the second committee displaces a node to allow the second node to join the second committee; and communicating, by the first node, information regarding the second node being in the second committee to other nodes in the computer network.

Another embodiment of the invention is directed to a node comprising: a processor; a memory device; and a computer-readable medium coupled to the processor, the computer-readable medium comprising code executable by the processor for implementing a method comprising: receiving, by a first node in a first committee in a computer network, a request including a node identifier to join a committee by a second node; providing, by the first node of the first committee to the second node, a proof of work process to the second node; receiving, by first node of the first committee, a solution to the proof of work process from the second node, wherein a plurality of nodes in the first committee verifies the solution; generating, by the first node of the first committee a random string, which is used by the first node to determine a second committee for the second node; introducing, by the first node to second committee, the second node, wherein the second committee displaces a node to allow the second node to join the second committee; and communicating, by the first node, information regarding the second node being in the second committee to other nodes in the computer network.

Another embodiment of the invention is directed to a method comprising: receiving, by a first node in a committee, an interaction request, the interaction request including interaction data from a client computer; incorporating, by the first node, the interaction data along with other interaction data associated with other client computers into a block comprising interaction data, wherein the block includes block parts; broadcasting, by the first node, the block to other nodes in the committee, wherein the other nodes in the committee verify the block; and incorporating the block into a blockchain managed by the committee.

Another embodiment of the invention is directed to a node comprising: a processor; a memory device; and a computer-readable medium coupled to the processor, the computer-readable medium comprising code executable by the processor for implementing a method comprising: receiving, by a first node in a committee, an interaction request, the interaction request including interaction data from a client computer; incorporating, by the first node, the interaction data along with other interaction data associated with other client computers into a block comprising interaction data, wherein the block includes block parts; broadcasting, by the first node, the block to other nodes in the committee, wherein the other nodes in the committee verify the block; and incorporating the block into a blockchain managed by the committee.

These and other embodiments of the invention are described in further detail below.

BRIEF DESCRIPTION OF THE DRAWINGS

FIG. 17 shows a plot illustrating transaction latency with variable committee size according to an embodiment of the invention.

DETAILED DESCRIPTION

Figure 1:
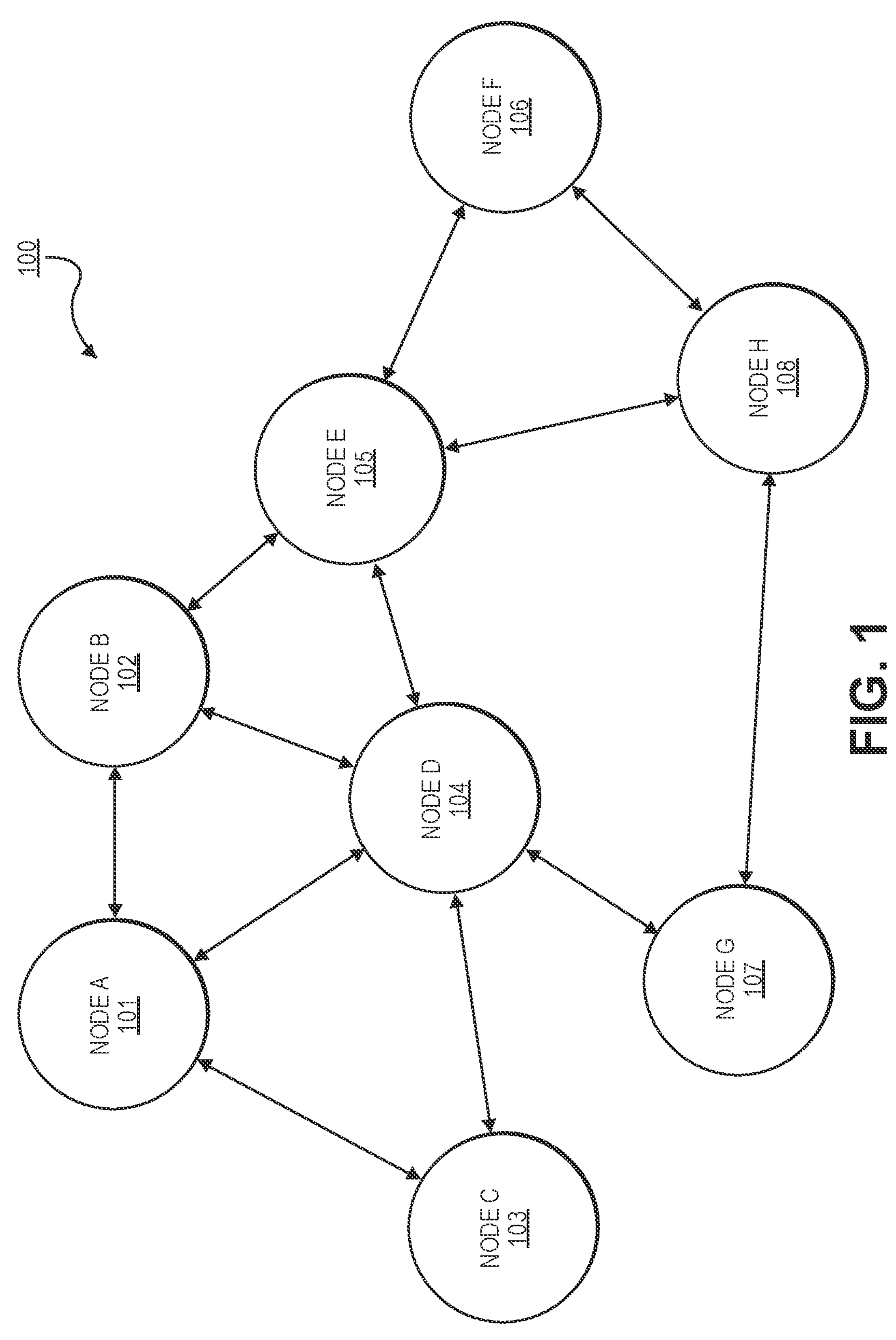
FIG. 1 shows a block diagram of a system illustrating a plurality of nodes in a computer network according to embodiments of the present invention.

Prior to discussing embodiments of the invention, some terms can be described in further detail.

A "digital asset" may refer to digital content associated with a value. In some cases, the digital asset may also indicate a transfer of the value. For example, a digital asset may include data that indicates a transfer of a currency value (e.g., fiat currency or crypto currency). In other embodiments, the digital asset may correspond to other non-currency values, such as access privileges data (e.g., a number of authorized usages or a time allotment for accessing information) and ownership data (e.g., digital right data). A digital asset may also include information about one or more digital asset attributes. For example, a digital asset may include information useful for transferring value from one entity or account to another. A digital asset may also include remittance information (e.g., information identifying a sending entity). In some embodiments, a digital asset may include one or more of a digital asset identifier, a value (e.g., an amount, an original currency type, a destination currency type, etc.), transfer fee information, a currency exchange rate, an invoice number, a purchase order number, a timestamp, a sending entity identifier (e.g., a sender enterprise ID), a sending entity account number, a sending entity name, sending entity contact information (e.g., an address, phone number, email address, etc.), sending institution information (e.g., a financial institution name, enterprise ID, and BIN), a recipient entity identifier (e.g., a recipient enterprise ID), a recipient entity account number, a recipient entity name, recipient entity contact information (e.g., an address, phone number, email address, etc.), and/or recipient institution information (e.g., a financial institution name, enterprise ID, and BIN). When a digital asset is received, the recipient may have sufficient information to proceed with a settlement transaction for the indicated value.

An "asset transfer network" may be a network for providing and/or receiving digital assets. An asset transfer network can comprise a plurality of nodes. In some embodiments, digital assets transmitted in an asset transfer network may be recorded in a ledger of transactions. An example of an asset transfer network can be a blockchain network, where a ledger of transactions can take the form of a blockchain. In some embodiments, an asset transfer network may be a computer network.

The term "node" may refer to a connection point. In some embodiments, a node may be a physical electronic device that is capable of creating, receiving, or transmitting data. In other embodiments, a node may be a software module on a computing device, the software module a connection point in a communication network. In some embodiments, a node may be a computing device within an asset transfer network. A node may be able to mint an asset, transfer an asset, receive an asset, validate an asset, maintain a ledger of transactions, and/or perform any other suitable functions. In some embodiments, a node may be associated with and/or operated by a financial institution computer (e.g., a bank), a payment processor computer, a third party computer, or any other suitable entity.

The term "ledger of transactions" may refer to a compilation of data from previous transactions. The ledger of transactions may be a database or other comparable file structure that may be configured to store data from all previous digital asset transfers, including the date and time of the transfer, the transfer amount, and identification information for the participants of the transfer (e.g., the sender and the receiver of the transfer amount). In some embodiments, the ledger of transactions may be in the form of an electronic ledger (e.g., blockchain) in which data already stored in the electronic ledger can be unalterable. A part (i.e., shard) of the ledger of transactions can be stored at a node.

A ledger of transactions may include transaction records that are digitally signed (e.g., with a private key) in order to protect the transaction entries in the ledger from being doctored with false transaction data. This can prevent double spending and make all transactions immutable and irreversible, and therefore make the ledger trustworthy.

As used herein, a "blockchain" may comprise a series of blocks. Each block in the blockchain may include an electronic record of one or more historical transactions, as well as metadata. In some embodiments, blocks in the blockchain can be linked by including a reference to the previous block (e.g., a hash output of a previous block). Each new block in the blockchain may be algorithmically determined based on new transactions and previous blocks in the blockchain. As a result, any tampering of data stored in these previous blocks can be detected. In some embodiments, the blockchain can be sharded into blockchain shards that are stored at committees. For example, a committee can store a shard of a blockchain, while a different committee can store a different shard of the blockchain.

A "committee" can be a group of nodes. In some embodiments, nodes in a committee can communicate with one another. A committee may be capable of communicating with other committees. In some embodiments, a committee may include a node that can be a committee leader.

A "key pair" may include a pair of linked encryption keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for authentication of messages signed using the corresponding private key. Public and private keys may be in any suitable format, including those based on RSA or elliptic curve cryptography (ECC). In some embodiments, a key pair may be generated using an asymmetric key pair algorithm. However, a key pair may also be generated using other means, as one of ordinary skill in the art would understand.

The term "digital signature" may refer to an electronic signature for a message. A digital signature may be a numeric value, an alphanumeric value, or any other type of data including a graphical representation. A digital signature may be a unique value generated from a message and a private key using an encrypting algorithm. In some embodiments, a validation algorithm using a public key may be used to validate the signature.

A "client computer" may generally refer to a computer that can submit interaction data to a committee. A client computer may comprise a computer (e.g., desktop computer), a mobile device (e.g., a smart phone, laptop, or tablet computer), or a wearable device (e.g., a smart watch or activity tracker). The client computer may include wireless communication capabilities (e.g., Wi-Fi, Bluetooth, or near-field communications). In some embodiments, a client computer may communicate with a node in a committee.

An "interaction" may include a communication, contact, or exchange between parties, devices, and/or entities. Example interactions include a transaction between two parties and a data exchange between two devices. An interaction can include the transfer of a digital asset.

"Interaction data" may be data associated with an interaction. For example, an interaction may be a transfer of a digital asset from one party to another party. The interaction data for example, may include a transaction amount and unspent transaction outputs (UTXOs). In some embodiments, interaction data can indicate different entities that are party to an interaction as well as value or information being exchanged. Interaction data can include a value, information associated with a sender (e.g., a token or account information, an alias, a device identifier, a contact address, etc.), information associated with a receiver (e.g., a token or account information, an alias, a device identifier, a contact address, etc.), one-time values (e.g., a random value, a nonce, a timestamp, a counter, etc.), and/or any other suitable information. An example of interaction data can be transaction data.

"Block parts" can be parts of a block of a blockchain. Block parts can include unspent transaction outputs (UTXOs). Other block parts can include a header, interaction data, block identifiers, and a Merkle tree. A block header can include a hash of the previous block, a timestamp, a difficulty target, a nonce, and/or a Merkle root.

A "sampler graph" may be a graph of data with nodes and edges, such as a random bipartite graph. The bipartite graph can include two sets L and R. The set L can include vertices that can represent nodes. The set R can include vertices that represent committees. Multiple sampler graphs that are chained together can be considered an election graph. In some embodiments, a sampler graph can include the nodes in one level of an election graph connected via edges to committees of a next level of the election graph.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

INTRODUCTION

FIG. 1 shows a block diagram of a system 100 comprising a number of components according to some embodiments of the invention. The system 100 comprises a plurality of nodes comprising node A 101, node B 102, node C 103, node D 104, node E 105, node F 106, node G 107, and node H 108. In FIG. 1, node A 101 can be in operative communication with node B 102, node C 103, and node D 104. It is understood that any suitable arrangement of nodes can be used. For example, node A 101 can be in operative communication with node H 108. In some embodiments, there may be any number of nodes in the plurality of nodes. In other embodiments, new nodes can join the computer network and nodes may leave the computer network. The nodes in system 100 can represent the computer network before the creation of node committees, described below.

Message between the nodes illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The messages may be transmitted and received via a communication network. The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2:
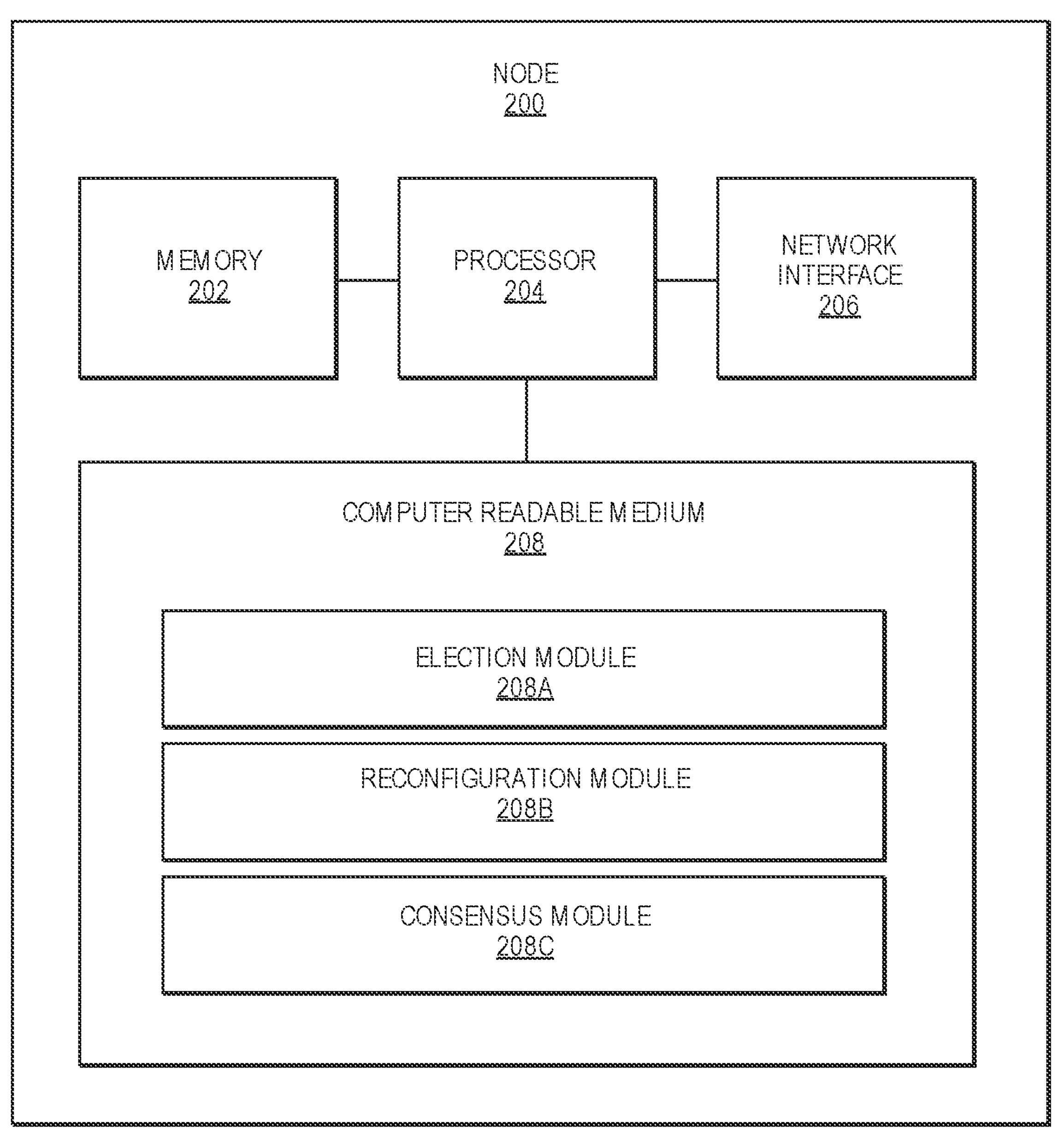
FIG. 2 shows a block diagram illustrating a node according to embodiments of the invention.

FIG. 2 shows a block diagram of a node according to some embodiments of the invention. The exemplary node 200 can comprise a processor 204. The processor 204 may be coupled to a memory 202, a network interface 206, and a computer readable medium 208 comprising an election module 208A, a reconfiguration module 208B, and a consensus module 208C.

The memory 202 may store a shard of a blockchain, interaction data, routing tables, node identifiers, and any other relevant data. The memory 202 may be in the form of a secure element, a hardware security module, or any other suitable form of data storage. A node identifier may be a public key associated with a node. For example, a first node may be associated with a first public key.

Interaction data may be data associated with an interaction. For example, an interaction may be a transfer of a digital asset from one party to another party. The interaction data for example, may include a transaction amount and unspent transaction outputs (UTXOs). In some embodiments, interaction data can indicate different entities that are party to an interaction as well as value or information being exchanged. Interaction data can include a value, information associated with a sender (e.g., a token or account information, an alias, a device identifier, a contact address, etc.), information associated with a receiver (e.g., a token or account information, an alias, a device identifier, a contact address, etc.), one-time values (e.g., a random value, a nonce, a timestamp, a counter, etc.), and/or any other suitable information. An example of interaction data can be transaction data.

The network interface 206 may include an interface that can allow the node 200 to communicate with external computers, such as client computers. The network interface 206 may enable the node 200 to communicate data to and from another device (e.g., other nodes). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™.

The computer readable medium 208 can comprise a number of software modules including the election module 208A, the reconfiguration module 208B, and the consensus module 208C. The election module 208A can comprise code that can cause the processor 204 to perform an election process in a setup phase as described below. The reconfiguration module 208B can comprise code that can cause the processor 204 to perform a reconfiguration process in an adjust phase as described below. The consensus module 208C can comprise code that can cause the processor 204 to perform a consensus process in a consensus phase as described below.

The computer readable medium 208 may comprise code, executable by the processor 204, to implement a method, performed by a node in a computer network including a plurality of nodes, each node having a node identifier, the method comprising: a) receiving, by the node, node identifiers from other nodes of the plurality of nodes in the computer network; b) determining, by the node, a plurality of node committees in a sampler graph comprising a plurality of nodes, wherein the node is present in a node committee in the plurality of node committees; c) the node, further i) generating a random string; ii) performing a proof of work process using the random string and a hash function; iii) if the proof of work process yields a solution that is acceptable, then broadcasting the solution to all other nodes in the plurality of nodes, wherein the other nodes verify the solution; iv) if the other nodes verify the solution, the node is elected to a subcommittee for the node committee, wherein the subcommittee updates the sampler graph; and d) repeating steps b) and c) until a leader committee is determined.

The computer readable medium 208 may also comprise code, executable by the processor 204, to implement a method comprising: receiving, by a first node in a first committee in a computer network, a request including a node identifier to join a committee by a second node; providing, by the first node of the first committee to the second node, a proof of work process to the second node; receiving, by first node of the first committee, a solution to the proof of work process from the second node, wherein a plurality of nodes in the first committee verifies the solution; generating, by the first node of the first committee a random string, which is used by the first node to determine a second committee for the second node; introducing, by the first node to second committee, the second node, wherein the second committee displaces a node to allow the second node to join the second committee; and communicating, by the first node, information regarding the second node being in the second committee to other nodes in the computer network.

The computer readable medium 208 may also comprise code, executable by the processor 204, to implement a method comprising: receiving, by a first node in a committee, an interaction request, the interaction request including interaction data from a client computer; incorporating, by the first node, the interaction data along with other interaction data associated with other client computers into a block comprising interaction data, wherein the block includes block parts; broadcasting, by the first node, the block to other nodes in the committee, wherein the other nodes in the committee verify the block; and incorporating the block into a shard of a blockchain managed by the committee.

Overview

Most decentralized cryptocurrencies, such as Bitcoin, rely on a consensus protocol that allows a group of mutually-untrusted participants to agree on a public ledger of transactions known as the blockchain. Unlike traditional consensus mechanisms, a blockchain consensus often happens in a peer-to-peer network with open membership, where new participants, with no identities yet established, can join the system during the protocol execution. This setting introduces new fundamental challenges, such as handling Sybil attacks and node churn while providing scalability, that have only recently been studied in the area of Byzantine consensus protocols. Unfortunately, known techniques still fall short of solving these challenges due to major trust assumptions, poor scalability and load-balancing, and high latency thus making them impractical and/or insecure for large-scale transaction processing.

Embodiments of the invention include a Byzantine consensus protocol for public blockchains that can improve upon the scalability and security limitations compared to previous work in several ways. At a high level, methods according to embodiments of the invention can partition a set of nodes (e.g., all nodes in the computer network) into multiple smaller groups of nodes called committees that can operate in parallel on disjoint blocks of transactions and maintain disjoint blockchains. The blockchain can comprise data regarding payment transactions. Such a partitioning of operations and/or data among multiple groups of nodes can be referred to as sharding [James C. Corbett, Jeffrey Dean, Michael Epstein, Andrew Fikes, Christopher Frost, J. J. Furman, Sanjay Ghemawat, Andrey Gubarev, Christopher Heiser, Peter Hochschild, Wilson Hsieh, Sebastian Kanthak, Eugene Kogan, Hongyi Li, Alexander Lloyd, Sergey Melnik, David Mwaura, David Nagle, Sean Quinlan, Rajesh Rao, Lindsay Rolig, Yasushi Saito, Michal Szymaniak, Christopher Taylor, Ruth Wang, and Dale Woodford. Spanner: Google's globally-distributed database, pages 251-264, 2012.] and has been recently studied in the context of blockchain protocols [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.]. By enabling parallelization of the consensus work and storage, sharding-based consensus can scale the throughput of the system proportionally to the number of committees, unlike the basic Nakamoto consensus.

Methods according to embodiments of the invention can provide a scalable consensus protocol for public blockchains that can be resilient to Byzantine faults from close to a ⅓ fraction of the nodes and can allow each node to exchange a sublinear, in the number of participants, amount of information. Unlike previous work, methods according to embodiments of the invention may not rely on public-key infrastructure, trusted setup, or initial public randomness. Moreover, the methods allow new participants to join or leave the protocol without delaying the protocol's execution. Methods according to embodiments of the invention can allow for a blockchain protocol that can, without any trusted setup, shard both the communication and storage overhead of the blockchain among smaller committees of nodes such that each node can exchange a sublinear amount of information. Methods according to embodiments of the invention can be practical and, unlike most cryptocurrencies, can scale up throughput with more resources (i.e., nodes) added to the system.

Methods according to embodiments of the invention can provide the following benefits: sublinear consensus, decentralized bootstrapping, secure reconfiguration, efficient cross-shard transactions, storage scalability, and efficient atomic broadcast.

Methods according to embodiments of the invention can provide a sharding-based blockchain protocol in which each node can gossip messages to a sublinear number of other nodes during a consensus round (i.e., sublinear communication). In contrast, all previous work requires that at least a constant fraction (e.g., 90% [Kyle Croman, Christian Decker, Ittay Eyal, Adem Efe Gencer, Ari Juels, Ahmed Kosba, Andrew Miller, Prateek Saxena, Elaine Shi, Emin Gun Sirer, Dawn Song, and Roger Wattenhofer. On Scaling Decentralized Blockchains, pages 106-125. Springer Berlin Heidelberg, Berlin, Heidelberg, 2016.]) of the network receive every gossiped message. This eventually leads to a superlinear, in the number of participants, number of messages exchanged in the network by those protocols (see Table 1 below).

Embodiments of the invention can provide a sharding-based blockchain protocol, with higher resiliency than pevious systems and methods, that can tolerate corruptions from up to a ⅓ fraction of its nodes (rather than ¼) while exceeding the throughput and latency of previous work [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.].

Next, decentralized bootstrapping will be discussed. Methods according to embodiments of the invention can operate in a permissionless setting that can allow open membership, but unlike most previous work [Ittay Eyal, Adem Efe Gencer, Emin Gun Sirer, and Robbert Van Renesse. Bitcoin-NG: A scalable blockchain protocol. In Proceedings of the 13th Usenix Conference on Networked Systems Design and Implementation, NSDI'16, pages 45-59, Berkeley, CA, USA, 2016. USENIX Association., and Eleftherios Kokoris-Kogias, Philipp Jovanovic, Nicolas Gailly, Ismail Khoffi, Linus Gasser, and Bryan Ford. Enhancing bitcoin security and performance with strong consistency via collective signing. In 25th USENIX Security Symposium, USENIX Security '16, pages 279-296, 2016., and Rafael Pass and Elaine Shi. Hybrid consensus: Efficient consensus in the permissionless model. Cryptology ePrint Archive, Report 2016/917, 2016. http://eprint.iacr.org/2016/917., Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406., and Ittai Abraham, Dahlia Malkhi, Kartik Nayak, Ling Ren, and Alexander Spiegelman. Solida: A blockchain protocol based on reconfigurable byzantine consensus. In Proceedings of the 21st International Conference on Principles of Distributed Systems, OPODIS '17, Lisboa, Portugal, 2017.], embodiments may not assume the existence of an initial common randomness, usually in the form of a common genesis block. Creating such a block is often either neglected or simply assumed to be done using a distributed random generation protocol such as that of [Christian Cachin, Klaus Kursawe, Frank Petzold, and Victor Shoup. Secure and efficient asynchronous broadcast protocols. In Joe Kilian, editor, Advances in Cryptology—CRYPTO 2001, pages 524-541, Berlin, Heidelberg, 2001. Springer Berlin Heidelberg., and E. Syta, P. Jovanovic, E. K. Kogias, N. Gailly, L. Gasser, I. Khoffi, M. J. Fischer, and B. Ford. Scalable bias-resistant distributed randomness. In 2017 IEEE Symposium on Security and Privacy (SP), pages 444-460, May 2017.]. Unfortunately, all of these protocols require exchanging $\Omega(n^2)$ messages. In contrast, methods according to embodiments of the invention can employ a setup protocol that can allow agreement on a set of honest-majority committees with only $O(m \cdot n)$ messages exchanged without assuming any initial randomness (see Table 1 below). O can be a tight upper-bound on the growth of an algorithm. Ω can be can be a tight lower-bound on the growth of an algorithm.

Next, fast committee consensus will be discussed. Embodiments of the invention can reduce communication overhead and latency of P2P consensus on large blocks gossiped among members of each committee by roughly 3-10 times compared to previous solutions [Ittai Abraham, Dahlia Malkhi, Kartik Nayak, Ling Ren, and Alexander Spiegelman. 2017. Solida: A Blockchain Protocol Based on Reconfigurable Byzantine Consensus. In Proceedings of the 21st International Conference on Principles of Distributed Systems (OPODIS '17). Lisboa, Portugal., and Yossi Gilad, Rotem Hemo, Silvio Micali, Georgios Vlachos, and Nickolai Zeldovich. 2017. Algorand: Scaling Byzantine Agreements for Cryptocurrencies. In Proceedings of the 26th Symposium on Operating Systems Principles (SOSP '17). ACM, New York, NY, USA, 51-68. https://doi.org/10.1145/3132747.3132757, Eleftherios Kokoris-Kogias, Philipp Jovanovic, Linus Gasser, Nicolas Gailly, Ewa Syta, and Bryan Ford. OmniLedger: A Secure, Scale-Out, Decentralized Ledger via Sharding. Cryptology ePrint Archive, Report 2017/406. (2017). https://eprint.iacr.org/2017/406., and Loi Luu, Viswesh Narayanan, Chaodong Zheng, Kunal Baweja, Seth Gilbert, and Prateek Saxena. 2016. A Secure Sharding Protocol For Open Blockchains. In Proceedings of the 2016 ACMSIGSAC Conference on Computer and Communications Security (CCS '16). ACM, New York, NY, USA, 17-30. https://doi.org/10.1145/2976749.2978389, and Noga Alon, Haim Kaplan, Michael Krivelevich, Dahlia Malkhi, and JP Stern. 2004. Addendum to scalable secure storage when half the system is faulty. Information and Computation (2004)., and Ling Ren, Kartik Nayak, Ittai Abraham, and Srinivas Devadas. 2017. Practical Synchronous Byzantine Consensus. CoRR abs/1704.02397 (2017). http://arxiv.org/abs/1704.02397].

Next, secure reconfiguration can be discussed. Methods according to embodiments of the invention may expand upon the Cuckoo rule [Baruch Awerbuch and Christian Scheideler. Towards a scalable and robust DHT. In Proceedings of the Eighteenth Annual ACM Symposium on Parallelism in Algorithms and Architectures, SPAA '06, pages 318-327, New York, NY, USA, 2006. ACM., and S. Sen and M. J. Freedman. Commensal cuckoo: secure group partitioning for large-scale services. ACM SIGOPS Operating Systems Review, 46(1):33-39, 2012.] to protect against join/leave attacks during node churn; a property missing in previous sharding-based protocols [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.]. Methods according to embodiments of the invention may also allow new nodes to join the computer network in a seamless way without any interruptions or delays in the execution of the protocol.

Next, cross-shard verification can be discussed. To verify cross-committee transactions, methods according to embodiments of the invention can allow committees to discover each other via an efficient routing mechanism inspired by Kademlia [Petar Maymounkov and David Mazieres. Kademlia: A peer-to-peer information system based on the xor metric. In Revised Papers from the First International Workshop on Peer-to-Peer Systems, IPTPS '01, pages 53-65, London, UK, UK, 2002. Springer-Verlag.] that can incur a logarithmic, in number of committees, latency and storage. Unfortunately, committee discovery in existing solutions [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.] requires several "gossip-to-all" invocations.

Embodiments of the invention provide techniques for partitioning a blockchain such that each node may store a 1/k fraction of the entire blockchain. Compared to a related approach proposed recently by Kokoris-Kogias [Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.], methods according to embodiments of the invention allow one transaction, rather than two, to atomically commit to a cross-shard transaction.

Methods according to embodiments of the invention expand upon the atomic broadcast protocol of Cachin and Tessaro [Christian Cachin and Stefano Tessaro. Asynchronous verifiable information dispersal. In Proceedings of the 19th International Conference on Distributed Computing, DISC'05, pages 503-504, Berlin, Heidelberg, 2005. Springer-Verlag.] to reduce the communication overhead for broadcasting large blocks of transactions within each committee. This can allow a higher per-committee throughput as well as a larger committee size that results in a smaller failure probability than previous solutions [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Yossi Gilad, Rotem Hemo, Silvio Micali, Georgios Vlachos, and Nickolai Zeldovich. Algorand: Scaling byzantine agreements for cryptocurrencies. In Proceedings of the 26th Symposium on Operating Systems Principles, SOSP '17, pages 51-68, New York, NY, USA, 2017. ACM., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.].

Embodiments of the invention can be empirically evaluated, showing that the methods scale well to network sizes of the order of Bitcoin. Methods according to embodiments of the invention can also handle churn seamlessly without delaying the consensus protocol and it can take about 185 seconds (or less) for a node to join the computer network.

TABLE 1

| Protocol | Identity generation | Committee setup | Consensus on constant # of blocks | Storage/ node |
|---|---|---|---|---|
| Elastico | $O(n^2)$ | $\Omega(n^2)$ | $O(m^2n)$ | $O(\|B\|)$ |
| OmniLedger | $O(n^2)$ | $\Omega(n^2)$ | $\Omega(m^2n)$ | $O(m \cdot \|B\|/n)$ |
| Methods according to embodiments of the invention | $O(n^2)$ | $O(m\sqrt{n})$ | $O(m^2 \log n)$ | $O(m \cdot \|B\|/n)$ |

Table 1, above, shows the complexities of known sharding-based blockchain protocols. The columns indicate total message complexities except the last column which shows the consensus on a constant number of blocks, wherein consensus complexities are per block of transactions. n can be the number of participants, $m \ll n$ can be the size of each committee, and $|B|$ can be the size of the blockchain. For protocols described herein, a constant number of shards and constant-size messages can be assumed. "Bootstrap", refers to initial bootstrapping of the system to create an initial common randomness.

Consider a peer-to-peer network with n nodes that have already established identities (i.e., public/private keys) through a Sybil-resistant identity generation mechanism such as that of [Marcin Andrychowicz and Stefan Dziembowski. PoW-Based Distributed Cryptography with No Trusted Setup, pages 379-399. Springer Berlin Heidelberg, Berlin, Heidelberg, 2015.], in which every node can solve a computationally-hard puzzle on the node's locally-generated identity (i.e., public keys) that can be verified by all other (honest) nodes without the assumption of a trusted randomness beacon. In a computer network comprising n nodes, methods according to embodiments of the invention can create k=n/m committees each of size m=c log n nodes, where c can be a constant depending on a security parameter.

TABLE 2

| Protocol | Network Size | Resiliency | Throughput | Latency | Storage | Shard Size | Time to Fail |
|---|---|---|---|---|---|---|---|
| Elastico | 1600 nodes | n/4 | 40 tx/sec | 800 sec | 1x | 100 nodes | 1 hour |
| OmniLedger | 1800 nodes | n/4 | 3500 tx/sec | 63 sec | 1/3x | 600 nodes | 230 years |
| Methods according to embodiments of the invention | 1800 nodes | n/3 | 4220 tx/sec | 8.5 sec | 1/9x | 200 nodes | 1950 years |
| Methods according to embodiments of the invention | 4000 nodes | n/3 | 7380 tx/sec | 8.7 sec | 1/16x | 250 nodes | 4580 years |

Table 2, above, shows a high-level comparison between the results of methods according to embodiments of the invention and sharding-based protocols.

In Table 2, there can be 500 B/tx (bytes per transaction), one-day long epochs, 100 ms network latency for all links, and 20 Mbps bandwidth for all nodes in the three protocols. The choices of 1600 and 1800 nodes for [Elastico] and [OmniLedger], respectively, is based on the maximum network sizes reported in these works. The time-to-failure of the protocol of Elastico decreases rapidly for larger network sizes. For OmniLedger, it can be expected that larger network sizes will, at best, only slightly increase the throughput due to large committee sizes required. The latency numbers reported in Table 2 refer to block (or transaction) confirmation times which is the delay from the time that a block maker proposes the block to the network until it is confirmed as a valid transaction by the network.

Figure 3:
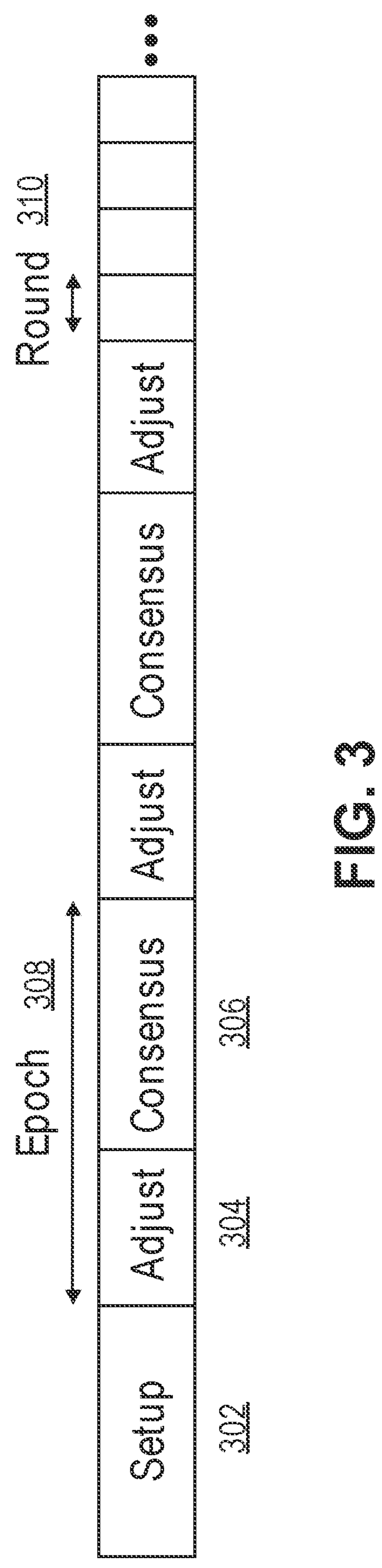
FIG. 3 shows a flow diagram illustrating phases in methods according to an embodiment of the invention.

Methods according to embodiments of the invention can proceed in fixed time periods called epochs. FIG. 3 shows a flow diagram illustrating phases according to an embodiment of the invention. FIG. 3 includes a setup phase 302, an adjust phase 304, and a consensus phase 306. An epoch 308 can comprise the adjust phase 304 and the consensus phase 306. Each epoch 308 can include at least one round 310.

The setup phase 302 can be a phase that sets up the system. A node can perform the setup phase 302 using the election module 208A. The adjust phase 304 can be a phase that allows new nodes to join the system. A node can perform the adjust phase 304 using the reconfiguration module 208B. The consensus phase 306 can be a phase that can allow the committees of the computer network to verify interactions and store interactions into blocks into the blockchain. A node can perform the consensus phase using the consensus module 208C.

The epoch 308 can repeat any number of suitable times. In some embodiments, the length of the epoch 308 can be the length of the adjust phase 304 and the consensus phase 306. The round 310 can be a sequence of activities or functions in a period of time. For example, the round 310 can be a round of communication in which the nodes of the computer network may communicate. The round 310 can relate to any suitable sequence of activities or functions. There can be any suitable number of rounds 310 in a given epoch 308. In some embodiments, the setup phase 302, the adjust phase 304, and consensus phase 306 can be performed sequentially by the nodes in the computer network.

A first epoch can start by the nodes running a probabilistic committee-election protocol, described below, that can allow a plurality of nodes to agree on a committee of $m=O(\log n)$ nodes in a constant number of rounds and by exchanging at most $O(n\sqrt{n})$ bits in total. Assuming $t<n/3$ nodes are controlled by a slowly-adaptive Byzantine adversary, the committee-election protocol can sample the committee from the set of all nodes in a way that the fraction of malicious nodes in the sampled set can be bounded by ½ with high probability. This committee, referred to as a leader committee, can, at the beginning of every epoch, generate a fresh random value, called an epoch randomness, that can be used throughout the protocol to (1) select a set of committees in the first epoch, (2) allow new nodes to join the system, and (3) re-organize the existing committees after one or more participants (e.g., nodes) joins/leaves to avoid adversarial take-over.

Once the leader committee is formed (i.e., after the setup phase 302), each node of the leader committee can establish a P2P network with the other nodes of the leader committee and can participate in a distributed random generation protocol, described below, to agree on the first epoch randomness, $r_0$, which can be distributed by the nodes of the leader committee to all nodes in the computer network. Next, the participants can use $r_0$ to locally obtain a view of a set of new committees each with m nodes, where at most a ½ fraction of the nodes in each committee are malicious with high probability. The nodes assigned to the same committee can discover each other via a peer discovery algorithm and can then participate in multiple runs of a Byzantine consensus protocol with the other nodes in the same committee to build and grow a blockchain stored by the plurality of nodes associated with that committee. Building on the recently-proposed synchronous consensus algorithm of Ren et al. [Ling Ren, Kartik Nayak, Ittai Abraham, and Srinivas Devadas. Practical synchronous byzantine consensus. CoRR, abs/1704.02397, 2017.] driven by a list of leaders selected randomly using the epoch randomness, embodiments of the invention can allow efficient intra-committee consensus with the optimal resiliency of $t<n/2$.

In methods according to embodiments of the invention, a consensus decision can be made on either a block of transactions submitted by external users (i.e., client computers) to the committee or on a periodic reconfiguration of committees in the adjust phase 304. These events can be deterministically marked by fixed time-intervals called epochs and allow the computer network to re-organize the committees in response to a slowly-adaptive adversary [Rafael Pass and Elaine Shi. Hybrid consensus: Efficient consensus in the permissionless model. Cryptology ePrint Archive, Report 2016/917, 2016. http://eprint.iacr.org/2016/917.]. Such an adversary can corrupt new nodes (i.e., take over committees) at the end of epochs (i.e., the set of committees can be fixed during each epoch). Unfortunately, repeating the entire committee-election protocol to reconfigure committees in response to nodes joining and leaving the computer network a few-but-frequent times can impose a huge overhead on the computer network. Therefore, at the end of each epoch, embodiments of the invention can allow for a minimally-expensive reconfiguration protocol based on the cuckoo rule [Baruch Awerbuch and Christian Scheideler. Towards a scalable and robust DHT. In Proceedings of the Eighteenth Annual ACM Symposium on Parallelism in Algorithms and Architectures, SPAA '06, pages 318-327, New York, NY, USA, 2006. ACM., and S. Sen and M. J. Freedman. Commensal cuckoo: secure group partitioning for large-scale services. ACM SIGOPS Operating Systems Review, 46(1):33-39, 2012.] that can move a constant number of nodes between committees while provably guaranteeing security against join/leave attacks.

During the reconfiguration protocol, occurring at the end of the i-th epoch, each committee can generate a fresh randomness, $r_i+1$, for the next epoch. The fresh randomness not only can allow the protocol to move a certain number of nodes between committees in an unpredictable manner, thus hindering malicious takeovers, but can also allow for the creation of fresh computational puzzles (i.e., proof of work) for new nodes that request to join at the end of the next epoch (i.e., epoch i+1). Such a new node can be admitted to the system if it can solve a fresh puzzle before the next reconfiguration event. Otherwise, it has to solve another fresh puzzle, the soonest of which can be revealed at the end of the next epoch.

Before a block of transactions can be added by a committee to its blockchain, the committee can verify the validity of every transaction in the block. This can occur during the consensus phase 306. In Bitcoin's model, such a verification usually depends on other transactions that record some previously-unspent asset being spent by the new transaction. Since embodiments of the invention can shard the main blockchain into multiple disjoint blockchains, each stored by a different committee, the "verifying committee" can communicate with the "source committees" to ensure that the related transactions exist in the blockchains of the source committees. Building on ideas from Kademlia [Petar Maymounkov and David Mazieres. Kademlia: A peer-to-peer information system based on the xor metric. In Revised Papers from the First International Workshop on Peer-to-Peer Systems, IPTPS '01, pages 53-65, London, UK, UK, 2002. Springer-Verlag.], the verifying committee can communicate with a logarithmic number of other committees to discover the ones that store the related transactions.

Embodiments of the invention can overcome the limitation of the committee sizes coming from the efficiency of the practical byzantine fault tolerance (PBFT) protocol by employing the more efficient consensus protocol developed in [Andrew Miller, Yu Xia, Kyle Croman, Elaine Shi, and Dawn Song. The honey badger of bft protocols. In Proceedings of the 2016 ACM SIGSAC Conference on Computer and Communications Security, CCS '16, pages 31-42, New York, NY, USA, 2016. ACM.]. This protocol can use an atomic broadcast protocol [Gabriel Bracha and Sam Toueg. Asynchronous consensus and broadcast protocols. Journal of the ACM (JACM), 32(4):824-840, 1985.], which embodiments of the invention improve to reduce communication cost for sending large messages in a synchronous communication model. As a result, embodiments of the invention can handle committee sizes of several hundred nodes (e.g., 400 nodes). Since the committees can have dynamic membership, an efficient routing protocol based on the Kademlia algorithm [Petar Maymounkov and David Mazieres. Kademlia: A peer-to-peer information system based on the xor metric. In Revised Papers from the First International Workshop on Peer-to-Peer Systems, IPTPS '01, pages 53-65, London, UK, UK, 2002. Springer-Verlag.], which enables fast committee discovery and communication, can be used in embodiments of the invention. Embodiments of the invention can avoid the requirement that each node has to store the whole blockchain by introducing a new sharding protocol that can allow committees to partition transactions in a ledger and assign them to be stored in different committees.

Embodiments of the invention can use the consensus protocol of Ren et al. [Ling Ren, Kartik Nayak, Ittai Abraham, and Srinivas Devadas. Practical synchronous byzantine consensus. CoRR, abs/1704.02397, 2017.] to achieve optimal resiliency of ½ in committees and hence, to allow smaller committee sizes with higher total resiliency of ⅓ (than previous work [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.]). Unlike asynchronous protocols such as PBFT [Miguel Castro and Barbara Liskov. Practical byzantine fault tolerance. In Proceedings of the Third Symposium on Operating Systems Design and Implementation, OSDI '99, pages 173-186, 1999.], the protocol of Ren et al., as well as most other synchronous protocols such as [Jonathan Katz and Chiu-Yuen Koo. On expected constant-round protocols for Byzantine agreement. In Advances in Cryptology—CRYPTO 2006, volume 4117 of Lecture Notes in Computer Science, pages 445-462. Springer Berlin Heidelberg, 2006.], is not responsive [Rafael Pass and Elaine Shi. Hybrid consensus: Efficient consensus in the permissionless model. Cryptology ePrint Archive, Report 2016/917, 2016. http://eprint.iacr.org/2016/917.], meaning that it commits to messages at a fixed rate, usually denoted by Δ, and thus, its speed can be independent of the actual delay of the network.

While most committee-based protocols (e.g., [Ittai Abraham, Dahlia Malkhi, Kartik Nayak, Ling Ren, and Alexander Spiegelman. Solida: A blockchain protocol based on reconfigurable byzantine consensus. In Proceedings of the 21st International Conference on Principles of Distributed Systems, OPODIS '17, Lisboa, Portugal, 2017.]), choose PBFT over synchronous protocols to achieve responsiveness, this often comes at a large cost that usually results in significantly poor throughput and latency, thus hindering responsiveness. Since asynchronous consensus requires $t<n/3$, one needs to assume a total resiliency of roughly ⅕ or less to achieve similar committee size and failure probability when sampling a committee with ⅓ resiliency. Unfortunately, increasing the total resiliency (e.g., to ¼) can significantly increase the committee size (e.g., 3-4× larger), thus making intra-committee consensus very inefficient.

Embodiments of the invention can run a pre-scheduled round of consensus among committee members every week, or any other suitable length of time, to agree on a new Δ so that the computer network can adjust consensus speed with the latest average delay of the computer network. While this does not completely solve the responsiveness problem, it can make the protocol responsive to long-term, more robust changes of the network as technology advances.

Another challenge in using a synchronous consensus protocol can occur in a cross-shard transaction scenario, where a malicious leader can deceive the source committee with a transaction that has been accepted by some but not all honest members in the verifying committee. This can happen because, unlike asynchronous consensus protocols such as PBFT [Miguel Castro and Barbara Liskov. Practical byzantine fault tolerance. In Proceedings of the Third Symposium on Operating Systems Design and Implementation, OSDI '99, pages 173-186, 1999.] that proceed in an event-driven manner, synchronous consensus protocols proceed in fixed rounds, and hence, some honest nodes can terminate before others with a "safe value" that yet needs to be accepted by all honest nodes in future iterations before a transaction can be considered as "committed" to the blockchain.

Consensus Techniques

Due to the large body of research on Byzantine consensus, two categories of such protocols are reviewed in this section: committee-based and sharding-based consensus protocols. See also [Shehar Bano, Alberto Sonnino, Mustafa Al-Bassam, Sarah Azouvi, Patrick McCorry, Sarah Meiklejohn, and George Danezis. Consensus in the age of blockchains. CoRR, abs/1711.03936, 2017.] for a complete survey of previous blockchain consensus protocols.

Committed-Based Consensus

Bracha [G Bracha. An o(log n) expected rounds randomized byzantine generals protocol. In Proceedings of the Seventeenth Annual ACM Symposium on Theory of Computing, STOC '85, pages 316-326, New York, NY, USA, 1985. ACM.] describe a consensus protocol to reduce the round complexity of Byzantine agreement, which was later improved in [Rafail Ostrovsky, Sridhar Rajagopalan, and Umesh Vazirani. Simple and efficient leader election in the full information model. 1994., and Alexander Russell and David Zuckerman. Perfect information leader election in log*N+o(1) rounds. In Proceedings of the 39th Annual Symposium on Foundations of Computer Science, FOCS '98, pages 576-, Washington, DC, USA, 1998. IEEE Computer Society.]. The idea of using committees for scaling the communication and computation overhead of Byzantine agreement dates back to the work of King et al. [Valerie King, Jared Saia, Vishal Sanwalani, and Erik Vee. Scalable leader election. In Proceedings of the Seventeenth Annual ACM-SIAM Symposium on Discrete Algorithm, SODA '06, pages 990-999, Philadelphia, PA, USA, 2006.] and their follow-up work [Valerie King and Jared Saia. Breaking the o(n^2) bit barrier: Scalable byzantine agreement with an adaptive adversary. In Proceedings of the 29th ACM SIGACT-SIGOPS Symposium on Principles of Distributed Computing, PODC '10, pages 420-429, New York, NY, USA, 2010. ACM.], which allow Byzantine agreement in fully-connected networks with only a sublinear per-party overhead, with respect to the number of participants. Unfortunately, both protocols provide only theoretical results and cannot be directly used in the public blockchain setting (i.e., an open-membership peer-to-peer network).

Decker et al. propose a committee-based consensus protocol, called PeerCensus, in the public blockchain model (i.e., an open-membership peer-to-peer network). They propose to use PBFT [Miguel Castro and Barbara Liskov. Practical byzantine fault tolerance. In Proceedings of the Third Symposium on Operating Systems Design and Implementation, OSDI '99, pages 173-186, 1999.] inside a committee to approve transactions. However, PeerCensus does not clearly mention how a committee is formed and maintained to ensure honest majority in the committee throughout the protocol. Hybrid Consensus [Rafael Pass and Elaine Shi. Hybrid consensus: Efficient consensus in the permissionless model. Cryptology ePrint Archive, Report 2016/917, 2016. http://eprint.iacr.org/2016/917.]proposes to periodically select a committee that runs a Byzantine consensus protocol assuming a mildly-adaptive adversary that can only corrupt honest nodes in certain periods of time. ByzCoin [Eleftherios Kokoris-Kogias, Philipp Jovanovic, Nicolas Gailly, Ismail Khoffi, Linus Gasser, and Bryan Ford. Enhancing bitcoin security and performance with strong consistency via collective signing. In 25th USENIX Security Symposium, USENIX Security '16, pages 279-296, 2016.] proposes to use a multi-signature protocol inside a committee to improve transaction throughput. However, ByzCoin's specification is incomplete and the protocol is known to have serious vulnerabilities to Byzantine faults [Rafael Pass and Elaine Shi. Hybrid consensus: Efficient consensus in the permissionless model. Cryptology ePrint Archive, Report 2016/917, 2016. http://eprint.iacr.org/2016/917., and Ittai Abraham, Dahlia Malkhi, Kartik Nayak, Ling Ren, and Alexander Spiegelman. Solida: A blockchain protocol based on reconfigurable byzantine consensus. In Proceedings of the 21st International Conference on Principles of Distributed Systems, OPODIS '17, Lisboa, Portugal, 2017., and Shehar Bano, Alberto Sonnino, Mustafa AI-Bassam, Sarah Azouvi, Patrick McCorry, Sarah Meiklejohn, and George Danezis. Consensus in the age of blockchains. CoRR, abs/1711.03936, 2017.].

Algorand [Yossi Gilad, Rotem Hemo, Silvio Micali, Georgios Vlachos, and Nickolai Zeldovich. Algorand: Scaling byzantine agreements for cryptocurrencies. In Proceedings of the 26th Symposium on Operating Systems Principles, SOSP '17, pages 51-68, New York, NY, USA, 2017. ACM.]proposes a committee-based consensus protocol called BA* that uses a verifiable random function (VRF) [Silvio Micali, Salil Vadhan, and Michael Rabin. Verifiable random functions. In Proceedings of the 40th Annual Symposium on Foundations of Computer Science, FOCS '99, pages 120-, Washington, DC, USA, 1999. IEEE Computer Society.] to randomly select committee members, weighted by their account balances, in a private and non-interactive way. Therefore, the adversary does not know which node to target until it participates in the BA* protocol with other committee members. Algorand replaces committee members with new members in every step of BA* to avoid targeted attacks on the committee members by a fully adaptive adversary. However, the randomness used in each VRF invocation (i.e., the VRF seed) can be biased by the adversary; the protocol proposes a look-back mechanism to ensure strong synchrony and hence unbiased seeds, which results in a problematic situation known as the "nothing at stake" problem.

Assuming a trusted genesis block, Solida [Ittai Abraham, Dahlia Malkhi, Kartik Nayak, Ling Ren, and Alexander Spiegelman. Solida: A blockchain protocol based on reconfigurable byzantine consensus. In Proceedings of the 21st International Conference on Principles of Distributed Systems, OPODIS '17, Lisboa, Portugal, 2017.] elects nodes onto a committee using their solutions to proof of work processes that are revealed in every round via 2t+1 committee member signatures to avoid precomputation and withholding attacks. To fill every slot in the ledger, a reconfigurable Byzantine consensus protocol is used, where a consensus decision is made on either a batch of transactions or a reconfiguration event. The latter records membership change in the committee and allows replacing at most one member in every event by ranking candidates by their PoW solutions. The protocol allows the winning candidate to lead the reconfiguration consensus itself avoiding malicious internal leaders to intentionally delay the reconfiguration events in order to buy time for other malicious nodes in the proof of work process.

Sharding-Based Consensus

Unlike in Bitcoin, a sharding-based blockchain consensus protocol can increase its transaction processing power with the number of participants joining the network by allowing multiple committees of nodes process incoming transactions in parallel. Thus, the total number of transactions processed in each consensus round by the entire protocol is multiplied by the number of committees. While there are multiple works on sharding-based blockchain protocols such as [Timo Hanke. Dfinity white paper: Our consensus algorithm. https://medium.com/dfinity/dfinity-white-paper-our-consensus-algorithm-a11adc0a054c, 2018., and The Zilliqa Team. The Zilliqa technical whitepaper. https://docs.zilliqa.com/whitepaper.pdf, August 2017., and Hsiao-Wei Wang. Ethereum sharding: Overview and finality. https://medium.com/@icebearhww/ethereum-sharding-and-finality-65248951f649, 2017.], results that focus on handling sharding in the Bitcoin transaction model known as the UTXO model are reviewed.

Elastico

Luu et al. [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM.]propose Elastico, a sharding-based consensus protocol for public blockchains. In every consensus epoch, each participant solves a proof of work based on an epoch randomness obtained from the last state of the blockchain. The PoW's least-significant bits are used to determine the committees which coordinate with each other to process transactions.

While Elastico can improve the throughput and latency of Bitcoin by several orders of magnitude, it still has several drawbacks: (1) Elastico requires all parties to re-establish their identities (i.e., solve a PoW) and re-build all committees in "every" epoch. Aside from a relatively large communication overhead, this incurs a significant latency that scales linearly with the network size as the protocol requires more time to solve enough proof of work processes to fill up all committees. (2) In practice, Elastico requires a small committee size, about 100 parties, to limit the overhead of running PBFT in each committee. Unfortunately, this increases the failure probability of the protocol significantly and, using a simple analysis (see [Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.]), this probability can be as high as 0.97 after only six epochs, rendering the protocol completely unsecure in practice.

The randomness used in each epoch of Elastico can be biased by an adversary, and hence, compromise the committee selection process and even allow malicious nodes to precompute proof of work processes; Elastico requires a trusted setup for generating an initial common randomness that is revealed to all parties at the same time. (5) While Elastico allows each party to only verify a subset of transactions, it still has to broadcast all blocks to all parties and requires every party to store the entire ledger. (6) Finally, Elastico can only tolerate up to a ¼ fraction faulty parties even with a high failure probability. Elastico requires this low resiliency bound to allow practical committee sizes.

OmniLedger

In a more recent work, Kokoris-Kogias et al. [Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.]propose OmniLedger, a sharding-based distributed ledger protocol that attempts to fix some of the issues of Elastico. Assuming a slowly-adaptive adversary that can corrupt up to a ¼ fraction of the nodes at the beginning of each epoch, the OmniLedger protocol runs a global reconfiguration protocol at every epoch, about once a day, to allow new participants to join the protocol. The protocol generates identities and assigns participants to committees using a slow identity blockchain protocol that assumes synchronous channels. A randomness is generated in each epoch using a bias-resistant random generation protocol that relies on a verifiable random function (VRF) [Silvio Micali, Salil Vadhan, and Michael Rabin. Verifiable random functions. In Proceedings of the 40th Annual Symposium on Foundations of Computer Science, FOCS '99, pages 120-, Washington, DC, USA, 1999. IEEE Computer Society.] for unpredictable leader election in a way similar to the lottery algorithm of Algorand [Silvio Micali. ALGORAND: the efficient and democratic ledger. CoRR, abs/1607.01341, 2016.]. The consensus protocol assumes partially-synchronous channels to achieve consensus using a variant of ByzCoin [Eleftherios Kokoris-Kogias, Philipp Jovanovic, Nicolas Gailly, Ismail Khoffi, Linus Gasser, and Bryan Ford. Enhancing bitcoin security and performance with strong consistency via collective signing. In 25th USENIX Security Symposium, USENIX Security '16, pages 279-296, 2016.], where the randomness is further used to divide a committee into smaller groups. The ByzCoin's design is known to have several security/performance issues [Rafael Pass and Elaine Shi. Hybrid consensus: Efficient consensus in the permissionless model. Cryptology ePrint Archive, Report 2016/917, 2016. http://eprint.iacr.org/2016/917., Ittai Abraham, Dahlia Malkhi, Kartik Nayak, Ling Ren, and Alexander Spiegelman. Solida: A blockchain protocol based on reconfigurable byzantine consensus. In Proceedings of the 21st International Conference on Principles of Distributed Systems, OPODIS '17, Lisboa, Portugal, 2017.], notably that it falls back to all-to-all communication in the Byzantine setting. Unfortunately, due to incomplete, and changing, specification of the new scheme, it is unclear how the new scheme used in OmniLedger can address these issues.

Furthermore, there are several challenges that OmniLedger leaves unsolved: (1) Similar to Elastico, OmniLedger can only tolerate $t<n/4$ corruptions. In fact, the protocol can only achieve low latency (e.g., less than 10 seconds) when $t<n/8$; (2) OmniLedger's consensus protocol requires $O(n)$ per-node communications as each committee has to gossip multiple messages to all n nodes for each block of transaction; (3) OmniLedger requires a trusted setup to generate an initial unpredictable configuration to "seed" the VRF in the first epoch. Trivial algorithms for generating such a common seed require $\Omega(n2)$ bits of communication.

(4) The OmniLedger network functionality is not oblivious to the clients who should gather the proof for input UTXOs from input shards and provide it to the output shard; (5) Due to the active role of the clients, OmniLedger is not a good candidate to expand for performing the general computation on the chain. However, they provide some preliminary way to delegate the clients role to the shards, this version is not well described and is not tested in the results; and (6) OmniLedger is vulnerable to denial-of-service (DoS) attacks by a malicious block makers who can lock arbitrary transactions leveraging the atomic cross-shard protocol.

When $t<n/4$, OmniLedger can achieve high throughput (e.g., more than 500 tx/sec) only when an optimistic trust-but-verify approach is used to trade-off between throughput and transaction confirmation latency. In this approach, a set of optimistic validators process transactions quickly providing provisional commitments that are later verified by a set of core validators. While such an approach seems useful for special scenarios, such as micropayments to quickly process low-stake small transactions, it can be considered as a high-risk approach in regular payments, especially due to the lack of financial liability mechanisms in today's decentralized systems. Nevertheless, any blockchain protocol, including Bitcoin's, has a transaction confirmation latency that has to be considered in practice to limit the transaction risk.

Synchronous Consensus

The Byzantine consensus protocol of Castro and Liskov [Miguel Castro and Barbara Liskov. Practical byzantine fault tolerance. In Proceedings of the Third Symposium on Operating Systems Design and Implementation, OSDI '99, pages 173-186, 1999.], known as PBFT, can tolerate up to $t<n/3$ corrupted nodes in the authenticated setting (i.e., using digital signatures) with asynchronous communication channels. While asynchronous Byzantine consensus requires $t<n/3$ even with digital signatures [Gabriel Bracha and Sam Toueg. Resilient consensus protocols. In Proceedings of the Second Annual ACM Symposium on Principles of Distributed Computing, PODC '83, pages 12-26, New York, NY, USA, 1983. ACM.], synchronous consensus can be solved with $t<n/2$ using digital signatures. Recently, Ren et al. [Ling Ren, Kartik Nayak, Ittai Abraham, and Srinivas Devadas. Practical synchronous byzantine consensus. CoRR, abs/1704.02397, 2017.]propose an expected constant-round algorithm for Byzantine consensus in a synchronous, authenticated communication network, where up to $t<n/2$ nodes can be corrupted. While the best known previous result, due to Katz and Koo [Jonathan Katz and Chiu-Yuen Koo. On expected constant-round protocols for Byzantine agreement. In Advances in Cryptology—CRYPTO 2006, volume 4117 of Lecture Notes in Computer Science, pages 445-462. Springer Berlin Heidelberg, 2006.], requires 24 rounds of communication in expectation, the protocol of Ren et al. requires only 8 rounds in expectation.

Ren et al. assume a random leader-election protocol exists and then runs in iterations with a new unique leader in every iteration. If the leader is honest, then the consensus is guaranteed in that iteration. Otherwise, the Byzantine leader can prevent progress but cannot violate safety, meaning that some honest nodes might not terminate at the end of the iteration but all honest nodes who terminate in that iteration can output the same value, called the safe value. If at least one node can show to the new leader that has decided on a safe value, then the new leader proposes the same value in the next iteration. Otherwise, the new leader proposes a new value.

Information Dispersal

Rabin [Valerie King, Jared Saia, Vishal Sanwalani, and Erik Vee. 2006. Scalable Leader Election. In Proceedings of the Seventeenth Annual ACM-SIAM Symposium on Discrete Algorithm (SODA '06). Philadelphia, PA, USA, 990-999.] introduces the notion of information dispersal algorithms (IDA) that can split a message (or file) into multiple chunks in such a way that a subset of them will be sufficient to reconstruct the message. This is achieved using erasure codes [Richard E Blahut. 1983. Theory and practice of error control codes. Vol. 126. Addison-Wesley Reading (Ma) etc.] as a particular case of error-correcting codes (ECC) allowing some of the chunks to be missing but not modified. Krawczyk [Hugo Krawczyk. 1993. Distributed Fingerprints and Secure Information Dispersal. In Proceedings of the Twelfth Annual ACM Symposium on Principles of Distributed Computing (PODC '93). ACM, New York, NY, USA, 207-218. https://doi.org/10. 1145/164051.164075] extends this to tolerate corrupted (i.e., altered) chunks by computing a fingerprint for each chunk and storing the vector of fingerprints using error-correcting codes. Alon et al. [Noga Alon, Haim Kaplan, Michael Krivelevich, Dahlia Malkhi, and Julien Stern. 2000. Scalable Secure Storage when Half the System is Faulty. In Proceedings of the 27th International Colloquium on Automata, Languages and Programming., and Noga Alon, Haim Kaplan, Michael Krivelevich, Dahlia Malkhi, and JP Stern. 2004. Addendum to scalable secure storage when half the system is faulty. Information and Computation (2004).] describe a more efficient IDA mechanism by computing a Merkle hash tree [Ralph C. Merkle. 1988. A Digital Signature Based on a Conventional Encryption Function. In A Conference on the Theory and Applications of Cryptographic Techniques on Advances in Cryptology (CRYPTO '87). Springer-Verlag, London, UK, UK, 369-378. http://dl.acm.org/citation.cfm?id=646752.704751] over encoded chunks in order to verify whether each of the received chunks is corrupted.

Embodiments of the invention build on and improve the IDA of Alon et al. [Noga Alon, Haim Kaplan, Michael Krivelevich, Dahlia Malkhi, and JP Stern. 2004. Addendum to scalable secure storage when half the system is faulty. Information and Computation (2004).] and the consensus protocol of Ren et al. [Ling Ren, Kartik Nayak, Ittai Abraham, and Srinivas Devadas. 2017. Practical Synchronous Byzantine Consensus. CoRR abs/1704.02397 (2017). http://arxiv.org/abs/1704.02397] to perform efficient consensus on large blocks within each committee. Once an ECC-encoded message is dispersed in the network via IDA, honest nodes can agree on a root of a Merkle tree using the protocol of Ren et al. to ensure consistency. A Merkle tree can be a data structure. In some embodiments, a Merkle tree can include leaf nodes and non-leaf nodes, in which each leaf node can be labelled with a hash of a data block, and every non-leaf node can be labelled with a cryptographic hash of the labels of its child nodes. Using the corresponding authentication path in the Merkle tree sent by the sender, recipients can verify the integrity of chunks and use a decoding mechanism to recover the message, this is described in further detail below in section IV.B.

Model and Problem Definition

In this section the network model and the threat model used in embodiments of the invention can be discussed.

Network Model

Consider n nodes in a peer-to-peer network, where there can be a known fixed upper bound $\Delta$ on a delivery time of each message. All messages sent in a round can be delivered by the end of that round and the order of these messages may not necessarily be preserved. In some embodiments, messages can be propagated in the network through gossiping [C. Decker and R. Wattenhofer. Information propagation in the Bitcoin network. In P2P, pages 1-10. IEEE, 2013., and R. Karp, C. Schindelhauer, S. Shenker, and B. Vocking. Randomized rumor spreading. In Proceedings of the 41st Annual Symposium on Foundations of Computer Science, FOCS '00, pages 565-, Washington, DC, USA, 2000. IEEE Computer Society.]. This can be the standard synchronous network model in distributed computing and can be adopted by blockchain consensus protocols [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Yossi Gilad, Rotem Hemo, Silvio Micali, Georgios Vlachos, and Nickolai Zeldovich. Algorand: Scaling byzantine agreements for cryptocurrencies. In Proceedings of the 26th Symposium on Operating Systems Principles, SOSP '17, pages 51-68, New York, NY, USA, 2017. ACM., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406., and Ittai Abraham, Dahlia Malkhi, Kartik Nayak, Ling Ren, and Alexander Spiegelman. Solida: A blockchain protocol based on reconfigurable byzantine consensus. In Proceedings of the 21st International Conference on Principles of Distributed Systems, OPODIS '17, Lisboa, Portugal, 2017.] as a realistic assumption for the Internet. This model is sometimes referred to as the asynchronous network model in the blockchain literature [Rafael Pass, Lior Seeman, and Abhi Shelat. Analysis of the blockchain protocol in asynchronous networks. In Jean-Sebastien Coron and Jesper Buus Nielsen, editors, Advances in Cryptology—EUROCRYPT 2017, pages 643-673, Cham, 2017. Springer International Publishing.], which can be confusing because in the conventional asynchronous networks the adversary can arbitrarily delay messages in the network. No such thing can happen in synchronous networks, including Bitcoin. As also pointed out by Abraham et al. [Ittai Abraham, Dahlia Malkhi, Kartik Nayak, Ling Ren, and Alexander Spiegelman. Solida: A blockchain protocol based on reconfigurable byzantine consensus. In Proceedings of the 21st International Conference on Principles of Distributed Systems, OPODIS '17, Lisboa, Portugal, 2017.], the difference in the terminology is likely because Bitcoin is neither synchronous nor asynchronous in the conventional way.

For the Byzantine consensus protocol that runs inside each committee, embodiments of the invention can create a local peer-to-peer network among a plurality of nodes of the committee. In practice, Δ can be conservatively set in the order of seconds in a peer-to-peer network of more than 200 nodes. Thus, similar to [Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.], embodiments of the invention may use partially-synchronous channels [Miguel Castro and Barbara Liskov. Practical byzantine fault tolerance. In Proceedings of the Third Symposium on Operating Systems Design and Implementation, OSDI '99, pages 173-186, 1999.] between members of each committee with exponentially-increasing time-outs to minimize latency. Without loss of generality and similar to most hybrid blockchain protocols [Christian Decker, Jochen Seidel, and Roger Wattenhofer. Bitcoin meets strong consistency. In Proceedings of the 17th International Conference on Distributed Computing and Networking, ICDCN '16, pages 13:1-13:10, New York, NY, USA, 2016. ACM., and Rafael Pass and Elaine Shi. Hybrid consensus: Efficient consensus in the permissionless model. Cryptology ePrint Archive, Report 2016/917, 2016. http://eprint.iacr.org/2016/917., Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.], all participants in the computer network, in some embodiments, can have equivalent computational resources. In some embodiments, the initial set of nodes can start the protocol at the same time.

Threat Model

Embodiments of the invention consider a probabilistic polynomial-time Byzantine adversary which can corrupt $t<n/3$ of the nodes at any time. The corrupted nodes can collude with each other and can also deviate from the protocol in any arbitrary manner (e.g., by sending invalid or inconsistent messages, remaining silent, etc.). Similar to most committee-based protocols [Christian Decker, Jochen Seidel, and Roger Wattenhofer. Bitcoin meets strong consistency. In Proceedings of the 17th International Conference on Distributed Computing and Networking, ICDCN '16, pages 13:1-13:10, New York, NY, USA, 2016. ACM., and Eleftherios Kokoris-Kogias, Philipp Jovanovic, Nicolas Gailly, Ismail Khoffi, Linus Gasser, and Bryan Ford. Enhancing bitcoin security and performance with strong consistency via collective signing. In 25th USENIX Security Symposium, USENIX Security '16, pages 279-296, 2016., and Rafael Pass and Elaine Shi. Hybrid consensus: Efficient consensus in the permissionless model. Cryptology ePrint Archive, Report 2016/917, 2016. http://eprint.iacr.org/2016/917., and Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406., and Ittai Abraham, Dahlia Malkhi, Kartik Nayak, Ling Ren, and Alexander Spiegelman. Solida: A blockchain protocol based on reconfigurable byzantine consensus. In Proceedings of the 21st International Conference on Principles of Distributed Systems, OPODIS '17, Lisboa, Portugal, 2017.], it is assumed that the adversary can be slowly adaptive, meaning that the adversary can be allowed to select the set of corrupt nodes at the beginning of the protocol and/or between each epoch, but cannot change this set of corrupt nodes within an epoch. In some embodiments, nodes can disconnect from the computer network during an epoch or between two epochs due to any reason, such as internal failure or network jitter. However, at any moment, at least a ⅔ fraction of the computational resources can belong to uncorrupted participants that are online (i.e., respond within the network time bound). Some embodiments of the invention do not rely on any public-key infrastructure or any secure broadcast channel, but can use a random oracle for collision-resistant hash functions. A random oracle can respond to unique queries with a random response. A hash function can be collision-resistant if it is difficult for a malicious party to determine two inputs that hash to the same output.

Problem Definition

In some embodiments, the protocol can include a secure chain sharding protocol based on a modified version of the definition of a secure sharding protocol from [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM.]. In some embodiments a set of s transactions can be sent to the computer network by client computers that are external to the computer network. The set of transactions can be divided into k disjoint blocks. Let $x_{i,j}$ represent the j-th transaction in the i-th block. In some embodiments, all nodes can have access to an external function $f$ that, given a transaction, outputs 0 or 1 indicating whether the transaction is invalid or valid, respectively. The protocol Π outputs a set X containing k disjoint subsets or shards $X_i=\{x_{i,j}\}$ for every $j\in\{1 \ldots |X_i|\}$ such that the following conditions hold:

Agreement: for every $i\in(1 \ldots k)$, at least $\Omega(\log n)$ nodes can agree on X, with high probability of at least $1-2^{-\lambda}$, where λ can be a security parameter.

Validity: for every $i\in\{1 \ldots k)$ and $j\in\{1 \ldots |X_i|\}$, $f(x_{i,j})=1$.

Scalability: k can grow near linearly with n.

Efficiency: the per-party communication and computation complexity can be O(n) and the per-party storage complexity can be O(s).

NOTATION AND TERMINOLOGY

When an event occurs with high probability, the event can occur with probability $1-O(1/2^{\lambda})$, where λ can be the security parameter. A set of $O(\sqrt{n})$ nodes may be a committee. A subset of a committee may be a subcommittee. Node (party) P can be a member of a committee C. The other nodes of C may be neighbors of node P in C. In some embodiments, when a committee runs a protocol, all members of the committee can participate in an execution of the protocol. A committee may be considered good if less than a ⅓ fraction of the nodes in the committee are malicious. Let committee 1 $C_1$ and committee 2 $C_2$ be two good committees. In some embodiments, when committee 1 $C_1$ sends a message m to committee 2 $C_2$, every honest member of committee 1 $C_1$ can send m to every member of committee 2 $C_2$. Since each member of committee 2 $C_2$ can receive different messages due to malicious behavior, committee 2 $C_2$ can choose the message with a frequency of at least ⅓+1. In other embodiments, when committee 1 $C_1$ sends a message to committee 2 $C_2$, a leader node of committee 1 $C_1$ can receive a message including a digital signature from each of the plurality of nodes in committee 1 $C_1$ and can aggregate the messages and can then transmit an aggregated message to a leader of committee 2 $C_2$. The leader of committee 2 $C_2$ can transmit the aggregated message to every node in committee 2 $C_2$, wherein every node in committee 2 $C_2$ can verify the digital signatures created by the plurality of nodes in committee 1 $C_1$.

Protocols According to Embodiments of the Invention

In this section, a scalable Byzantine consensus protocol is described. Methods according to embodiments of the invention can run in three different phases: setup, consensus, and adjust (see FIG. 3). The main technical components of the protocols can enable functionality to create and maintain multiple committees, which can, with high probability, have at most ⅓ malicious nodes while allowing for node churn. Each committee can store and add transactions to one partition of a blockchain (i.e., shard of the blockchain).

Before describing in detail the different phases according to embodiments of the invention, a construction for random number generation within a committee called secure random generation (GenRand) can be presented. A computer network can comprise N nodes, wherein T of the nodes can be malicious. The nodes can generate l bits of randomness using the following GenRand protocol. The protocol can have two steps: i) commit and ii) reveal. During the commit phase each node $p_i$ can locally generate $$b = \frac{l}{N - T}$$

bit random value $r_i$ and a commitment $c_i$ to $r_i$. Each node can then reliably broadcast $c_i$ to every other node. During the reveal phase, the nodes can reliably broadcast the random values $r_i$ to every other node. In some embodiments, the generated random value $r_i$ can be hidden from the other nodes. The commitment $c_i$ can be proof that the node generated $r_i$, but may not disclose the value of $r_i$ to the other nodes.

After receiving ($c_i$, $r_i$) from all the other nodes, each node can check the validity of the commitment and otherwise set $r_i$ to a default value (e.g., b bits of 0). The node can then set its output as $H(r_1 \| r_2 \| \ldots$ where $H:\{0,1\}^* \rightarrow \{0,1\}^l$ can be a hash function. H can be modeled as a random oracle, this can result in an output that can be an unbiased l bit random value. In practice, all the honest nodes can send good random values, thus ⅔ of the input to the hash function are chosen at random. For example, a malicious node may not generate a random value and can then input any chosen number into the hash function.

Setup Phase

The setup phase can start by running a setup protocol where each node can join the system by solving a proof of work process to establish an identity. Then, the nodes can run a committee election protocol where they can determine a good committee, which can be referred to as a leader committee. The leader committee can then generate and distribute a sequence of random bits that can be used to establish k good committees $\{C_1, \ldots, C_k\}$. In some embodiments, the setup phase can establish the computer network for the reconfiguration phase and the consensus phase.

The setup phase can include a method performed by a node in a computer network including a plurality of nodes, each node having a node identifier. The method comprises: a) receiving, by the node, node identifiers from the other nodes of the plurality of nodes in the computer network; b) determining, by the node, a plurality of node committees in a sampler graph comprising a plurality of nodes, wherein the node is present in a node committee in the plurality of node committees; c) the node, further i) generating a random string; ii) performing a proof of work process using the random string and a hash function; iii) if the proof of work process yields a solution that is acceptable, then broadcasting the solution to all other nodes in the plurality of nodes, wherein the other nodes verify the solution; iv) if the other nodes verify the solution, the node is elected to a subcommittee for the node committee, wherein the subcommittee updates the sampler graph; and d) repeating steps b) and c) until a leader committee is determined. The setup phase can be described with reference to protocol 1 below.

In some embodiments, before running the setup phase, the computer network can run the identity generation protocol introduced in [Marcin Andrychowicz and Stefan Dziembowski. PoW-Based Distributed Cryptography with No Trusted Setup, pages 379-399. Springer Berlin Heidelberg, Berlin, Heidelberg, 2015.] by Andrychowicz and Dziembowski among the nodes. This protocol can allow each node to establish a public/private key pair by solving a PoW computational challenge and then send the node's public key as its ID to the other nodes in the computer network. A node in the computer network including a plurality of nodes can receive node identifiers from the other nodes of the plurality of nodes in the computer network. In some embodiments, the node identifiers can be public keys.

After each node receives a node identifier from the other nodes, the nodes can generate a deterministic random graph called a sampler graph. The sampler graph can be created locally by each node based on a pre-defined seed and the node identifiers known by all the nodes in the computer network. A predefined seed may be a number or vector known by all the nodes in the computer network. In some embodiments, the predefined seed may be used to initialize a pseudorandom number generator.

The sampler graph can allow the nodes to sample a number of committees such that the distribution of malicious nodes within the majority of the committees can be within δ fraction of the number of malicious nodes in an initial set comprising all nodes. For example, if there are three hundred malicious nodes in a computer network comprising one thousand nodes, then the fraction of malicious nodes is 3/10. Therefore, the committees that are determined based on the sampler graph may have a fraction of malicious nodes δ away from 3/10 (i.e., δ less than 3/10 or δ greater than 3/10).

Therefore, if multiple sampler graphs are chained together, the computer network can start with a ⅓ malicious fraction set of nodes and eventually converge to a ½ malicious fraction committee. Embodiments of the invention can determine an election network as a sequence of sampler graphs layered on top of one another. By running the election network, the plurality of nodes in the computer network can elect the leader committee, where at most a ⅓ fraction of the nodes in the leader committee are malicious. In some embodiments, a node in a computer network including a plurality of nodes can determine a plurality of node committees in a sampler graph comprising a plurality of nodes, wherein the node can be present in a node committee in the plurality of node committees.

Figure 4:
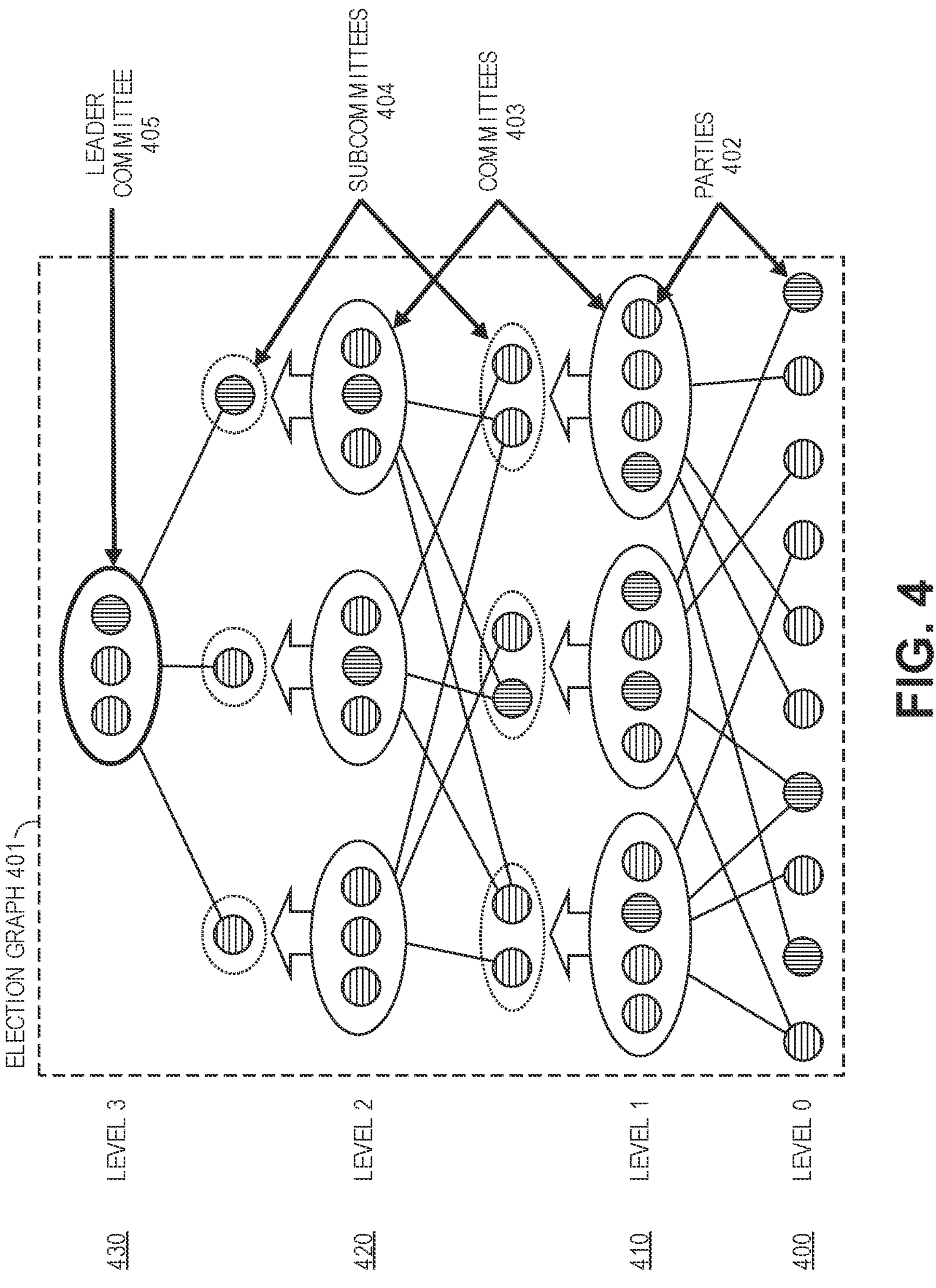
FIG. 4 shows a block diagram illustrating an election graph according to an embodiment of the invention.

FIG. 4 shows a block diagram illustrating an election graph (or network) according to an embodiment of the invention. FIG. 4 includes an election graph 401. The election graph 401 can comprise a number of levels including level zero 400, level one 410, level two 420, and level three 430. In some embodiments, the election graph 401 can comprise any suitable number of levels. The election graph 401 may also include parties 402, committees 403, subcommittees 404, and a leader committee 405, in any suitable manner.

The parties 402 may be nodes in a computer network. At level zero 400, the parties 402 may not yet be in committees 403. After an election round, the committees 403 may comprise a plurality of nodes (i.e., parties 402). The subcommittees 404 may comprise parties 402 elected from the committees 403 at a previous level. For example, the parties 402 in the committees 403 in level two 420 can elect a number of parties 402 to form a subcommittee 404. The subcommittee 404 can then form the leader committee 405 at level three 430. The leader committee 405 may be the leader committee. The election process is described in further detail below.

The sampler graph can be denoted G(L,R) and can be a random bipartite graph, where a degree (e.g., $d_R$) of every node in R can be $d_R=c\sqrt{n}$, wherein n can be the number of nodes and c can be scaling factor. The bipartite graph G can include two sets L and R. The set L can include vertices that can represent the nodes. The set R can include vertices that represent the committees. The sampler graph G(L,R) can be represented by two levels in FIG. 4. For example, a sampler graph G(L, R) can include the parties 420 in level zero 400 and the committees 430 in level one 410. For each node in R, the node's neighbors in L can be selected independently and uniformly at random without replacement. No node in L has multiple edges to any node in R. Each party 420 in level zero 400 can have an edge that connects to a committee 403 in level one 410. In some embodiments, the sampler graph can be randomly constructed using a predefined seed stored at each node in the computer network. In this way, each party 402 in level zero 400 can be connected randomly to the committees 403 in level 410.

In some embodiments, a sampler graph can include the nodes in one level connected via edges to committees of the next level. Multiple sampler graphs that are chained together in this way can be considered an election graph 401.

A node can be a member of a committee if the members of the committee's vertices in G are connected. A largest coalition of malicious nodes T can be a subset of L (i.e., $T\subseteq L$). A subset of committees S can be any subset of committees (i.e., $S\subseteq R$). Let $\varepsilon(T,S)$ denote the event that every node in S has more than a $$\frac{|T|}{|L|}+\delta$$

fraction of its edges incident to nodes in T. Intuitively, $\varepsilon$ can capture the event that all committees in S are malicious, i.e., more than a $$\frac{|T|}{|L|}+\delta$$

fraction of nodes in the committee are malicious. The probability that a fixed node in S that can also be in T can be equal to $$\frac{|T|}{|L|}.$$

The election network can be constructed by chaining l sampler graphs $\{G(L_1,R_1), \ldots, G(L_l, R_l)\}$ together. Each sampler graph can correspond to a different level in the election graph 401. For example, level one 410 may correspond to a first sampler graph $G(L_1, R_1)$, level two 420 may correspond to a second sampler graph $G(L_2, R_2)$, and level three 430 may correspond to a third sampler graph $G(L_3,R_3)$. In some embodiments, there may be any suitable number of levels. The last level (i.e., the level wherein the leader committee 405 can be formed) may be level l and may correspond to a final sampler graph $G(L_l, R_l)$.

Initially, the n nodes can be assigned to vertices in $L_1$. Based on the edges in the sampler graph, every node can be assigned to a set of committees each represented by a vertex in $R_1$. Then, each committee can run a subcommittee election protocol, described below, to elect a random subset of the committees nodes. The elected nodes can then serve as the vertices in $L_2$ of $G(L_2,R_2)$. This process may continue until the last sampler graph $G(L_l, R_l)$ at which point a single committee can be formed (i.e., the leader committee).

To construct the election network the following can be set:

$$|L_i| = \left\lceil |L_{i-1}|^{\alpha_i+\beta_i\gamma_i} \right\rceil,\ |R_i| = \lceil |L_i|^{\alpha_i} \rceil \tag{1}$$

where $|L_1|=n$, $|R_i|=n^{\alpha_i}$, $0<\alpha_i, \beta_i, \gamma_i<1$, and $i=\{2, \ldots, l\}$. It can be shown that for some constant l, $|R_l|=1$.

From Equation 3, the error probability can be bound for every level i of the election network denoted by $p_i$, where $$p_i \le 2e^{|L_i|+|R_i|-\delta^2 c d_{R_i}|S_i|/2} \tag{2}$$

Section VII, below, describes how to set the parameters α, β and γ to instantiate such a graph and presents an analysis that can allow for better bounds for their sizes.

After determining the plurality of node committees in the sampler graph comprising a plurality of nodes, the nodes of each committee can run the GenRand protocol or possibly any other suitable random value generation algorithm. Each node can generate a random string s. The nodes within a committee can generate the same random string s. For example, a first plurality of nodes in a first committee can generate a first random string, whereas a second plurality of nodes in a second committee can generate a second random string. In some embodiments, the random string s may be any suitable length.

The plurality of nodes in a committee can use the random string s to elect nodes that can be associated with a next level of committees. Each node with a node identifier ID can compute a hash function based on the random string s and the node's node identifier, h=H(s||ID). After determining a solution to the hash function, the node can announce itself to be part of the next level of committees if $h<=2^{256-d}$, where H may be a hash function modeled as a random oracle. $h<=2^{256-d}$ can be a predetermined security value. $d$ can be a difficulty level of computing the hash function and can be any suitable predetermined value. The difficulty level $d$ can determine how computationally hard it is to solve the hash function. The 256 can represent a 256 bit number, however, any suitable number can be used, such as $\gamma$.

In other embodiments, the predetermined security value can be $2^{\gamma-d}$. For example, if a first node determines a hash value h that can be less than or equal to $2^{\gamma-d}$, then the first node can broadcast the hash value h to the other nodes. In some embodiments, the first node may broadcast the hash value h and the node identifier associated with the first node to the other nodes. The predetermined security value $2^{\gamma-d}$ can be altered to change how many nodes are elected. In some embodiments, the predetermined security value can be predetermined by the leader committee.

Each node can perform a proof of work process using the random string s and the hash function. If the proof of work process yields a solution that is acceptable, then the node can broadcast the solution to all other nodes in the plurality of nodes (i.e., in the same committee), wherein the other nodes can verify the solution. In some embodiments, each node in each committee can perform the proof of work process. The solution to the proof of work process may be considered acceptable if the result of the proof of work process is less than a predetermined security value (e.g., $2^{\gamma-d}$).

The other nodes of the committee may verify the solution broadcast by the node. The other nodes of the committee can verify the solution by determining if the solution solves the hash function and is less than the predetermined number. If the other nodes verify the solution, the node can be elected to a subcommittee for the node committee.

In some embodiments, all nodes can sign the data (ID, s) of the e elected nodes that have the smallest h and then gossip the signatures in the group as a proof of election for the elected node. The signed data (ID, s) can be proof that the e elected nodes are actually elected nodes. Any given node can verify the signed data (ID, s) to determine if a node is an elected node.

After each subcommittee election (i.e., after each committee elects nodes to a subcommittee), the elected nodes can learn the identities of the other elected nodes that belong to the same subcommittee. In some embodiments, this can be done by diffusing over the G overlay network to announce the election winners to all nodes.

In some embodiments, after each subcommittee election, the nodes can perform subcommittee peer discovery. Every node can learn the identities of the elected nodes from each committee. The e elected nodes can gossip the identities and a proof ($f$+1 signed(ID, s)) to all of the nodes, wherein $f$ can be the fraction of nodes that are malicious nodes. If more than e nodes from a committee correctly announce that they were elected, then that committee is dishonest, and all other nodes can determine to not accept any messages from any elected nodes from that committee.

After joining a subcommittee each node in each subcommittee can update the sampler graph to represent the elected nodes and the committees of the next level. The nodes can repeat the above steps to elect nodes from the new committees to form new subcommittees. The nodes may repeat this process until the leader committee is determined. In some embodiments, the node can determine the leader committee based on the sampler graph, wherein the sampler graph indicates a number of nodes in the sampler graph, and wherein the number of nodes in the sampler graph is less than or equal to a predefined threshold. For example, the predefined threshold can be equal to a value of 100. In this case, the maximum number of nodes that may join the leader committee is 100. Therefore, if there are less than or equal to 100 nodes in the subcommittee, then the nodes of the subcommittee can determine to form the leader committee. In other embodiments, the predefined threshold can be equal to a value of 300 or any other suitable value. In some embodiments, the predefined threshold can predetermined by an entity associated with the computer network. In other embodiments, the predefined seed can include information regarding the predefined threshold.

The leader committee, elected from the above protocol, can partition all nodes in the computer network at random into sharding committees, which each can have at least ⅔ non-malicious nodes, and which can store partitions of a distributed ledger as discussed below. In some embodiments, the sharding committees can have much smaller sizes than the leader committee, which can improve transaction latency.

Figure 5:
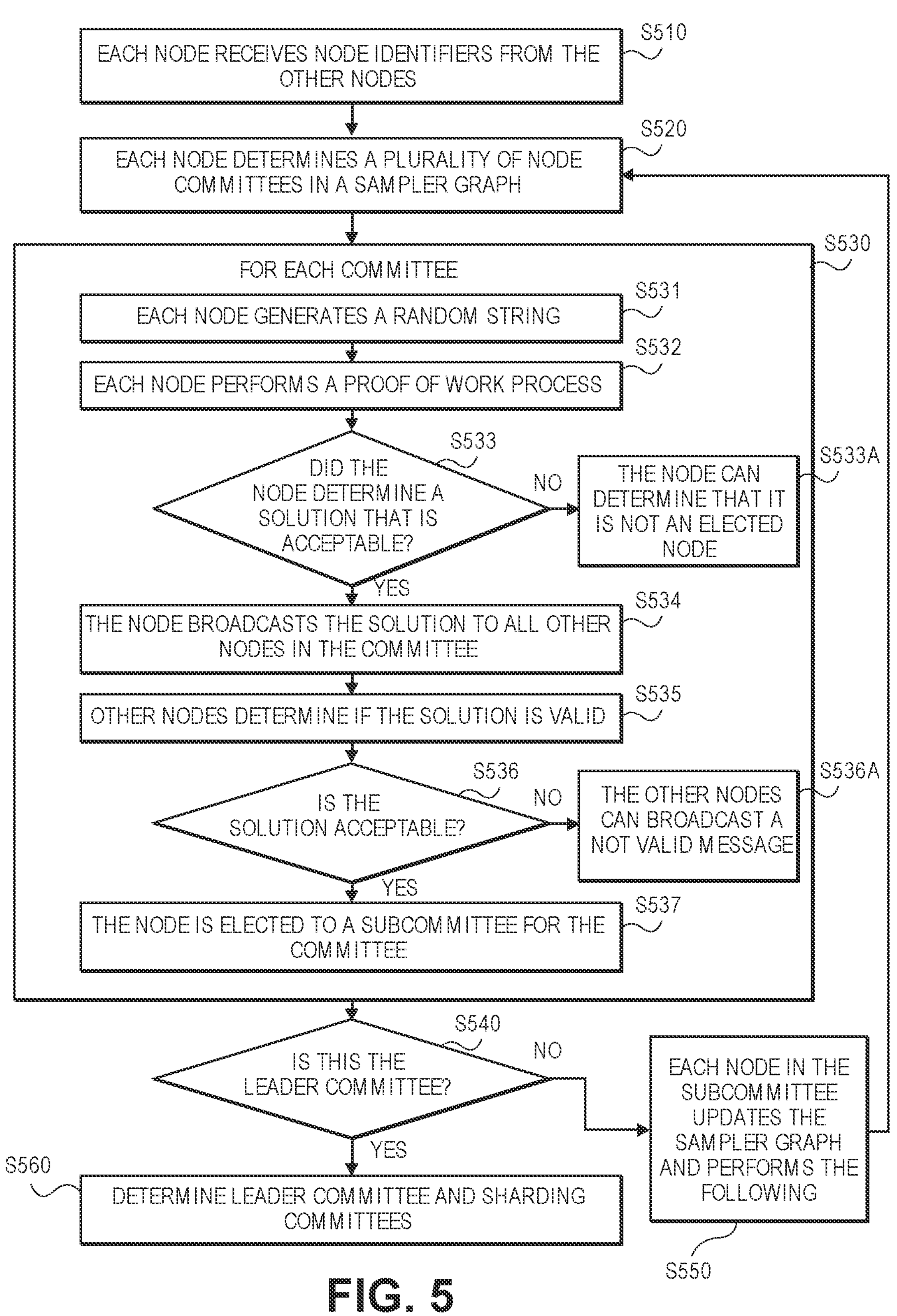
FIG. 5 shows a flow diagram illustrating a setup phase according to an embodiment of the invention.

FIG. 5 shows a flow diagram illustrating a setup phase according to an embodiment of the invention. The method illustrated in FIG. 5 will be described in the context of electing a leader committee in a computer network. It is understood, however, that embodiments of the invention can be applied to other circumstances (e.g., determining a leader in a communications network or an asset transfer network). Although the steps are illustrated in a specific order, it is understood that embodiments of the invention may include methods that have the steps in different orders. In addition, steps may be omitted or added and may still be within embodiments of the invention.

Before step S510, a plurality of nodes can join, or otherwise connect to, a computer network. The plurality of nodes can comprise any suitable number of nodes. Each node of the plurality of nodes can determine a node identifier. In some embodiments, the node identifier can be a public key. A node can establish a node identifier by solving a proof of work process. Each node of the plurality of nodes can broadcast the node's own public key to every other node in the network. The computer network can include a plurality of nodes, each node having a node identifier. The plurality of nodes in the computer network may initialize communications between nodes. For example, in some embodiments, every node can be in operative communication with every other node. In other embodiments, the plurality of nodes in the computer network can create routing tables based on surrounding nodes.

At step S510, each node can receive node identifiers from the other nodes. For example, if there are 200 nodes in the computer network, then each node can receive 199 node identifiers. In some embodiments, each node may be associated with a unique node identifier. A node may transmit a node identifier associated with the node to every other node in the computer network.

At step S520, after receiving node identifiers from the other nodes, each node can determine a plurality of node committees in a sampler graph. In some embodiments, each node can determine the sampler graph locally. In some embodiments, the sampler graph can be determined based on the node identifiers and a predefined seed known by all nodes in the computer network.

For example, a node can determine the sampler graph randomly based on the predefined seed. The predefined seed can be any suitable value previously stored by the nodes in the computer network. The predefined seed can be used to randomly generate edges in a sampler graph that connect nodes in L and committees in R. The nodes in L can be generated from the node identifiers that each node receives. The committees in R can be generated randomly based upon the seed and the node identifiers. For example, each node can generate 7 committees, or any other suitable number of committees, in R based on the predefined seed.

Since each node can store the same predefined seed and the all node identifiers for all nodes, each node can generate the same sampler graph. However, in some embodiments, a malicious node can be included in some honest node's sampler graphs while not other honest node's sampler graphs. This can occur since a malicious node can broadcast its node identifier to some honest nodes and not others.

The plurality of node committees may include any suitable number of committees. In some embodiments, the number of node committees can be less than the number of nodes of the plurality of nodes.

At step S530, after determining the plurality of node committees, the nodes of a node committee can each perform steps S531-S537. Each node committee can independently perform steps S531-S537.

At step S531, after determining the sampler graph, each node of the committee can generate a random string. For example, each node can generate the random string using the GenRand protocol, described herein. Each node in the committee can generate the same random string. The random string can be used in the proof of work process, at step S532, so that the hash functions are new. This can prevent a malicious node from precomputing many hash functions beforehand and then claiming the solutions to the precomputed hash functions are acceptable. The random string can allow for the hash function to be dynamically generated during each election phase.

At step S532, after generating the random string at each node, the nodes can perform a proof of work process. For example, the node can determine a solution to a hash function. The node with the node identifier $ID_1$ can compute $h=H(s\|ID_1)$. The solution to the hash function may be a solution that is acceptable. A solution that is acceptable may be considered to be acceptable if $h\leq 2^{256-d}$. The difficulty value d can be a predetermined value which can be used to determine how many nodes are elected. For example, the difficulty value can be referred to as hard, if only a few nodes can solve the proof of work process and thus be elected. The difficulty value can be referred to as easy, if many nodes can solve the proof of work process and thus be elected. In other embodiments, the difficulty value may change over several epochs. In some embodiments, every node in the committee can perform the proof of work process.

At step S533, the node can determine if its own solution to the proof of work process is acceptable. If the node determines that the solution is not acceptable, then the node can determine that it is not an elected node. If other nodes of the committee are elected to a subcommittee, then the node can terminate the process and, in some embodiments, may wait until a leader committee has been determined. In other embodiments, the node can determine that the solution to the proof of work process is acceptable, as described herein. If the node determines that the solution is acceptable, then the node can proceed to step S534.

At step S534, after determining the solution to the proof of work process that is acceptable, then the node can broadcast the solution to all other nodes in the committee. In some embodiments, the node may receive a second solution from a second node in the node committee. A node can receive any suitable number of solutions from other nodes determined by those nodes.

At step S535, the other nodes can receive the solution to the proof of work process from the node. The other nodes can then determine if the solution is acceptable. For example, the other nodes can determine if the solution solves the proof of work process. In some embodiments, the node can verify if the second solution from the second node is acceptable.

At step S536, if the other nodes determine that the solution to the proof of work process from the node is not valid, then the other nodes can broadcast a not valid message. In some embodiments, the not valid message can comprise the ID of the node and the solution to the proof of work process that the other nodes determined not to be acceptable. The node can receive the not valid message from the other nodes. The node can determine if the not valid message comprises the node's own ID, i.e., if the not valid message is associated with the node. The node can determine that it is not an elected node and wait until the leader committee is determined by the elected nodes.

At step S537, if the other nodes determine that the solution is acceptable, then the other nodes can elect the node to a subcommittee for the committee. In some embodiments, the node can elect the second node to the subcommittee if the second solution is acceptable.

At step S540, the nodes of each subcommittee can determine if the leader committee has been determined. If the leader committee has not been determined, then the nodes may perform step S550. At step S550, if the leader committee has not been determined, the nodes of each subcommittee can update the sampler graph and perform steps S520-S540. After updating the sampler graph, the subcommittees can determine new committees based on the sampler graph, thus moving to the next level in the election graph. As described herein, multiple sampler graphs can be chained together to form an election graph, wherein each sampler graph can include the nodes of a level of the election graph that are connected via edges to committees of the next level. For example, the nodes elected in the first level of the election graph can join subcommittees that update the sampler graph and then form the committees of the second level of the election graph.

At step S560, the nodes of the subcommittee can determine the leader committee. In some embodiments, the node can determine the leader committee based on the sampler graph, wherein the sampler graph indicates a number of nodes in the sampler graph, and where the number of nodes in the sampler graph is less than or equal to a predefined threshold. The predefined threshold may be a maximum number of nodes to join the leader committee.

After determining the leader committee, the nodes of the leader committee $C_0$ can run GenRand, described herein, to generate a random string $r_0$. The nodes of the leader committee $C_0$ can send the random string $r_0$ to all nodes using the overlay network of G (i.e., the plurality of nodes of the computer network). The random string $r_0$ can be used to partition all nodes into non-malicious sharding committees. In some embodiments, the leader committee can create $k=n/m$ sharding committees, wherein each sharding committee comprises $m=c*\log(n)$ nodes, wherein n is the number of nodes in the computer network and c is a constant that can depend on the security of the system. The node in the leader committee can partition the plurality of nodes in the computer network.

After step S560, the nodes in the computer network can perform a neighbor discovery protocol (shown in protocol 2 below). The neighbor discovery protocol can allow the nodes in a committee to determine which nodes are in neighboring committees. In some embodiments, the nodes in a committee can determine the IP addresses of the nodes in neighboring committees, which can later be used when routing messages and/or data. Each node in the computer network can determine which committee to join based on the random string $r_0$ and the node's public key. In some embodiments, each node can perform a proof of work process to determine which committee to join. For example, each node can determine a hash value resulting from the hash function $H(r_0\|PK)$, wherein the random string $r_0$ and the node's public key can be inputs to the hash function. After determining the solution to the proof of work process, the node can determine the last m bits of the solution. The node can join committee $C_k$, where k can be the last m bits of the solution.

After each node determines which committee to join, the nodes of committee $C_{k/2}$ can broadcast addresses of the nodes of committee $C_{k/2}$ to the nodes of committee $C_k$. Each node in $C_k$ can receive addresses of the nodes of committee $C_{k/2}$. An address can comprise an Internet Protocol address (IP) and a committee identifier (e.g., $C_k$, $C_{k/2}$, etc.). After receiving the addresses of the nodes of committee $C_{k/2}$, the nodes of committee $C_k$ can broadcast the addresses of the nodes of committee $C_k$ (e.g., IP and $C_k$) to the nodes of committee $C_{k/2}$. If committee $C_k=C_6$, then $C_{k/2}=C_3$.

After the nodes of committee $C_k$ communicate with the nodes of committee $C_{k/2}$, the nodes of committee $C_k$ can receive addresses of the nodes of committee $C_{2k}$ and can receive addresses of the nodes of committee $C_{2k+1}$. The nodes of committee $C_k$ may then broadcast the addresses of the nodes of committee $C_{2k}$ and the addresses of the nodes of committee $C_{2k+1}$ to all nodes of the computer network.

Protocol 1 and 2, below, show an example of committee election and neighbor discover protocols, respectively, as described herein. Protocol 1 can allow a plurality of nodes to form a leader committee and partition the plurality of nodes into sharing committees in an efficient and secure manner. Protocol 2 can allow the plurality of nodes to determine which committee the nodes are assigned to, as well as the other nodes in the committee.

Protocol 1: Committee Election

Let $\{G(L_1, R_1), \ldots, G(L_l, R_l)\}$ be an election network graph.

1. For each $1 \le i \le l$ for each committee C in $G(L_l,R_l)$:
   (a) The nodes of C run GenRand to choose a random string s.
   (b) All nodes of C sign s and propagate their signature in C.
   (c) For each node of C with public key PK, if $H(s\|PK) \le 2^{\kappa-e}$, then the node broadcasts a message to all members of C announcing itself as an elected member, where e determines the number of parties to elect. The leader can also propagate a proof (s that can be signed by $f+1$ of the members of C).
   (d) All members of C verify the announcements. The leaders in C can learn about all other leaders from other committees. If a committee announces more than e leaders, ignore the announcements and flag that committee as dishonest and set its leaders as empty.
2. Let $C_0$ be the leader committee of G. $C_0$ runs GenRand to generate a random string $r_0$ and sends it to all parties using the overlay network of G. This value can be used to partition all nodes into sharding committees.

Protocol 2: Neighbor Discovery

1. Each party considers $C_k$ as its committee, where k can be the last m bits of $H(r_0\|PK)$.
2. It receives the addresses of members of committee $C_{k/2}$ and send its (IP, $C_k$) to the parties in $C_{k/2}$.
3. It receives the information (IP,C) of the parties in committee $C_{2k}$ and $C_{2k+1}$ and send it to everybody.

Intra-Committee Consensus

Figure 6:
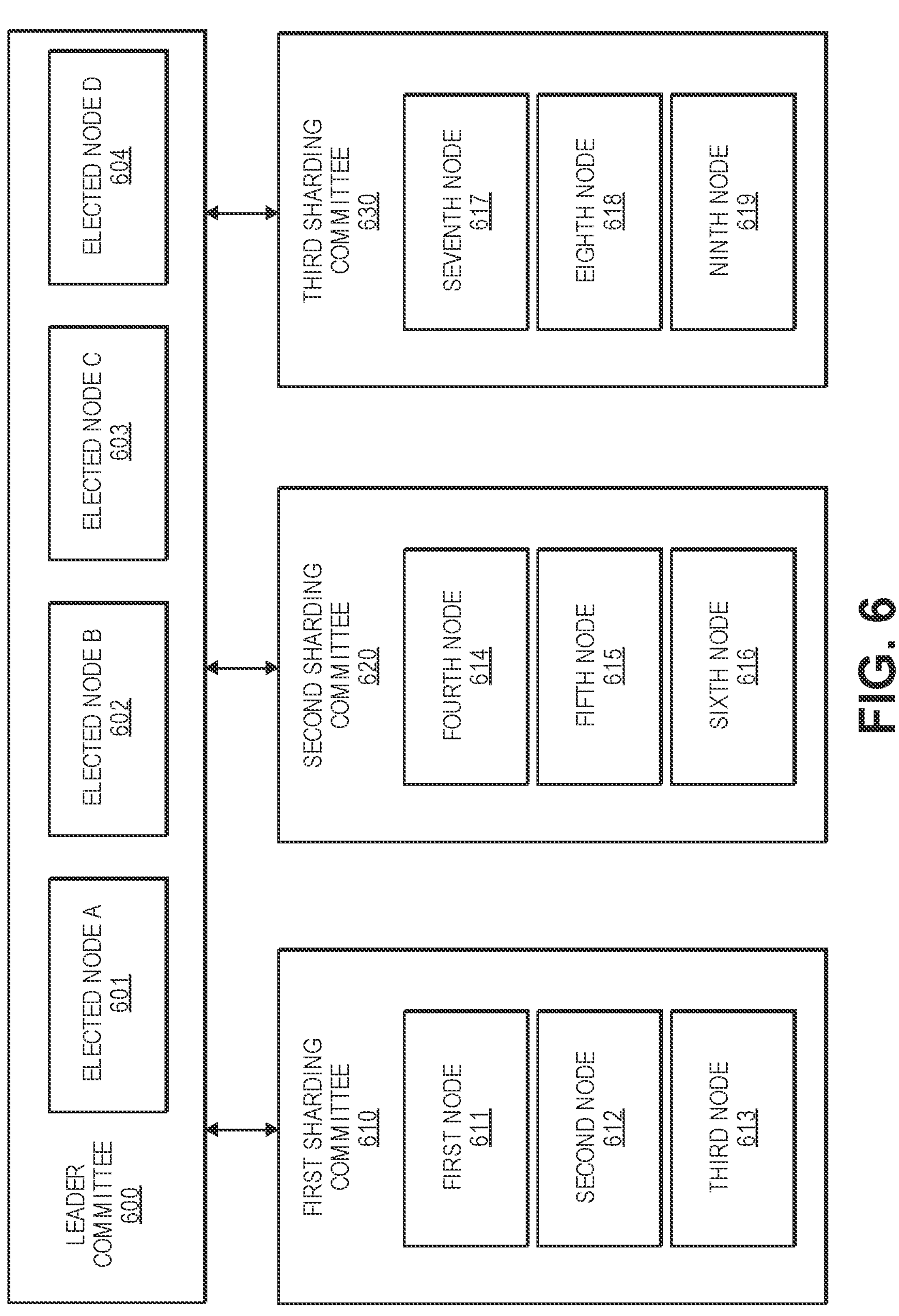
FIG. 6 shows a block diagram illustrating a system including sharding committees according to an embodiment of the invention.

FIG. 6 shows a block diagram illustrating sharding committees according to an embodiment of the invention. FIG. 6 includes a leader committee 600 comprising a plurality of nodes including elected node A 601, elected node B 602, elected node C 603, and elected node D 604. FIG. 6 also includes a plurality of sharding committees comprising a first sharding committee 610, a second sharding committee 620, and a third sharding committee 630. Each sharding committee may comprise a plurality of nodes. For example, the first sharding committee 610 can comprise three nodes 611-613. The second sharding committee may comprise three nodes 614-616. The third sharding committee 630 may comprise three nodes 617-619. Each committee can comprise any suitable number of nodes. For example, a committee can include more than 5 nodes. In other embodiments, a committee can include 250 nodes.

The leader committee 600 may be in operative communication with the first sharding committee 610, the second sharding committee 620, and the third sharding committee 630. In some embodiments, the sharding committees may be in operative communication with one another.

The leader committee 600 can determine the sharding committees as described herein. For example, as shown in protocol 2, the leader committee 600 can generate a random string $r_0$ and transmit the random string $r_0$ to every node in the computer network. Every node can then perform a proof of work process using the nodes' own node identifier and the random string $r_0$. The last m bits of the solution to the proof of work can be the sharding committee that the node is assigned to. For example, a node can determine which sharding committee to join based on the random string $r_0$ and the node identifier. If the last m bits of the solution is equal to 001, then the node can determine to join committee 001. The last m bits can be any suitable number of bits.

The first sharding committee 610 may store a shard of the blockchain. For example, the nodes 611-613 in the first sharding committee 610 may each store a shard of the blockchain in a memory or database associated with each node 611-613. The first node 611, the second node 612, and the third node 613 may store the same shard of the blockchain and, in some embodiments, may come to a consensus on new blocks before adding the new blocks to the shard of the blockchain. The first sharding committee 610, the second sharding committee 620, and the third sharding committee 630 may store different shards of the blockchain. In some embodiments, the shards of the blockchain stored at every sharding committee may make up the total blockchain.

Client computers, external to the computer network, may submit interactions to the computer network. A client computer may transmit the interaction to a verifier committee.

For example, the client computer may transmit the interaction to the first sharding committee 610, wherein the first sharding committee 610 may be a verifier committee that can verify the interaction.

One advantage of embodiments of the invention may be that interactions submitted to the system by a client computer can be processed by a single committee running an intra-committee consensus to approve and add the interaction to the blockchain. When the client computer requests to add an interaction to the ledger, using the routing protocol described below, the client computer can contact a verifier committee designated to the interaction. Each node in the verifier committee can check if the suggested interaction is valid and can then generate a block of all the valid interactions received by the committee in that epoch to add to the blockchain. In some embodiments, each node can maintain copy of the blockchain shard designated to its committee and can decide independently whether to add certain interactions to the blockchain shard. The honest nodes in the committee can have the same local view of the blockchain shard, which can represent the current state of the blockchain shard for the committee.

In some embodiments, when a client computer wants to submit an interaction to the computer network, the client computer can first obtain a list of multiple nodes (see section VII below), and can send interaction data to multiple (e.g., 8 or more) nodes that it obtains via nodes in the committee at random and submits the interaction data to those nodes. If the contacted node is malicious, then the interaction may not be processed. The client computer can then submit the interaction data to another party and can repeat until the client computer contacts an honest node. Inside each committee, the nodes that received interaction data from the client computer can suggest to add the interaction to the next block. To do this, the node can reliably broadcast the suggested interaction to all other nodes in the committee.

The intra-committee consensus protocol can have two building blocks: (1) a gossiping protocol which can be used to propagate the messages (e.g., interactions and blocks) to all the nodes of the committee; (2) an agreement protocol that can be used to agree on the header of the block and finalize the interactions in it.

In some embodiments, the above consensus protocol can be an atomic broadcast protocol which embodiments of the invention can use to send new interactions to all committee members (i.e., the nodes in a sharding committee). Embodiments of the invention can be a modification of the reliable broadcast protocol presented by Cachin and Tessaro [Christian Cachin and Stefano Tessaro. Asynchronous verifiable information dispersal. In Proceedings of the 19th International Conference on Distributed Computing, DISC'05, pages 503-504, Berlin, Heidelberg, 2005. Springer-Verlag.], which extends the broadcast protocol of Bracha and Toueg [Gabriel Bracha and Sam Toueg. Asynchronous consensus and broadcast protocols. Journal of the ACM (JACM), 32(4):824-840, 1985.] with erasure codes to improve performance for larger messages. The original protocol of [Gabriel Bracha and Sam Toueg. Asynchronous consensus and broadcast protocols. Journal of the ACM (JACM), 32(4):824-840, 1985.] requires $O(n^2)$ messages and $O(mn^2)$ total communication cost to broadcast a message of size m to n parties. The construction in [Christian Cachin and Stefano Tessaro. Asynchronous verifiable information dispersal. In Proceedings of the 19th International Conference on Distributed Computing, DISC'05, pages 503-504, Berlin, Heidelberg, 2005. Springer-Verlag.] improves the communication to $O(mn+hn^2 \log(n))$ where h is the size of a hash proportional to a security parameter. Methods according to embodiments of the invention can achieve better concrete communication performance when the number of nodes is also large.

M can be a message to be gossiped from a node (i.e., sender) to $d$ neighboring nodes, $f$ fraction of which can be corrupt. Moreover, K can be the number of chunks that the sender can break the large message into. First, the sender can divide M into $(1-f)\kappa$ equal sized blocks $M_1, M_2, \ldots, M(1-f)\kappa$ and can perform an erasure code scheme (e.g., Read-Solomon erasure code) to create additional $f\kappa$ parity blocks which can be added to the original blocks to obtain $M_1, M_2, \ldots, M_k$. If the sender is honest, the original message can be reconstructed from any set of $(1-f)\kappa$ blocks among those.

Next, the sender can compute a Merkle tree which has leaves $M_1, \ldots, M_k$. $T(M_i)$ can be the hash of the leaf block $M_i$, and $T(M_i, M_j)$ to be the hash stored in the first common parent of $M_i$ and $M_j$. $Sib(M_i)$ can be all sibling nodes of the nodes on the path from the root of the Merkle tree to the leaf associated with $M_i$. Thus, $T(M_i)$, $T(M_i, M_\kappa)$ and $Sib(M_i)$ are the parts of the Merkle tree used to verify the validity of $M_i$. The sender can gossip $M_i$, $T_i(M_i)$ and $Sib(M_i)$ for all $1 \leq i \leq \kappa$ by sending a unique set of k/d chunks to each of the neighboring nodes and then those neighboring nodes can send chunks to their neighbors as well. Each node can verify the message it receives using the Merkle tree information and the tree root. Once a node receives $(1-f)\kappa$ valid chunks it is able to reconstruct the message M.

It is also possible to optimize the above gossiping protocol by slightly modifying it as follows. The modification of the above protocol is based on the observation that if the sender sends $Sib(M_i)$ to node $P_i$ for every i, the Merkle hashes near the root of the tree are sent to almost all the parties. For example, half of the nodes receive $T(M_i, M_{\kappa/2})$. Instead, for any intermediate hash node $T(M_i, M_j)$, it would be sufficient to send it to a smaller subset of the nodes. The sender chooses a random subset of size $d/(1-f)$ of the neighboring nodes and sends the hash to the nodes in that subset. This process can be called sparsification. As a result, a node can receive a message from the sender that does not contain all of the hashes needed to verify the validity of the sent block, therefore the party may not be able to validate the block immediately. However, since at least one honest party receives each intermediate node, it can forward guarantees that all the nodes can have the correct intermediate node.

At each round r, each committee can have a leader node $L_r$ chosen uniformly at random that can be responsible to lead the consensus protocol. First, the leader node $L_r$ can gather all of the interactions that the leader node $L_r$ has received into a block $B_r$. The leader node $L_r$ can gossip the body of the block, using the gossiping for large messages protocol described herein, as well as the root of the Merkel tree from the gossiping of the block. Next, the leader node $L_r$ can run the consensus protocol on the header of all the pending blocks, including the one that the leader node $L_r$ creates in this round.

In some embodiments, the block can be a pending block. A block can be a pending block if it is proposed by a leader node $L_r$ at some previous round, but there are still honest nodes that have not terminated the consensus protocol for it. For all pending block headers H, the leader node $L_r$ can propose a safe value. A safe value can be a value that a majority of nodes agree on. A value can be considered as a safe value when a majority of nodes agree on the safe value. In contrast, an unsafe value can be a value that not all nodes agree on. In some embodiments, a block header can include a hash of the previous block, a timestamp, a difficulty target, a nonce, and/or a Merkle root. For a new block, any value can be considered safe, but an honest leader node $L_r$ can propose the correct block header so the block can get accepted by all other honest nodes in the computer network. If the block header does not match the block, all honest nodes can consider that block as a null block and will only reach agreement on the header and ignore the interactions inside the block body. If honest nodes do not receive a safe value for the pending block header from the leader node $L_r$, they can consider the leader node $L_r$ as a dishonest node and set the value for the header as null.

The other nodes that receive the proposed message, propose<H, r>, from the leader node $L_r$ for all the pending block headers can verify if the header H is valid. For example, the nodes can verify if the header H matches the proposed block. The nodes that receive the propose message, propose<H,r>, can echo (i.e., broadcast without changing) the header echo<propose<H,r>>. An echo propose message can contain the same information as the propose message. Nodes can receive a propose message and then broadcast the echo propose message. At the end of this round, if an honest node receives one valid propose header from the leader and $f+1$ echoes, the node can accept the block header all other nodes by gossiping the node's accept message.

In some embodiments, a node can receive more than one valid "propose<H, r>" or "echo<propose<H,r>>" for different values of H but with the same round number r from the leader node $L_r$. The node can consider the leader node $L_r$ as dishonest and then gossip "pending<H, r>", which can indicate that the header H is still pending. In other embodiments, the node can receive $f+1$ valid messages (i.e., votes) for <H, r>, indicating that the header H is valid. $f$ can be the fraction of malicious nodes. In some embodiments, $f$ can be ⅓ or less.

Each echo "echo<propose<H, r>>" message for the same proposed value in current round from a single node can be considered as one vote towards the validity of the header H. The node can then accept the value H and gossips the "accept<propose<H, r>>, proof" and removes it from the nodes pending blocks list. The proof can be a data item that indicates that the header H is proved to be valid. In some embodiments, the proof can be an aggregate of node signatures. For example, a node can sign the proposed message if it is valid and then send the signed proposed message to the leader node $L_r$.

If a node receives a valid "accept<propose<H,r>>, proof" message from another node, the node can change the other nodes vote to <H, r>. For example, in some embodiments, a node can store a list of votes from the nodes in the committee. If the node receives a valid "accept<propose<H, r>>, proof" message from a second node, the node can edit the list of votes to indicate that the second node voted for the header H. The node can determine to accept the propose<H, r> message if the list of votes indicates that $f+1$ other nodes have voted for the header H.

Protocol 3, below, shows an example intra-committee consensus protocol, as described herein. The following intra-committee consensus protocol can allow a node to create a block of interactions and for the committee to reach consensus on the block of interactions.

Protocol 3: Intra-Committee Consensus

1. Create a block of interactions and gossip it to the committee.
2. Consensus on pending block headers, for each pending block header H for round r.
   (a) Leader can gossip a "propose<H,r>" for a safe value of H for round r with a "proof" message that shows the value is safe, i.e., the proof contains $f+1$ votes for <H,r>.
   (b) The node that receives a valid "propose<H,r>" can gossip the "echo<propose<H, r>>" message.
   (c) If the node receives more than one valid "propose<H,r>" or "echo<propose<H, r>>" for different values H but same round number r from the leader, the node can consider the leader as dishonest and gossip "pending<H,r>".
   (d) Else, if the node receives $f+1$ valid votes for <H, r> (In addition to votes the party receives before from the accept messages, each "echo<propose<H, r>>" messages for the same proposed value is in current round is considered as one vote), the node accepts the value H and gossips the "accept<propose<H, r>>,proof" and removes it from the nodes pending blocks list.
   (e) If a node receives a valid "accept<propose<H,r>>, proof" message from another party, the node changes the other nodes vote to <H, r>.

As a result, a node may receive a message from the broadcaster that may not contain all of the hashes needed to verify the validity of the sent block, therefore the node may not be able to validate the block immediately. However, if at least one honest node receives each intermediate node, it can forward its message and this can allow all of the nodes to have the correct intermediate node. In section VII.B it can be shown that it can suffice to send each intermediate node to a number of nodes sublinear in the depth of the tree to guarantee that the event that a node cannot verify the blocks it needs for reconstruction happens with negligible probability. There can be a trade-off between the number of nodes receiving intermediate nodes in the tree and memory used at each node.

Reconfiguration Phase

In an open access network, nodes may be able to join and leave the network freely. Embodiments of the invention can provide a mechanism to handle churn efficiently in the computer network. There are two major challenges when a new node joins the computer network. First, the adversary can use the churn as a potential method to introduce new dishonest IDs to the network (e.g., Sybil attack). To prevent the Sybil attack, new nodes that join the computer network can solve a proof of work process. Second, nodes joining and leaving the computer network can affect committee distribution and may make the committees unreliable. Methods according to embodiments of the invention can handle churn in the adjust phase.

The adjust phase, also referred to as the reconfiguration phase, can include a method comprising: receiving, by a first node in a computer network, in a first committee a request including a node identifier to join the committee by a second node; providing, by the first node of the first committee to the second node, a proof of work process to the second node; receiving, by first node of the first committee, a solution to the proof of work process from the second node, wherein the nodes in the first committee verifies the solution; generating, by the first node of the first committee a random string, which is used by the first node to determine a second committee for the second node; introducing, by the first node to second committee, the second node, wherein the second committee displaces a node to allow the second node to join the second committee; communicating, by the first node, information regarding the second node being in the second committee to other nodes in the computer network.

Figure 7:
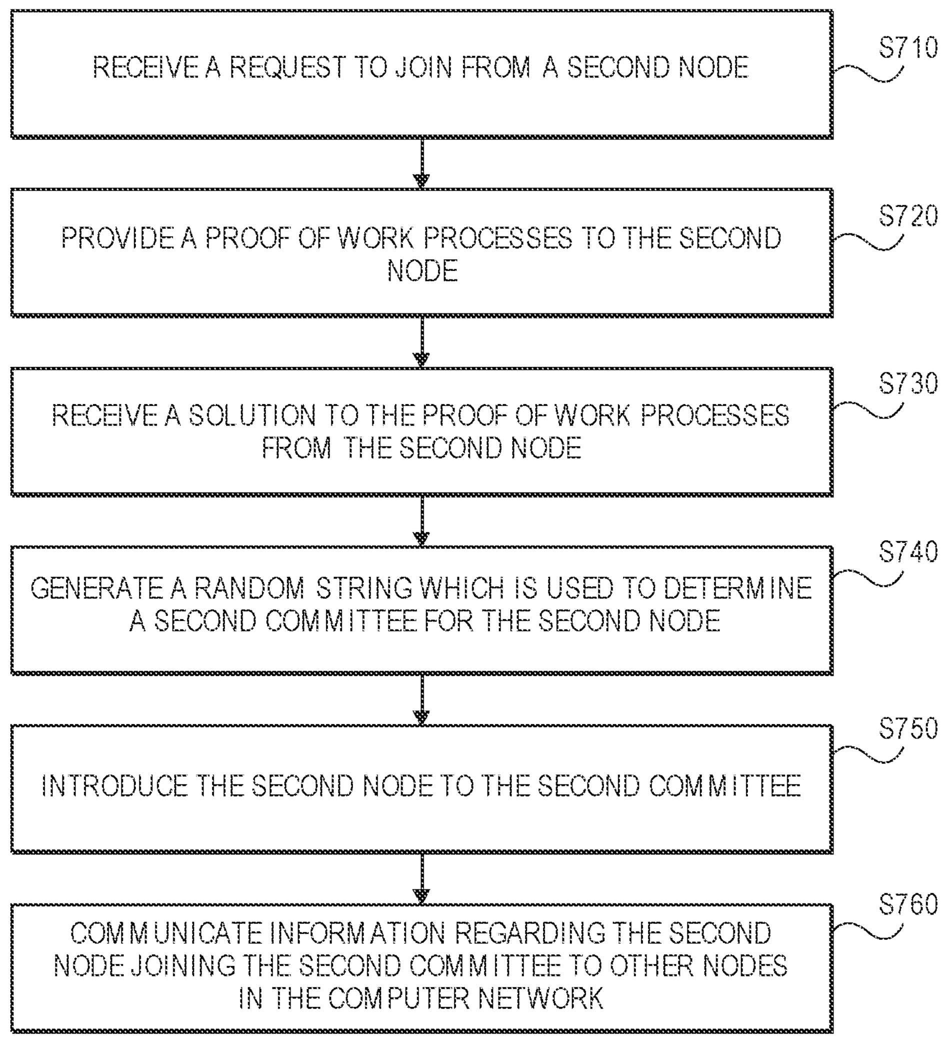
FIG. 7 shows a flow diagram illustrating a reconfiguration phase according to an embodiment of the invention.

FIG. 7 shows a flow diagram illustrating a reconfiguration phase according to an embodiment of the invention. The method illustrated in FIG. 7 will be described in the context of adding a new node, referred to as a second node, to the computer network. It is understood, however, that embodiments of the invention can be applied to other circumstances. Although the steps are illustrated in a specific order, it is understood that embodiments of the invention may include methods that have the steps in different orders. In addition, steps may be omitted or added and may still be within embodiments of the invention.

Embodiments of the invention can use a proof of work approach to protect against Sybil attacks on the computer network. A new node (i.e., a second node) that wants to join the computer network comprising a leader committee and a plurality of committees can solve a proof of work process that can be generated based on a fresh randomness in each epoch. This can be beneficial as it prevents a malicious party from solving many proof of work processes ahead of time in order to compromise the committees.

At step S710, any second node (i.e., a new node) can contact the nodes of one of the committees and can request a fresh proof of work process at any time. The second node can transmit a request to the nodes of one of the committees. In some embodiments, the second node can transmit the request to a single node, referred to as a first node. The first node in a first committee in the computer network can receive the request including a node identifier to join the committee by the second node.

At step S720, after receiving the request to join, the nodes of the first committee can generate a random value. In some embodiments, the nodes of the first committee can generate the random value using GenRand, described herein. The GenRand algorithm can consist of two phases: commit and reveal. The commit phase may be the more expensive of the two in practice. In some embodiments, the commit phase can be executed in advance before the nodes in the first committee receive the request. Thus, each node of the first committee can run, in advance, the commit phase of the random generation for many values, and upon a request the nodes of the first committee can complete the reveal phase to obtain one of the already committed random values.

The nodes of the first committee can then transmit the random value and a time stamp to the second node. In some embodiments, the first node of the first committee can provide a proof of work process to the second node. The second node can solve a proof of work process using the timestamp and the random value. If the second node determines a solution that is acceptable, then the second node can transmit the solution to the nodes of the first committee. For example, the second node can determine a solution x such that the hash function H(timestamp II PK II x) is less than the security value $2^{\gamma-d}$ and sends x to the first committee. The inputs of the hash function H can include the timestamp, the public key of the second node (i.e., node identifier), and the nonce x.

At step S730, the first node of the first committee can receive the solution to the proof of work process from the second node, wherein the nodes in the first committee verify the solution. The nodes of the committee can verify that the second node solved the proof of work process in a predefined amount of time and that the solution is acceptable. If the nodes of the committee determine that the second node determined an acceptable solution during the predefined amount of time, then the nodes of the committee can proceed to assign the second node to a committee in the computer network. In some embodiments, the plurality of nodes in the first committee can verify the solution if the solution solves the proof of work process, is less than a predetermined security value (e.g., $2^{\gamma-d}$), and is received during a predetermined amount of time.

Embodiments of the invention allow for a new node to solve the proof of work process without making the protocol stop and wait for the solution of the proof of work process. In this way, the expensive proof of work sub-algorithm can be performed on the side without impacting the latency of the consensus protocol, which thus increases the overall throughput of the protocol. This improves on the approach used in Elastico [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM.] which requires that the protocol wait for the PoW randomness of each epoch after churn and run the whole committee election again. The Elastico protocol decreases the throughput and adds an extra $\Omega(n)$ communication cost.

After the nodes of the committee determine that the new node solved the proof of work process, the computer network can perform committee reconfiguration. However, some challenges can be addressed. Partitioning the nodes into committees for scalability introduces a new challenge when dealing with churn. Malicious nodes could strategically leave and rejoin the computer network, so that eventually they can take over one of the committees and break the security guarantees of the protocol.

One approach to prevent this attack can be to re-create all the committees periodically faster than the adversary's ability to generate churn. However, there are two drawbacks to this solution. First, regenerating all the committees can be very expensive. Second, maintaining blockchain partitions, one for each committee, can be very challenging when all the committee members may change after each epoch.

To handle the churn problem, embodiments of the invention can re-randomize the committee members after join and leave of the nodes. In some embodiments, a small number of nodes can change committees, which can be much more efficient than re-generating all of the committees. Methods according to embodiments of the invention can use a modified version of the cuckoo rule [Baruch Awerbuch and Christian Scheideler. Towards a scalable and robust DHT. In Proceedings of the Eighteenth Annual ACM Symposium on Parallelism in Algorithms and Architectures, SPAA '06, pages 318-327, New York, NY, USA, 2006. ACM., and S. Sen and M. J. Freedman. Commensal cuckoo: secure group partitioning for large-scale services. ACM SIGOPS Operating Systems Review, 46(1):33-39, 2012.], referred to as a bounded cuckoo rule, to enable the redistribution of the nodes of the committees.

At step S740, after the nodes of the first committee verify the solution of the second node, the first node can generate a random string which can be used by the first node to determine a second committee for the second node. In some embodiments, the first node can generate the random string using the GenRand protocol described herein. In some embodiments, each node of the first committee can generate the random string. The first node may determine the second committee by determining a random committee in the sampler graph using the random string.

At any suitable point of time the committees of the computer network can determine a set of the largest m/2 committees to be an active committee set A, where m can be the number of committees. The remaining m/2 committees, with smaller sizes, can be part of a set of inactive committees I. In this way, the half largest committees can be included in an active committee set A and the half smallest committees can be include in the inactive committee set I.

In some embodiments, when the second node requests to join the computer network, the second node may be able to discover the identities of the nodes in one of the committees (e.g., the first committee). In some embodiments, the first committee can be an access point committee denoted by $C_a$. When the second node requests to join the network, the second node can contact all of the nodes of the access point committee $C_a$.

At step S750, after the first node generates the random string, the first node can introduce the second node to the second committee, wherein the second committee can displace a node in the second committee to allow the second node to join the second committee. The access point committee $C_a$ can determine a random committee $C_b$ from the active committee set A, called a primary assignment committee for the second node. The access point committee $C_a$ can inform the second node and the nodes of the primary assignment committee $C_b$ about the new assignment. The primary assignment committee $C_b$ can accept the join and at the same time can evict a constant number of nodes of the primary assignment committee to other committees randomly chosen among the inactive committees in the set of inactive committees I, which can be called secondary assignment committees.

In some embodiments, the second committee (i.e., assignment committee) can displace a random number of nodes of the second committee based on a random value generated by a leader committee. The nodes that are displaced can be displaced nodes. The displaced nodes can determine which committee to join based on the random value. The displaced nodes can be assigned to random inactive committees in the set of inactive committees I.

At step S760, after introducing the second node to the second committee, the first node can communicate information regarding the second node being in the second committee to the other nodes in the computer network.

The committees in the computer network can have a number of properties during churn. There can be two invariant properties of the system committees, which are maintained during the churn protocol. At any point of time the system committees can be balanced and honest. The first property means that there may not be much deviation in the sizes of the committees in the system which may concentrated around ½c log n for some constant c. The second property can be that each committee can have at least ⅔ of its nodes be non-malicious nodes. Due to this, the committees can successfully run the consensus protocol when handling blockchain interactions.

Protocol 4, below, describes an example of the adjust phase as described herein. The adjust protocol can allow the computer network to handle new, joining nodes, while preventing Sybil attacks.

Protocol 4: Adjust

1. Puzzle Generation
   (a) Each committee runs GenRand to generate a random string $r_i$.
2. Join
   (a) New party P chooses locally a public key PK and contacts a random committee $C_a$ to request a proof of work process.
   (b) C sends $r_i$ along with a timestamp to P.
   (c) P finds a nonce x such that the solution of the hash of the timestamp, the public key, and the nonce is less than a security value (i.e., $O=H(\text{timestamp}\|PK\|x)\leq 2^{\gamma-d}$) and sends x to C.
   (d) C confirms the solution if it received it during a valid time slot. The members of C run GenRand to generate a new random string s, which determines the committee $C_b$ among the active committees in A which for P will be joining.
3. Cuckoo Exchange
   (a) $C_a$ contacts $C_b$ to introduce P.
   (b) $C_k$ chooses a constant number k parties to be evicted and to k committees chosen uniformly random among the set of inactive committees I.
   (c) The new state of the committees are propagated to their neighbor committees in the system.

In some embodiments, there can be a reference committee $C_R$ that can check the proof of work solutions of all the nodes in the computer network. In this embodiment, the reference committee $C_R$ can be the only committee that generates the random string at step S720. At the start of each epoch the reference committee $C_R$ can create a list of all the current active nodes for a block and the assigned committees and add the list to the first block of each epoch. The reference committee $C_R$ can also inform other committees by sending this block to all other committees so they can also add the data in their first block.

At each epoch, the nodes of the reference committee $C_R$ can determine a random number (e.g., via GenRand). The nodes of the reference committee $C_R$ can then transmit the random number and a timestamp to a second node, when the second node requests to join the computer network. In this case, the reference committee $C_R$ can perform the reconfiguration method described herein.

If there is a reference committee $C_R$, then the reconfiguration phase may be performed as follows. The reference committee $C_R$ can perform random generation during epoch i−1 by first generating a random string $r_i$ for the next epoch. The nodes of the reference committee $C_R$ can reveal $r_i$ to the other nodes of the computer network at the end of epoch i−1. During epoch i, all committees at the start of round i can receive the random string $r_i$ from the reference committee $C_R$. A second node can locally generate a public key PK. The second node can contact a random committee C to request a proof of work. The committee C can transmit the random string $r_i$ for the current epoch, a timestamp, and the addresses of a number of random nodes in the reference committee $C_R$ (e.g., 16 IP addresses) to the second node. All of the nodes of the computer network can determine x such that $O=H(\text{timestamp}\|PK\|r_i\|x)\leq 2^{\gamma-d}$, as described herein. The nodes can then transmit x to the reference committee $C_R$. The reference committee $C_R$ can confirm the solutions received from every node before the end of the epoch i.

After confirming the solutions, during round i+1, the nodes currently in the reference committee $C_R$, that were also in the reference committee $C_R$ during epoch i, can determine the value $r_{1+1}$. During epoch i, the nodes of the reference committee $C_R$ received all of the confirmed interactions for the active nodes of round i+1. The nodes of the reference committee $C_R$ can create the list of all active nodes for round i+1 and also create A (i.e., the set of active committees) and I (i.e., the set of inactive committees). The reference committee $C_R$ can use the random value $r_{i+1}$ to assign a committee in A for each new node. For each committee C with a new node, the reference committee $C_R$ can choose a constant k nodes of the committee C uniformly at random (e.g., using $r_{i+1}$ as a seed) and evict the k nodes. For all of the evicted nodes, the reference committee $C_R$ can determine a committee in I, uniformly at random, and assign the evicted node to a different committee. The reference committee $C_R$ can then add $r_i$ and the a new list of all of the nodes and their assigned committees and add it to the first block of that epoch. The reference committee $C_R$ can gossip the first block of that epoch to all of the committees in the computer network.

Consensus Phase

In this section, a mechanism by which methods according to embodiments of the invention can reduce the storage usage of each node by dividing the blockchain into partitions, each partition stored by one of the committees, can be described. While sharding the blockchain can reduce the storage overhead of the blockchain, it makes the verification of interactions challenging because inputs and outputs of each interaction might reside in multiple committees.

In this part of the protocol, client computers can submit interactions to the computer network and the interactions can be added to the blockchain. Embodiments of the invention use a new blockchain sharding protocol that can split the blockchain among different committees. New interactions can be submitted to the committees handling the corresponding shard (i.e., partition of the blockchain). The committee can then run an intra-committee consensus protocol to approve the interaction and add it to the shard of that committee. This section presents the sharding protocol and also presents an optimized intra-committee consensus protocol from section IV.C.

The consensus phase can include a method comprising: receiving, by a first node in a committee, an interaction request, the interaction request including interaction data from a client computer; incorporating, by the first node, the interaction data along with other interaction data associated with other client computers into a block comprising interaction data, wherein the block includes block parts; broadcasting, by the first node, the block to other nodes in the committee, wherein the other nodes in the committee verify the block; and incorporating the block into a shard of a blockchain managed by the committee.

Figure 8:
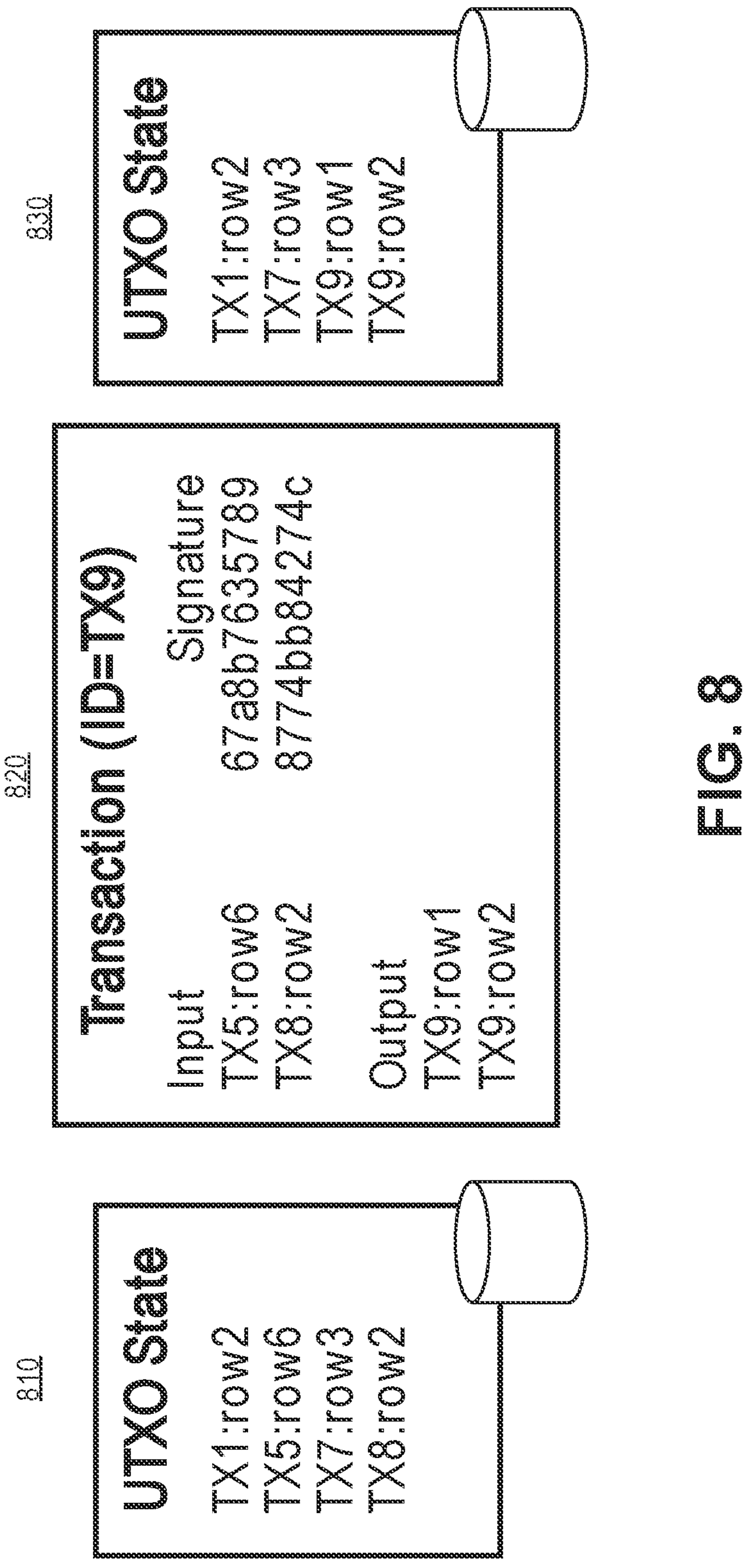
FIG. 8 shows a block diagram illustrating transaction parts according to an embodiment of the invention.

In Bitcoin, each transaction has a unique identity and it has a list of inputs (depicted by their identities) and a list of outputs that is shown by the transaction ID and the row number. FIG. 8 shows a block diagram illustrating transaction parts according to an embodiment of the invention. FIG. 8 includes an initial UTXO state 810, a transaction 820, and an output UTXO state 830. FIG. 8 is described in reference to a ninth transaction (TX9). However, it is understood that embodiments of the invention can be applied to other circumstances, for example, other transactions as well as interactions such as file transfers.

The initial UTXO state 810 may be the initial unspent transaction outputs from previous transactions. For example, the initial UTXO state 810 references a first transaction TX1 associated with a second row, row2. The initial UTXO state 810 also references a fifth transaction TX5, a seventh transaction TX7, and an eighth transaction TX8. These previous transactions TX1, TX5, TX7, and TX8 may be associated with previous transactions that are stored in the blockchain. In some embodiments, each previous transaction may be stored in different shards of the blockchain. For example, the first transaction TX1 may be stored in the first sharding committee 610, whereas the fifth transaction TX5 may be stored in the second sharding committee 620.

The inputs to a transaction, in the initial UTXO state 810, can be unspent transaction outputs (UTXOs) which can be unused digital assets from previous transactions. The outputs of the transaction, in the output UTXO state 830, can also be unused digital assets, such as new coins generated for the recipients of the exchanged money. After receiving a transaction, the nodes can verify if a transaction is valid by checking (1) if the input is unspent and (2) if the sum of outputs is less than the sum of the inputs. The nodes can add the valid transaction to the next block that they are accepting.

Figure 9:
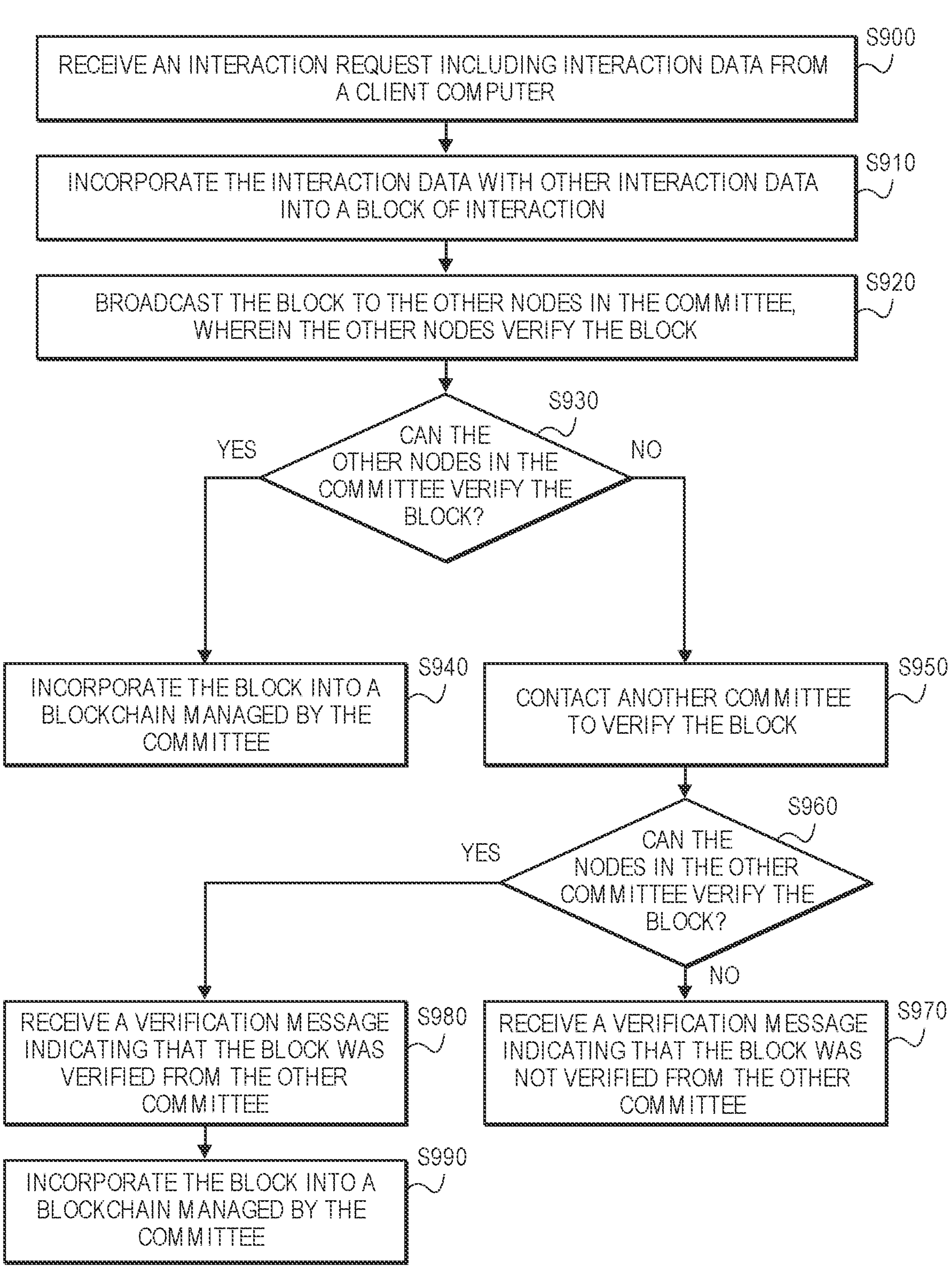
FIG. 9 shows a flow diagram illustrating a consensus phase according to an embodiment of the invention.

FIG. 9 shows a flow diagram illustrating a consensus phase according to an embodiment of the invention. The method illustrated in FIG. 9 will be described in the context of reaching consensus for a transaction. It is understood, however, that embodiments of the invention can be applied to other circumstances. Although the steps are illustrated in a specific order, it is understood that embodiments of the invention may include methods that have the steps in different orders. In addition, steps may be omitted or added and may still be within embodiments of the invention.

Methods according to embodiments of the invention can partition the transactions based on their transaction ID among the committees which can store the transaction outputs in UTXO databases at each node. In some embodiments, the transaction ID can be an interaction ID. Each committee can store transactions that have the committee ID as their prefix in the transaction IDs. In some embodiments, there can be different committees participating in verifying if a transaction, Tran, is valid and can then add it to the shard of that committee.

There may be two types of committees. The first type of committee can be a source committee that can store the UTXO related to inputs of Tran. The second type of committee can be a verifier committee that can verify if the transaction Tran is valid. The verifier committee can also store the outputs (UTXOs) of the transaction. In some embodiments, these committees can be a temporarily role and each committee can serve either as a source or as a verifier in the protocol depending on the transaction.

In some embodiments, the client computer may not attach a proof to the interaction that it submits to the computer network. Instead, the client computer can communicate with any committee and send the interaction to the verifier committee. At each round, the verifier committee can combine the interactions that use UTXOs belonging to the same source committee into batches and can send a single UTXO request to the source committee. The source committee can check the validity of each UTXO. The source committee can then send the result of the batch to the verifier committee. Since multiple UTXO requests are batched into the same request, a result can be generated for multiple requests at the verifier committee.

At step S900, a first node in a committee can receive an interaction request, the interaction request including interaction data from a client computer. In some embodiments, the interaction data associated with an interaction can relate to a transaction such as a transfer of digital assets from one party to another. For example, interaction data can relate to a transfer of twenty dollars from the client computer to another client computer.

At step S910, the first node can incorporate the interaction data along with other interaction data associated with other client computers into a block of interaction data. For example, the first node can receive interaction data from many client computers, the interaction data associated with many different interactions. The interaction data for example, may include a transaction amount and unspent transaction outputs (UTXOs) (i.e., block parts). In some embodiments, the first node can generate a list of all block parts to be verified. For example, the first node can generate a list of block parts including a first UTXO corresponding to first interaction data, a second UTXO corresponding to second interaction data, and a third UTXO corresponding to third interaction data. The list of block parts can include block parts to be verified.

At step S920, after incorporating the interaction data into a block of interaction data, the first node can broadcast the block of interaction data to other nodes in the committee, wherein the other nodes in the committee can verify the block. In some embodiments, the first node can receive other blocks from the other nodes in the committee, the other blocks comprising other interaction data.

At step S930, the other nodes in the committee can verify the block. The other nodes can verify the block using any suitable method described herein, for example, the nodes can verify the block by determining if the inputs are valid. A node can determine if the inputs, such as UTXO's, correspond to previously validated interactions. The nodes can also determine if the sum of the outputs is less than the sum of the inputs. If the sum of the outputs is less than the sum of the inputs, then the nodes can verify the block. If the other nodes in the committee verify the block, then the process can continue to step S940. However, if the other nodes in the committee cannot verify the block, then the process can continue to step S950.

At step S940, if the other nodes in the committee can verify the block, then the other nodes and the first node can incorporate the block into a blockchain managed by the committee (i.e., a shard). The first node can incorporate the block into the shard of the blockchain. In some embodiments, a leader node of the committee can incorporate the block into the shard of the blockchain. Step S940 can correspond to the case wherein the source and verifier committees can be the same committee, and each node in the committee can verify the interaction locally.

At step S950, if the other nodes in the committee cannot verify the block, then the first node can contact another committee to verify the block. In other embodiments, the leader node of a verifier committee can contact another committee, which can be the source committee, to verify the block. Methods according to embodiments of the invention can facilitate communication between source and verifier committees. The verifier committee can determine which committee is the source committee. In some embodiments, the verifier committee can determine the source committee based on the interaction ID. The first n bits of an interaction ID can correspond to a source committee. For example, the beginning of an interaction ID, associated with the interaction that needs to be verified, can be 0x011, which can correspond to a third committee. As another example, each interaction that includes an interaction ID beginning with 0x111 may be associated with a seventh source committee. The rest of the bits of the interaction ID can include any suitable characters.

At step S960, the source committee can check the validity of each UTXO. The source committee can check the validity of each UTXO using any suitable method described herein. After checking the validity of each UTXO, the source committee can send a verification message comprising the result to the verifier committee. Since multiple UTXO requests can be batched into the same request, a result can be generated for multiple requests (i.e., multiple interactions) by the source committee.

At step S970, if the nodes in the source committee could not verify each UTXO, then the verifier committee can receive the verification message indicating that the block was not verified from the source committee. The verifier committee can then determine to not store the block in the shard of the blockchain. In some embodiments, the client computer that submitted the interaction to the verifier committee can resubmit the interaction in a future epoch.

At step S980, if the nodes in the source committee verified each UTXO, then the verifier committee can receive the verification message indicating that the block was verified from the source committee. At step S990, after receiving the verification message indicating that the block was verified, the nodes in the verifier committee can incorporate the block into the blockchain managed by the verifier committee. In some embodiments, the first node can incorporate the block into the shard of the blockchain.

In some embodiments, after step S980, the first node can transmit the output UTXO of the interaction to the client computer and can indicate that the interaction was stored in the shard of the blockchain.

The consensus phase can provide for the following advantages: 1) one communication between committees for each transaction; 2) no locking, so a client computer may not lose interaction data even if it goes offline; 3) no distributed denial of service (DDOS) attack; 4) committees can batch all the submitted interactions and request for one big interaction to make the process faster.

Figure 10:
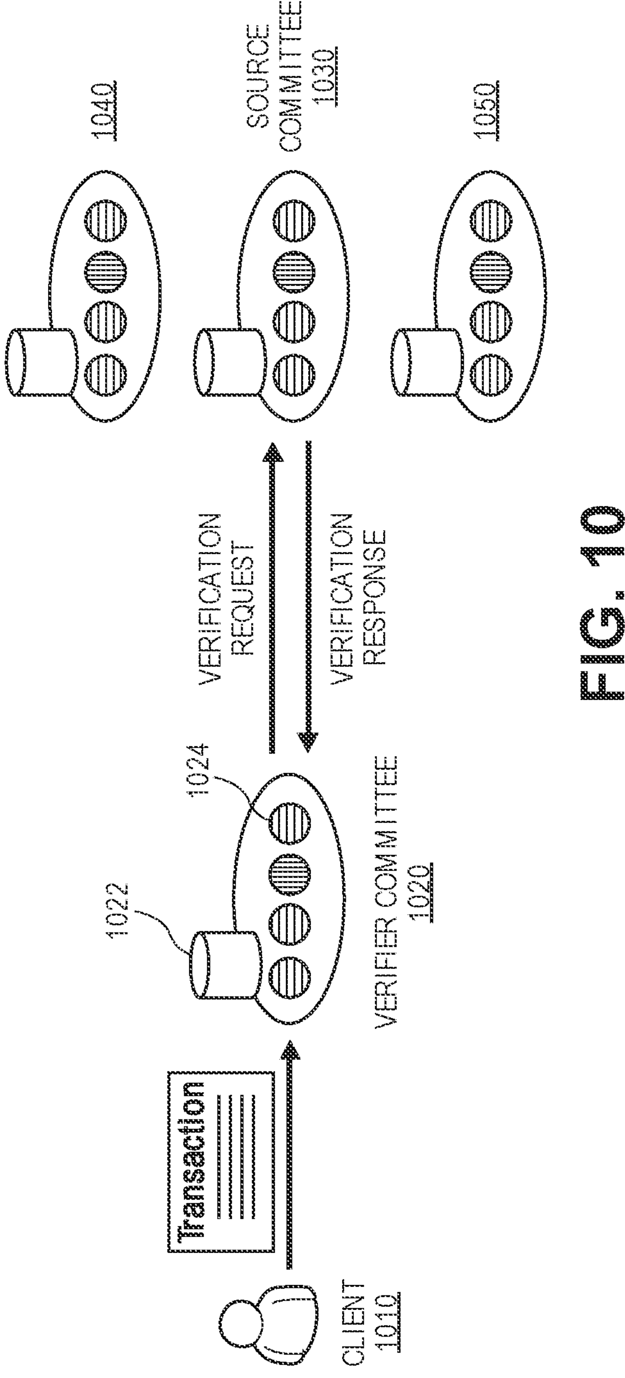
FIG. 10 shows a flow diagram illustrating a validation process according to an embodiment of the invention.

FIG. 10 shows a flow diagram illustrating a validation process according to an embodiment of the invention. FIG. 10 includes a client computer 1010 and a verifier committee 1020 including nodes 1024 and a blockchain shard 1022. FIG. 10 also includes source committees 1030-1050.

The client computer 1010 can submit a transaction including transaction data to the verifier committee 1020. After receiving the transaction, the verifier committee 1020 can include the transaction into a block including a plurality of transactions. The verifier committee 1020 may determine if the block is valid. If the verifier committee 1020 determines that the block is valid, then the verifier committee 1020 can store the block in the blockchain shard 1022.

If the verifier committee 1020 cannot determine that the block is valid, then the verifier committee 1020 can determine a source committee 1030 of a plurality of source committees 1030-1050 associated with the transaction in the block, (e.g., using the transaction identifier). In some embodiments, the verifier committee 1020 may determine that the source committee 1030 is associated with a UTXO that is an input to the transaction received from the client computer 1010. The verifier committee 1020 can contact the source committee 1030 to request the source committee 1030 to verify the block. After receiving the block from the verifier committee 1020, the source committee 1030 may determine if the block is valid. If the source committee 1030 determines that the block is valid, then the source committee 1030 may transmit a verification response to the verifier committee 1020. If the verification response indicates that the block is valid, then the verifier committee 1020 can store the block in the blockchain shard 1022.

Protocol 5, below, describes an example consensus protocol, as described herein. The consensus protocol can allow a computer network comprising committees comprising nodes to agree on blocks of interactions and store the blocks of interactions into shards of a blockchain.

Protocol 5: Consensus

1. Upon receiving a message from a client computer, accept a new transaction from the client computer.
2. Agreement on the block
   (a) Put all the transactions on a suggested block.
   (b) Reliably broadcast the suggested block to all nodes in the committee.
   (c) Receive a suggested block from all the nodes in the committee and merge the suggested blocks.
3. Verifying UTXO(s)
   (a) Create the list of all UTXO(s) that need verifying.
   (b) If the committee can verify a UTXO locally, verify it, otherwise contact the source committee to ask for verification.
   (c) If the committee receives a request from another committee for the verification of a UTXO, answer "yes" if it is unspent, otherwise answer "no".

Routing Protocol

Currently in Bitcoin and Ethereum, transaction broadcasts happen in the global P2P network via a gossip protocol, where each node forwards the transactions it receives to its peers (i.e., proximate nodes). Due to this, each sent transaction can eventually reach all nodes in the network as long as the network is a connected graph. In a sharded blockchain, such a global broadcast is wasteful because a transaction may be meaningful to only a few committees. The nodes can forward newly created transaction outputs only to the committees that are responsible for the outputs. Methods according to embodiments of the invention can provide a routing scheme that enables the users to quickly locate which committees the nodes should send their outputs to.

First, strawman routing schemes can be discussed. One approach can be that every node can store the information (e.g., IP address, etc.) of all committees in the computer network. Thus every node can quickly locate the IP addresses of the committee members that the users should send their transaction to. The advantage of this solution can be that it enables each user to determine the intended committee for the transaction in constant time. However, it requires O(n) storage at every node to store information about all committees. Further, every committee member would broadcast any change of their committee membership to everyone in the network, which would cause substantial overhead from message broadcast in every epoch. Such a solution cannot scale for thousands of nodes in the network.

A different solution can be to have a dedicated committee $C_{router}$ which can track changes in committee membership and can be responsible for transaction routing. Every user can obtain information from $C_{router}$ about the nodes currently in the committee which should handle the transaction. This approach offers efficient routing, which takes only one communication round. However, $C_{router}$ becomes a centralized hub of the network that needs to handle a large amount of communication and thus can be a likely bottleneck as well as a potential target of DoS attacks.

Next, a routing overlay network can be discussed. In Kademlia each node in the system is assigned an identifier and there is a metric of distance between identifiers (e.g., the Hamming distance of the identifiers). A node stores information about all nodes which are within log distance from itself. When a node wants to send a message to another node in the system it identifies the node among its neighbors (which it stores locally) that is closest to the destination node ID and it asks it to run recursively the discovery mechanism. This enables node discovery and message routing in log n steps. See also [Petar Maymounkov and David Mazieres. Kademlia: A peer-to-peer information system based on the xor metric. In Revised Papers from the First International Workshop on Peer-to-Peer Systems, IPTPS '01, pages 53-65, London, UK, UK, 2002. Springer-Verlag.] for more details about the Kademlia routing protocol.

Methods according to embodiments of the invention can employ a routing mechanism at two levels: first, at the level of committee to committee communication which underlies the protocols and protects against disruptions caused by malicious nodes since each committee can have majority of honest parties. The second conceptual layer in the routing protocol can be the node to node communication which can be used to implement sending messages between committees. Specifically, each committee can maintain a routing table of log n records which point to log n different committees which are distance $2^i$ for $0 \le i \le \log n-1$ (i.e., Hamming distance 1) away.

Figures 11, 12:
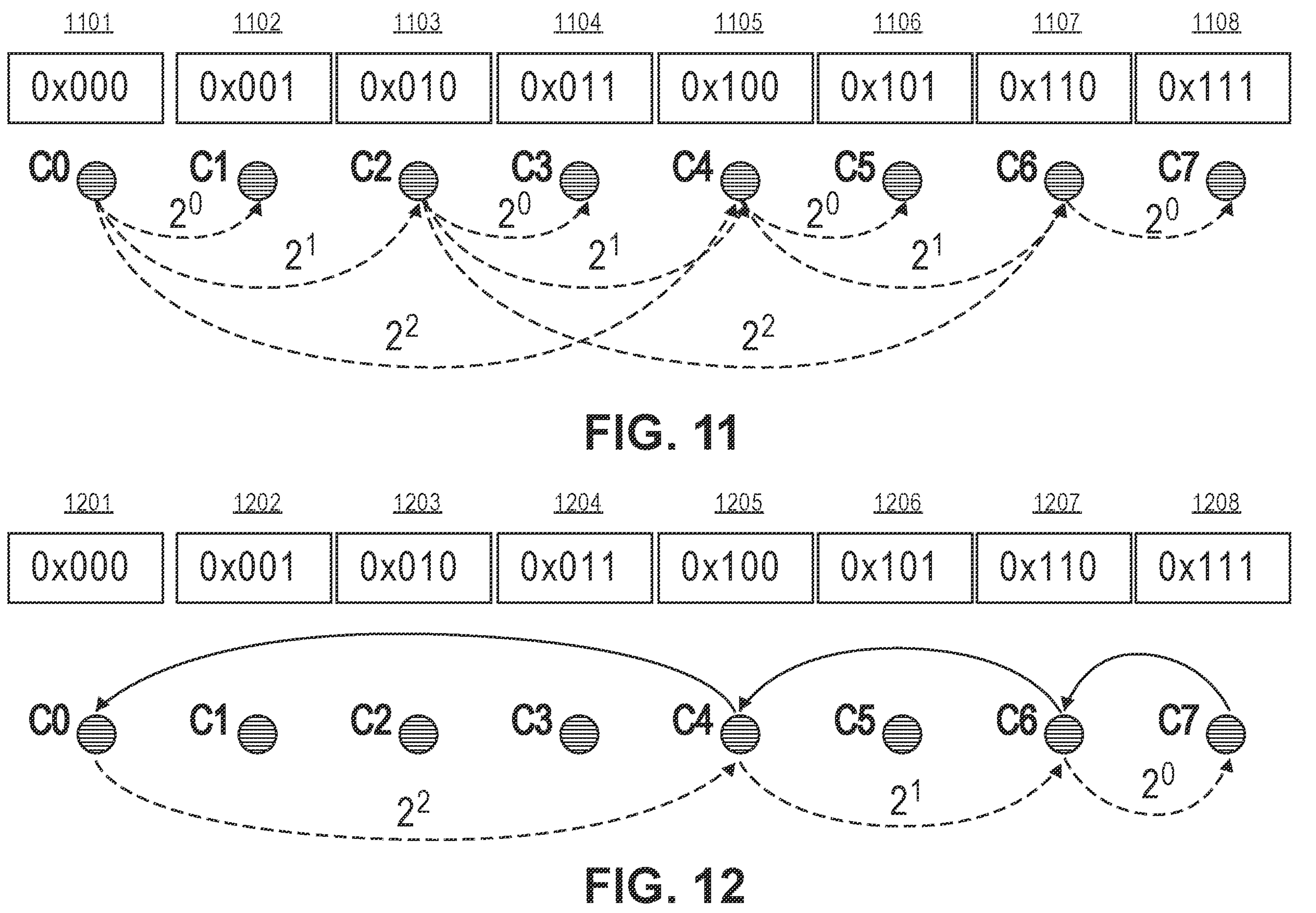
FIG. 11 shows a flow diagram illustrating communication routing according to an embodiment of the invention.
FIG. 12 shows a flow diagram illustrating communication response routing according to an embodiment of the invention.

FIG. 11 shows a flow diagram illustrating communication routing according to an embodiment of the invention. FIG. 11 includes a number of committees; $C_0$ 1101, $C_1$ 1102, $C_2$ 1103, $C_3$ 1104, $C_4$ 1105, $C_5$ 1106, $C_6$ 1107, and $C_7$ 1108. Each committee can be associated with a committee ID. For example, the $C_0$ 1101 can be associated with the committee ID 0x000. As further example, the $C_1$ 1102 can be associated with the committee ID 0x001, $C_2$ 1103 can be associated with the committee ID 0x010, $C_3$ 1104 can be associated with the committee ID 0x011, $C_4$ 1105 can be associated with the committee ID 0x100, $C_5$ 1106 can be associated with the committee ID 0x101, $C_6$ 1107 can be associated with the committee ID 0x110, and $C_7$ 1108 can be associated with the committee ID 0x111. A committee can be associated with any suitable committee ID.

Each committee in the computer network can maintain a routing table containing log n other committees. Each committee can store a disjoint subset of transaction outputs which can have a fixed log n-bit prefix in their IDs. This log n common prefix in the transaction outputs can also be equal to the committee ID. In some embodiments, the first n bits of the transaction outputs can be the committee ID for the committee that is associated with those transaction outputs. The nodes in a committee can store the routing table containing information regarding log n other committees, rather than storing a routing table that includes information regarding every other committee in the computer network. Each node does not have to store large routing tables, thus reducing used memory.

$C_0$ 1101 can store a routing table that includes information regarding communications with $C_1$ 1102, $C_2$ 1103, and $C_4$ 1105. The committee $C_0$ 1101 can communicate with a node with a committee ID that is $2^n$ committees away (i.e., $2^0$, $2^1$, and $2^2$).

In some embodiments, $C_0$ 1101 may need to communicate with $C_7$ 1108 regarding an interaction. $C_0$ 1101 can determine to transmit a block including the interaction to $C_4$ 1105 since it has a committee ID (0x100) known to $C_0$ 1101 closest to the committee ID (0x111) of $C_7$ 1108. After receiving the block, $C_4$ 1105 can determine the committee ID in its routing table that is closest to the committee ID of the final destination of the block (i.e., $C_7$ 1108). $C_4$ 1105 can transmit the block to $C_6$ 1107 which can transmit the block to $C_7$ 1108.

Moreover, at the node to node level, the individual ID of each node (i.e., node identifier) may start with a committee ID. In some embodiments, each pair of nodes in one committee can be very close (e.g., log(log(n)) distance) to each other and the messages inside one committee can propagate without going through another committee. More specifically, each node can store information about all the nodes in its committee as well as about log(log(n)) nodes in each of the log n closest committees to the node's own committee. Each committee to committee message can be implemented by having all nodes in the sender committee send the message to all nodes they know in the receiver committee. Each node that receives a message can use a reliable broadcast [Gabriel Bracha and Sam Toueg. Asynchronous consensus and broadcast protocols. Journal of the ACM (JACM), 32(4):824840, 1985.] to send the message to all other nodes in its committee.

When a client computer requests to add a transaction with a transaction-identity $ID_{tx}$, the client computer can first locate the committee $C_{tx}$ responsible for recording the transaction according the sharding rule described herein. The client computer can use the discovery and routing mechanism to find $C_{tx}$ and send its message to the committee $C_{tx}$. FIG. 12 shows a flow diagram illustrating communication response routing according to an embodiment of the invention. FIG. 12 includes an example of the routing protocol initiated by committee $C_0$ to request information for committee $C_7$. FIG. 12 includes a number of committees; $C_0$ 1201, $C_1$ 1202, $C_2$ 1203, $C_3$ 1204, $C_4$ 1205, $C_5$ 1206, $C_6$ 1207, and $C_7$ 1208.

FIG. 12 shows an example of a communication graph when committee $C_0$ 1201 locates the committee $C_7$ 1208, which can be responsible for all transactions with prefix 0x111, as described above in FIG. 11. $C_0$ 1201 can first communicate with $C_4$ 1205, which may be the closest committee to $C_7$ 1208 in the routing table of $C_0$ 1201. $C_4$ 1205 can then communicate to $C_6$ 1207, which can be the closest committee to $C_7$ 1208 in the routing table of $C_4$ 1205, to ask for communication information such as the verification of a block from $C_4$ 1208. Since $C_6$ 1207 can be directly communication with $C_7$ 1208, $C_6$ 1207 can return a member list and addresses of $C_7$ 1208 to $C_4$ 1205, since in some embodiments, a committee can store information regarding the nodes in neighboring committees such as addresses. $C_4$ 1205 can then forward the communication information, (e.g., results of verification of a block) to $C_0$ 1201.

In some embodiments, a node in the computer network can perform the setup phase, the reconfiguration phase, and then the consensus phase, as described herein, together, in any suitable manner. For example, a first node in a computer network, can determine a leader committee comprising a plurality of elected nodes including the first node. The leader committee can be a first committee. The first node can receive a request from a second node to join a committee of the computer network. The request can include a node identifier. The first node can then determine that the second node can join a second committee based on a proof of work process computed by the second node. The first node can introduce the second node to a second committee, wherein the second committee displaces a node to allow the second node to join the second committee, wherein information regarding the second node being in the second committee is communicated to other nodes in the computer network. The first node can then receive an interaction request, the interaction request including interaction data from a client computer. The first node can incorporate the interaction data along with other interaction data associated with other client computers into a block comprising interaction data, wherein the block includes block parts. The first node can then broadcast the block to other nodes in the committee, wherein the other nodes in the committee verify the block. The first node can incorporate the block into a shard of a blockchain managed by the first committee.

EVALUATION

In this section, the scalability of methods according to embodiments of the invention and compare them against sharding-based protocols such as, Elastico [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM.] and OmniLedger can be evaluated [Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.]. In some embodiments, the reliable broadcast protocol of Bracha [Gabriel Bracha. Asynchronous Byzantine agreement protocols. Information and Computation, 75(2):130-143, November 1987.] can be implemented with the Reed-Solomon erasure coding library of [Reed-solomon erasure coding in go, May 2017. Available at https://github.com/klauspost/reedsolomon.].

Networks of up to 4,000 nodes are simulated by oversubscribing a set of 32 machines each running up to 125 instances. Each machine has an Intel Xeon Phi 7210 @1.3 GHz with 64 cores and a 10-Gbps communication link. To simulate the Internet latency, consider a delay of 100 ms for every message and a bandwidth of 20 Mbps for each node. This can simulate geographically distributed nodes around the world. Unless otherwise noted, numbers reported in this section may be for the case where all nodes behave honestly. One epoch of methods according to embodiments of the invention can be executed and the cost of each component of the protocol can be evaluated individually. These components can be of independent interest for use in other protocols. The consensus latency can be measured in seconds, the number of transactions committed per second, and the number of messages exchanged to bootstrap committees for the first time. Similar to Bitcoin Core, each node in the global P2P network can accept up to 8 outgoing connections and up to 125 incoming connections. However, any suitable number of outgoing and incoming connections can be used. The global P2P overlay can used during a bootstrapping phase. During a consensus phase, nodes communicate through much smaller P2P overlays created within every committee, where each node accepts up to 16 outgoing connections and up to 125 incoming connections.

Figure 28:
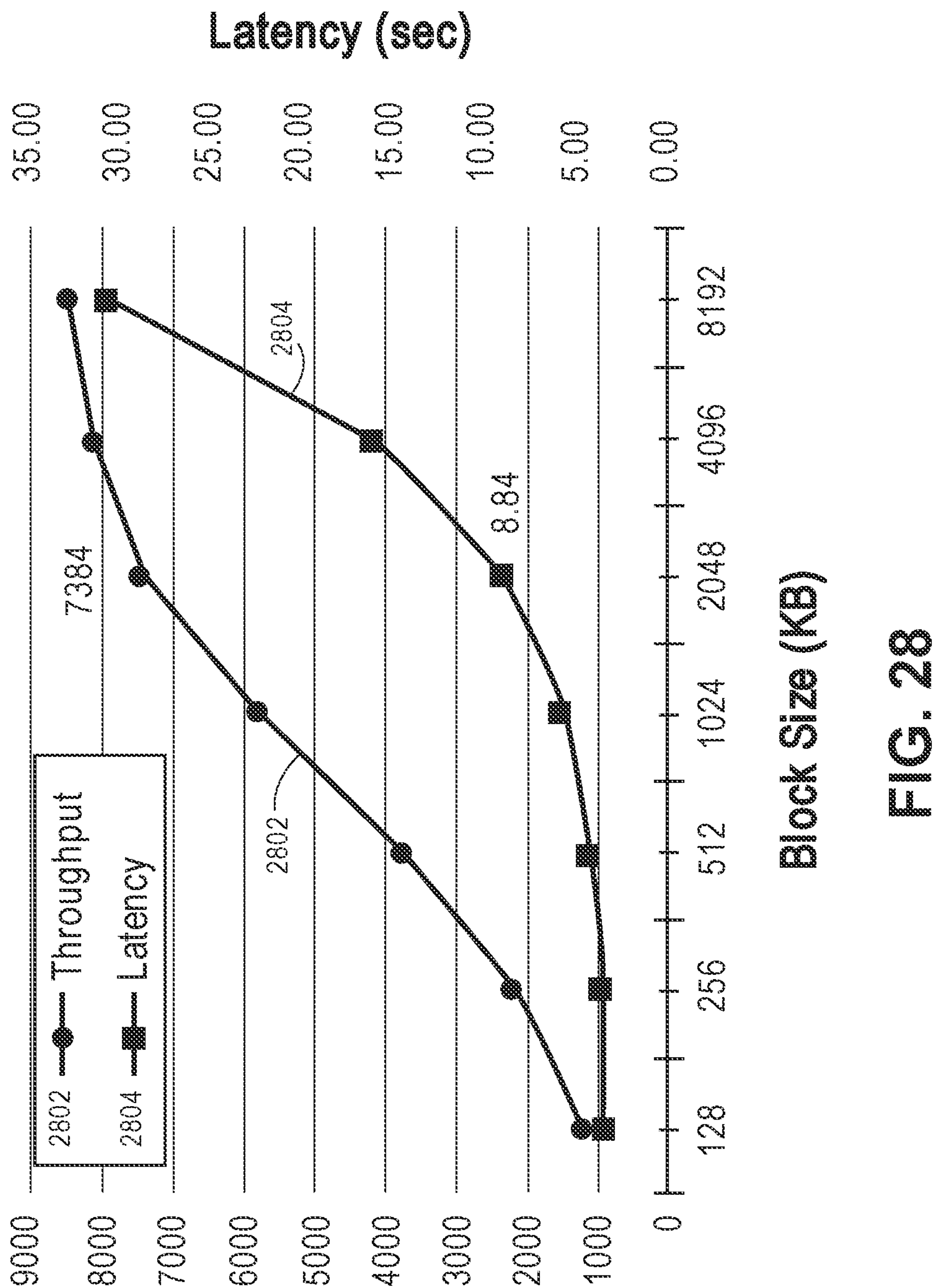
FIG. 28 shows a plot illustrating transactions per second vs. block size according to an embodiment of the invention.

During the evaluation, to obtain synchronous rounds for the intra-committee consensus, $\Delta$ can be set to 600 ms based on the maximum time to gossip an 80-byte digest to all nodes in a P2P network of 250 nodes as shown in FIG. 28. Recall that synchronous rounds are required only during the consensus protocol of Ren et al. to agree on a hash of the block resulting in messages of up to 80 bytes size including signatures and control bits.

Each block of transactions can consist of 4,096 transactions, where each transaction consists of 512 bytes resulting in a block size of 2 MB. To implement this IDA-based gossiping protocol to gossip 2-MB blocks within committees, each block can be split into 128 chunks and use the Jerasure library [Jerasure: Erasure Coding Library. (May 2018). Available at http://jerasure.org.] to encode messages using Reed-Solomon codes [Irving Reed and Gustave Solomon. 1960. Polynomial Codes Over Certain Finite Fields. Journal of the Society for Industrial and Applied Mathematics (SIAM) (1960), 300-304.] with the decoding algorithm of Berlekamp and Welch [E Berlekamp and LWelch. Error Correction for Algebraic Block Codes, U.S. Pat. No. 4,633, 470. (30 Dec. 1986).].

Figure 13:
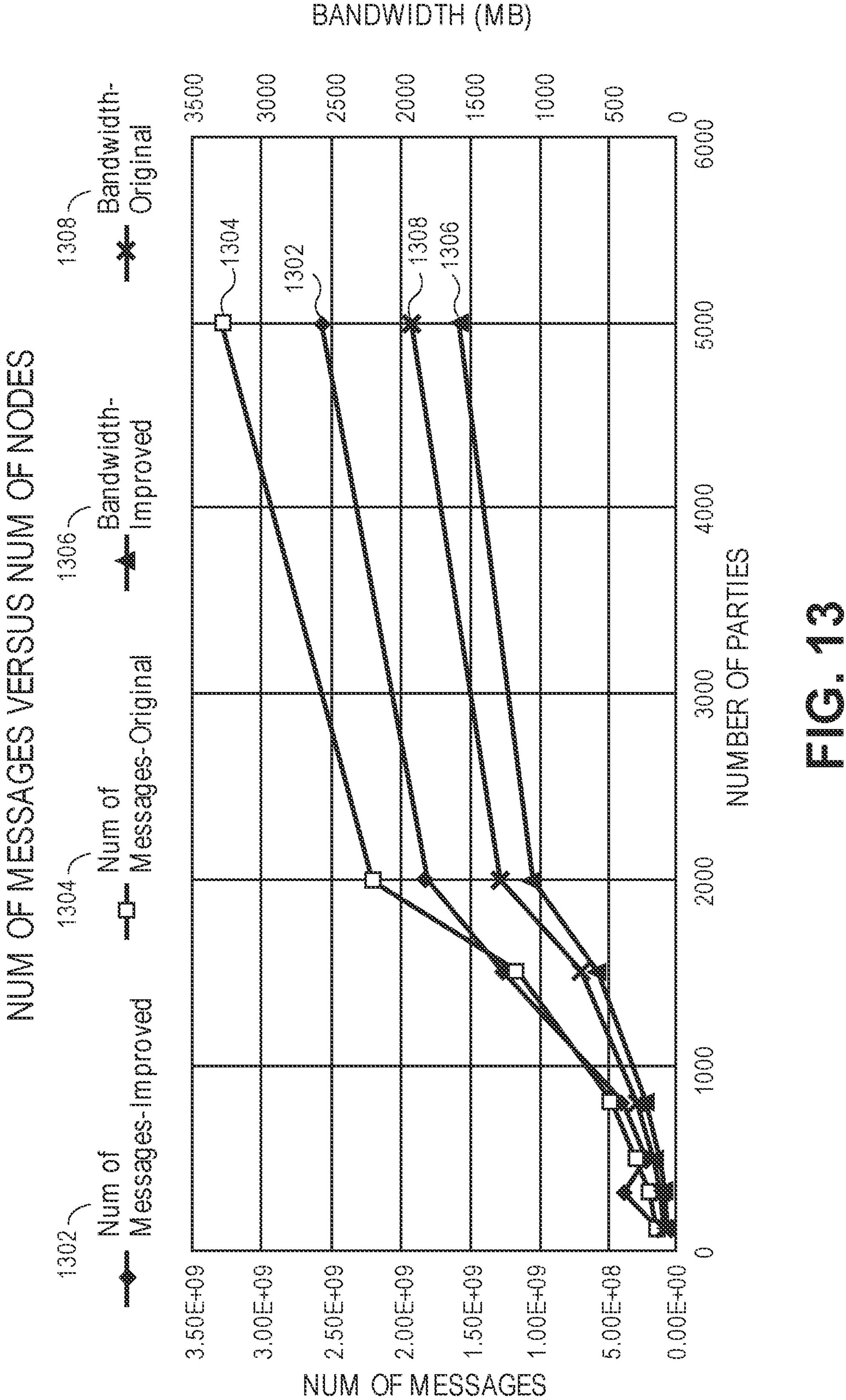
FIG. 13 shows a plot illustrating communication for a setup phase according to an embodiment of the invention.

FIG. 13 shows a plot illustrating communication for a setup phase according to an embodiment of the invention. FIG. 13 includes a plot of number of messages improved 1302, number of messages original 1304, bandwidth improved 1306, and bandwidth original 1308. When there are 5000 parties (i.e., nodes), the number of messages original 1304 is around $3.25*10^9$ messages, whereas the number of messages improved 1302 is around $2.5*10^9$ messages. Furthermore, at 5000 nodes, the bandwidth original 1308 was around 1900 MB, where the bandwidth improved 1306 is around 1600 MB.

Figure 14:
FIG. 14 shows a plot illustrating setup phase latency according to an embodiment of the invention.
Figure 14:
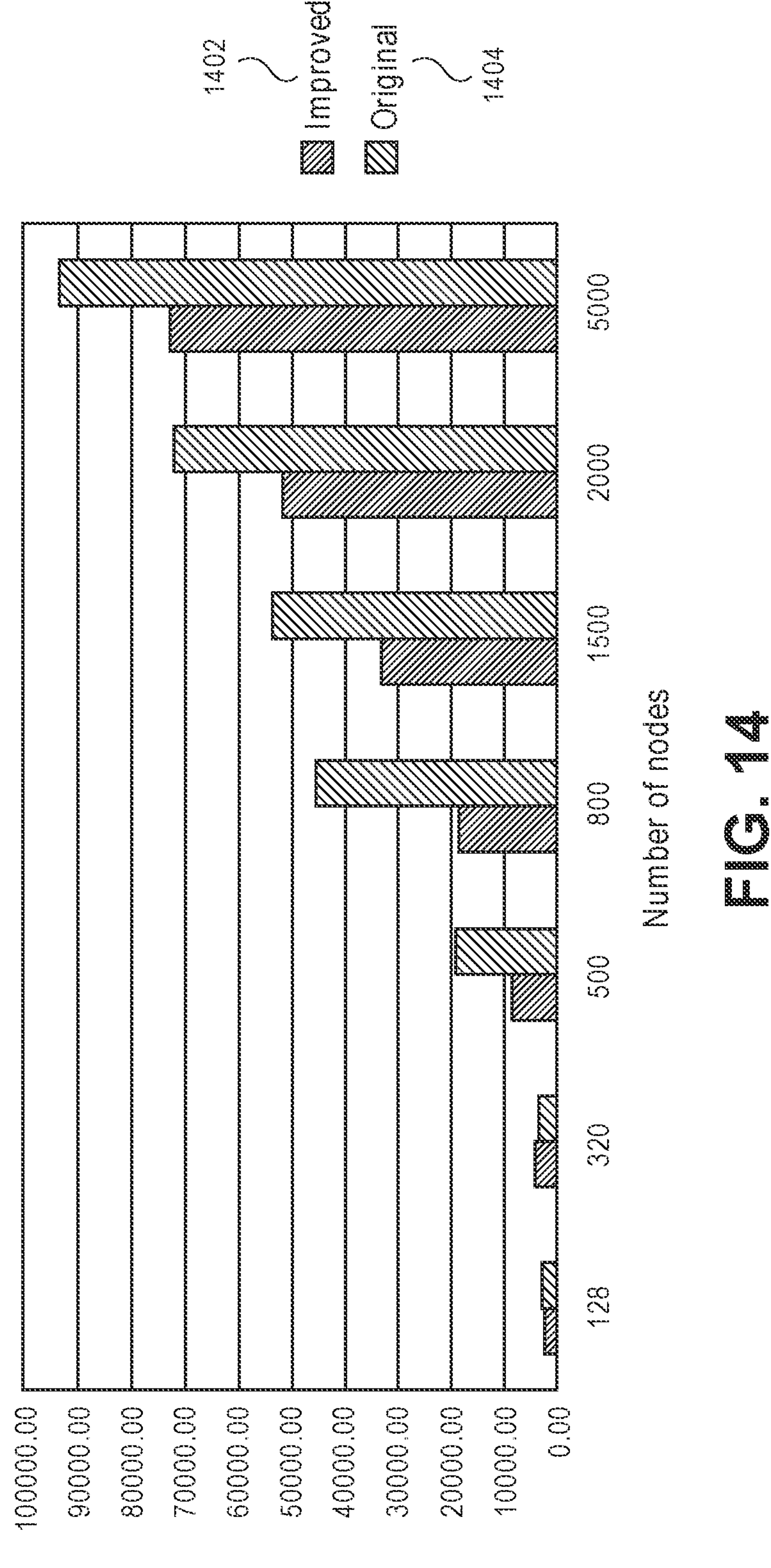

FIG. 14 shows a plot illustrating setup phase latency according to an embodiment of the invention. FIGS. 13 and 14 also show the improvement in the setup running time due to the better analysis for the required size of the committees, which can save about 20% of the runtime and bandwidth, while the latency for setup can be substantial (e.g., about 20 hour for 5,000 nodes). The nodes can run this protocol once and the cost can be amortized among adjust and consensus epochs. In comparison, the protocol of Elastico assumes trusted setup and does not present any corresponding measurements.

Figure 15:
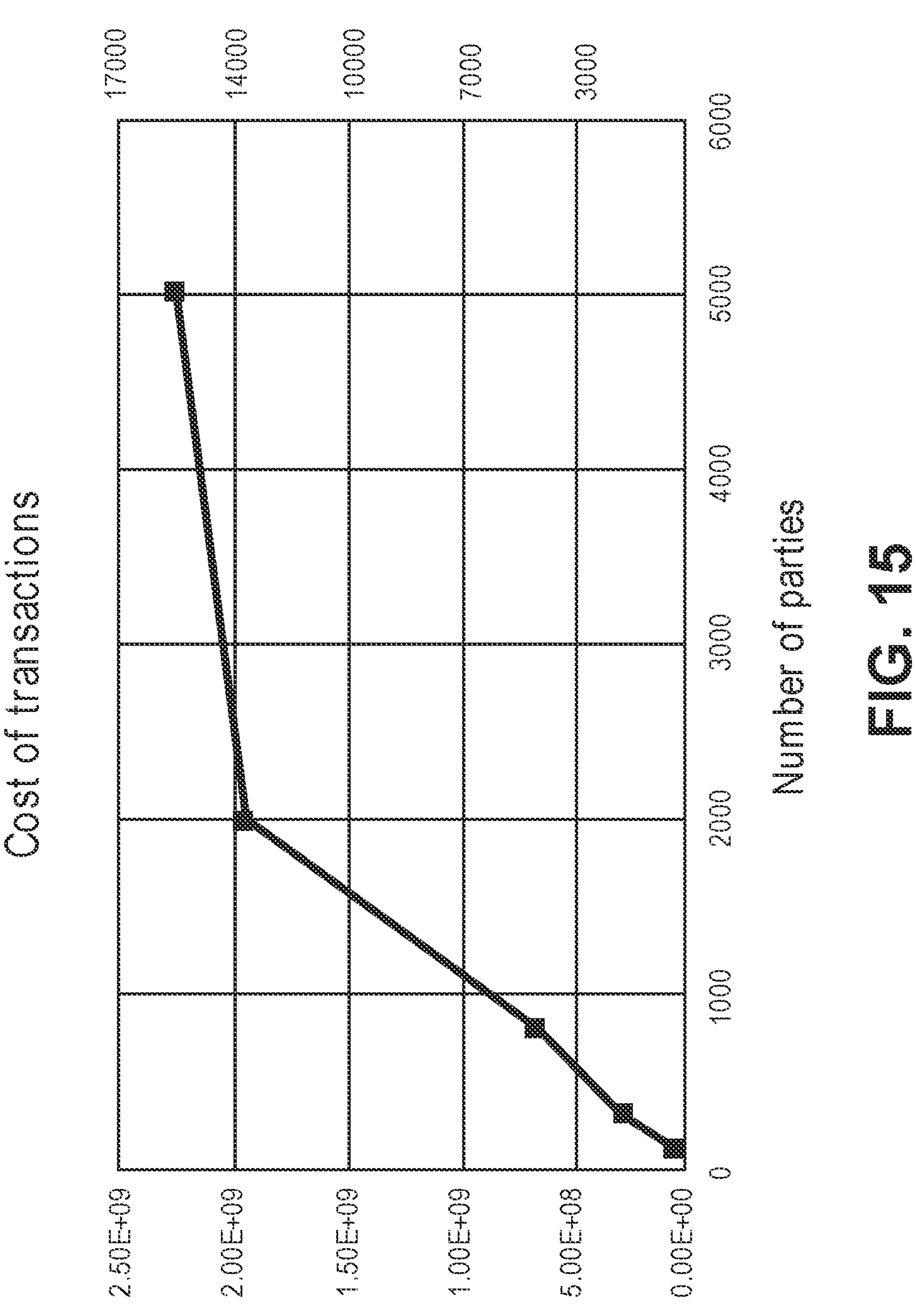
FIG. 15 shows a plot illustrating cost of transactions according to an embodiment of the invention.
Figure 16:
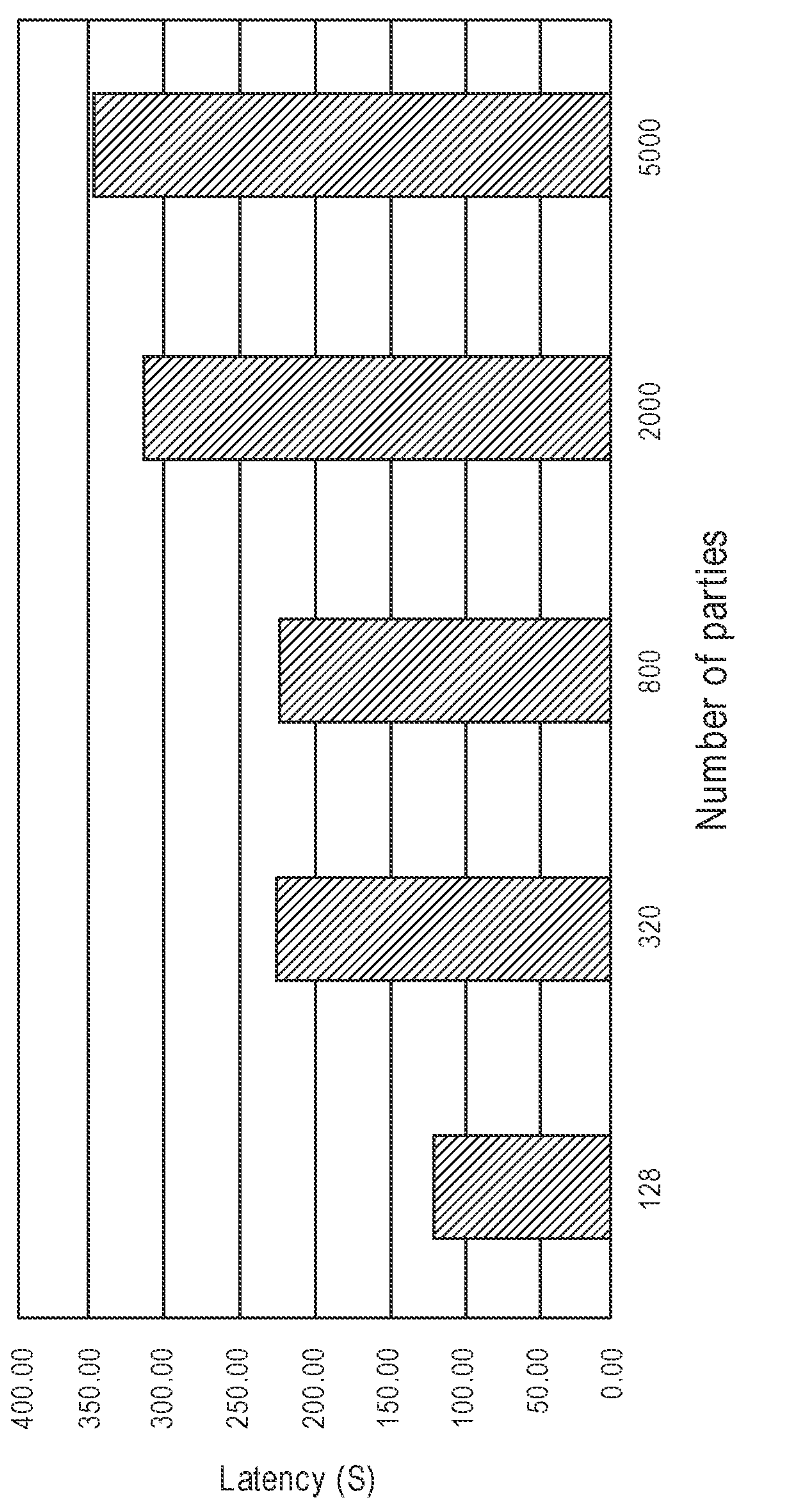
FIG. 16 shows a plot illustrating transaction latency according to an embodiment of the invention.
Figure 18:
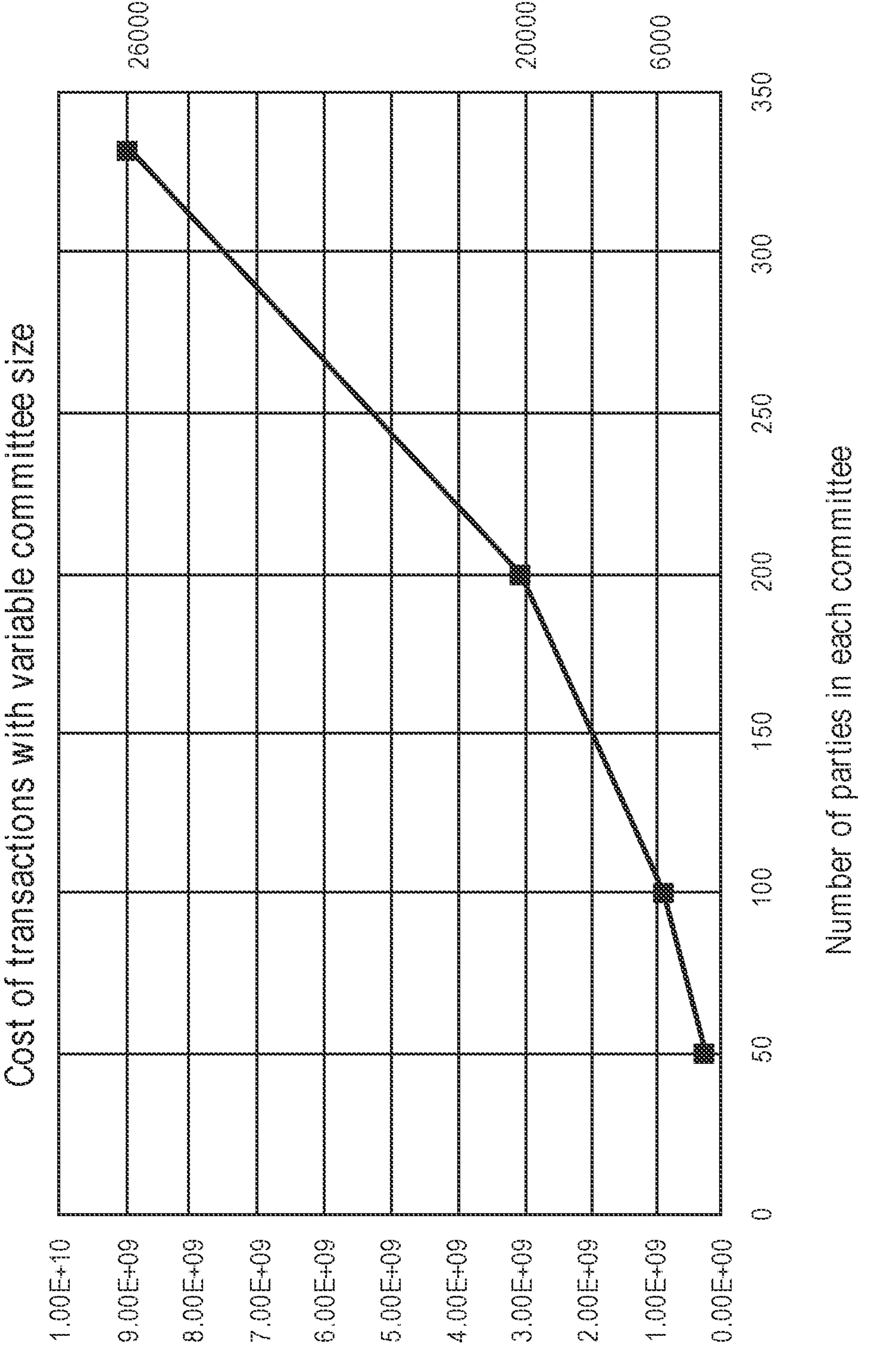
FIG. 18 shows a plot illustrating cost of transactions with variable committee size according to an embodiment of the invention.

Next, the consensus overhead can be discussed. FIG. 15 shows a plot illustrating cost of transactions according to an embodiment of the invention. FIG. 16 shows a plot illustrating transaction latency according to an embodiment of the invention. FIG. 17 shows a plot illustrating transaction latency with variable committee size according to an embodiment of the invention. FIG. 18 shows a plot illustrating cost of transactions with variable committee size according to an embodiment of the invention.

Since there can be multiple shards, more than one block of transactions can be processed simultaneously, specifically one for each committee. For the experiments with varying committee sizes n, the number of committees can be set to n/100. For example, for committee size of 100 and network size of 5000, the computer network can process 50 block of transactions in parallel. For the measurements of different committee sizes, the total number of nodes can be set to 1000. Both the latency and message cost can be sub-linear in the network size, this shows that embodiments of the invention can scale to large number of parties. In comparison to Elastico [Loi Luu, Viswesh Narayanan, Chaodong Zheng, Kunal Baweja, Seth Gilbert, and Prateek Saxena. A secure sharding protocol for open blockchains. In Proceedings of the 2016 ACM SIGSAC Conference on Computer and Communications Security, CCS '16, pages 17-30, New York, NY, USA, 2016. ACM.], embodiments of the invention can perform better regarding latency. For example, embodiments of the invention can improve the latency by a factor of about 0.7×. As an example in a network of 2,000 nodes, Elastico requires about 460 seconds to propagate four blocks, while the latency of embodiments of the invention can be roughly 315 seconds in a network of similar size.

Figure 19:
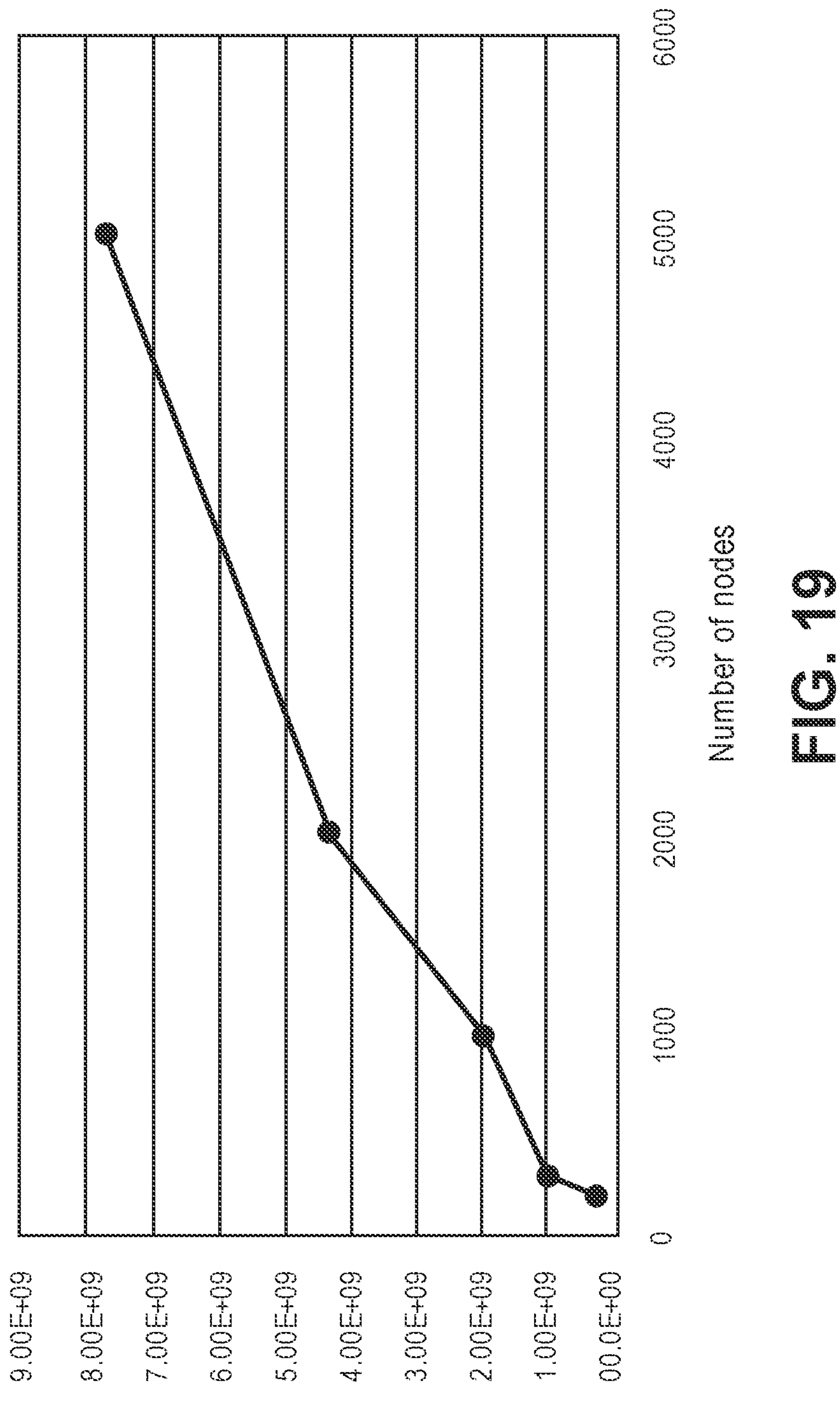
FIG. 19 shows a plot illustrating a number of messages per number of nodes according to an embodiment of the invention.
Figure 20:
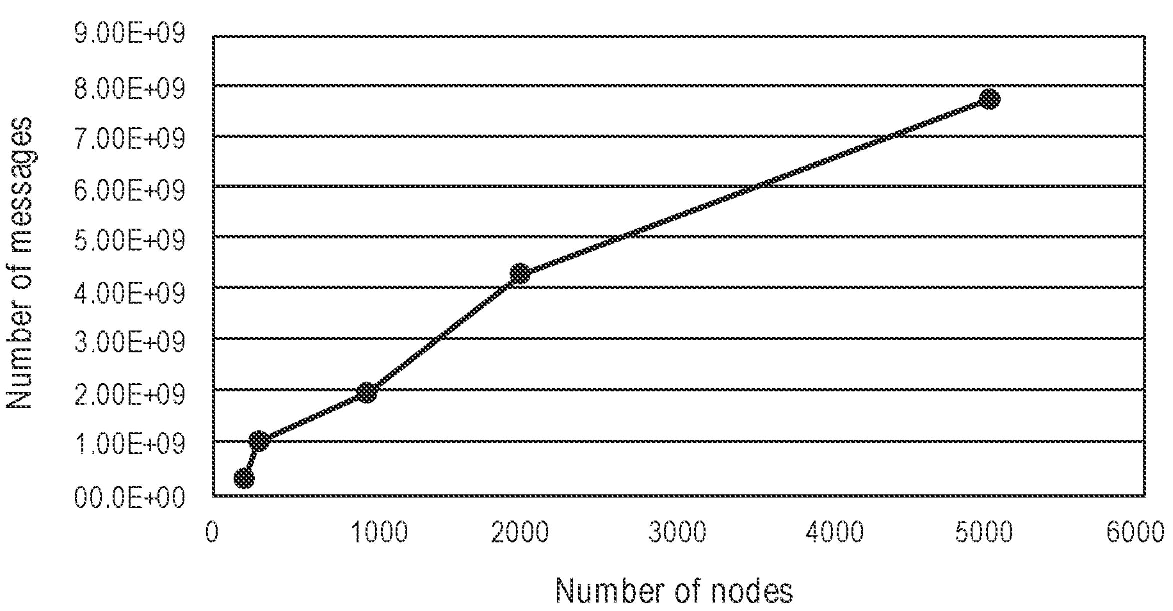
FIG. 20 shows a plot illustrating bandwidth vs. number of nodes according to an embodiment of the invention.
Figure 21:
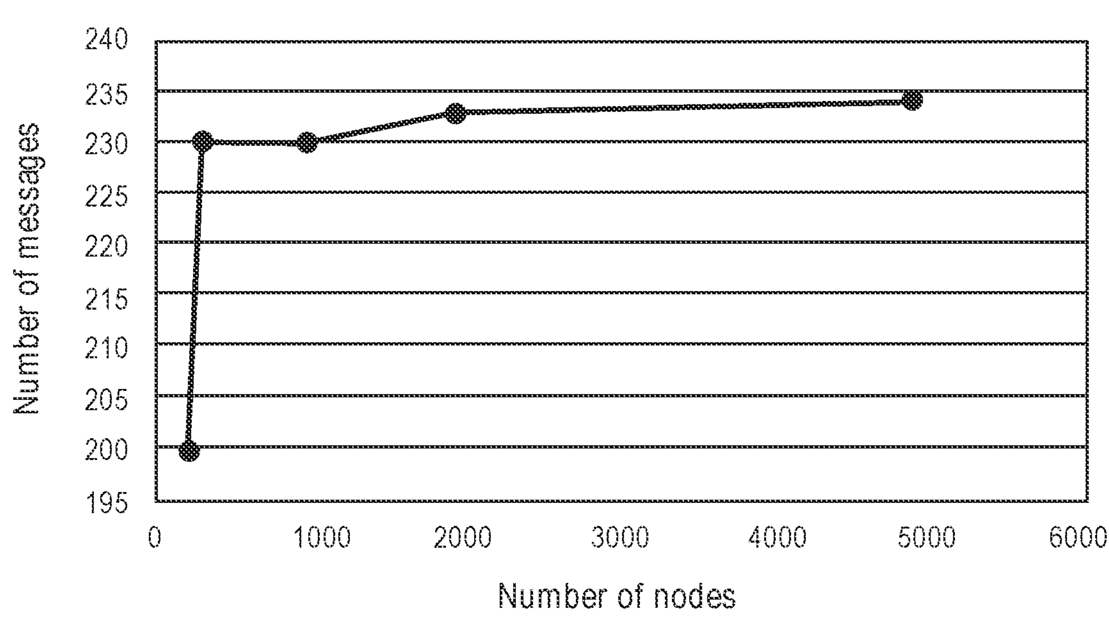
FIG. 21 shows a plot illustrating latency vs. number of nodes according to an embodiment of the invention.

FIG. 19 shows a plot illustrating a number of messages per number of nodes according to an embodiment of the invention. FIG. 20 shows a plot illustrating bandwidth vs. number of nodes according to an embodiment of the invention. FIG. 21 shows a plot illustrating latency vs. number of nodes according to an embodiment of the invention.

The bandwidth overhead of an epoch of OmniLedger is estimated using the numbers reported in [Eleftherios Kokoris-Kogias, Philipp Jovanovic, Linus Gasser, Nicolas Gailly, Ewa Syta, and Bryan Ford. OmniLedger: A secure, scale-out, decentralized ledger via sharding. Cryptology ePrint Archive, Report 2017/406, 2017. https://eprint.iacr.org/2017/406.]: a total of 1,800 nodes, transaction size of 500 B, throughput of 3,500 tx/sec, and a probability of 3.7% for a transaction to be intra-shard. Since OmniLedger requires at least three gossip-to-all invocations per cross-shard transaction, the bandwidth required by each node is at least: 3,500×0.967×500 B×3≈45 Mbps. The reported transaction confirmation latency of 800 seconds for n=1600, m=16, and 1 MB blocks can be used to estimate the throughput of Elastico. Assuming 500 B/tx, the throughput of Elastico can be calculated as 16*2000/800=40 tx/sec.

Figure 22:
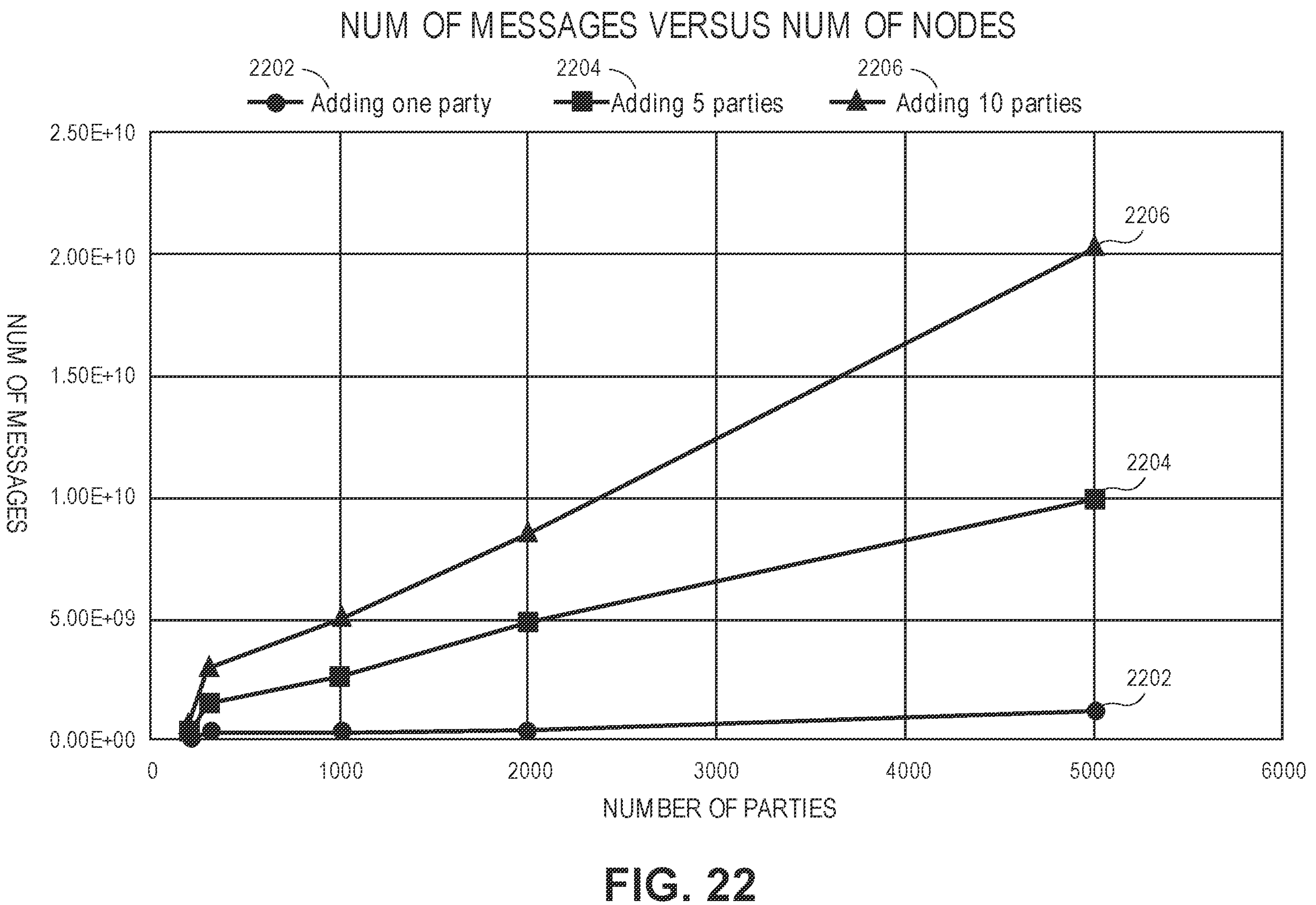
FIG. 22 shows a plot illustrating cost of handling churn according to an embodiment of the invention.
Figure 23:
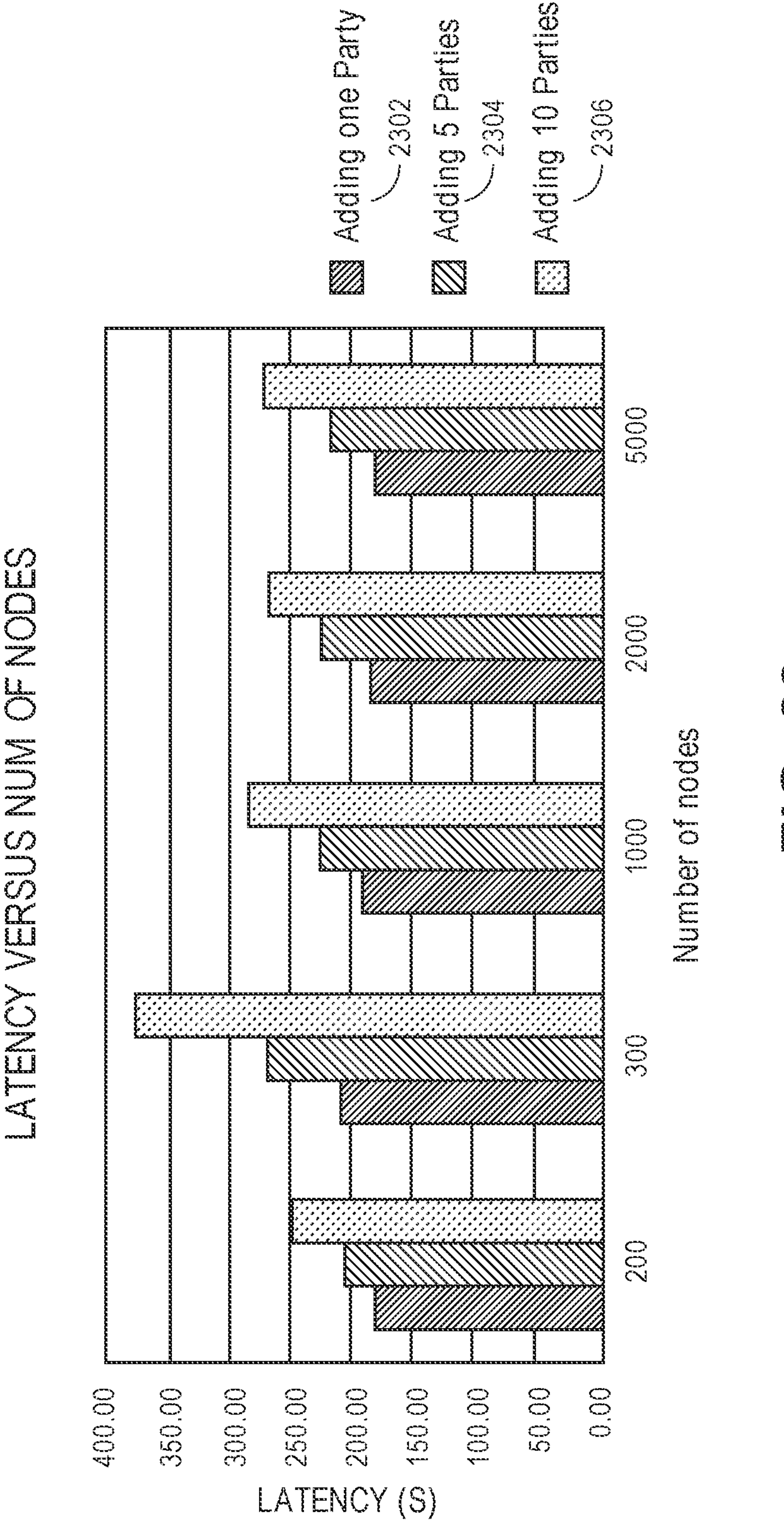
FIG. 23 shows a plot illustrating churn latency according to an embodiment of the invention.

Next, the reconfiguration overhead can be discussed. FIG. 22 shows a plot illustrating cost of handling churn according to an embodiment of the invention. FIG. 22 includes a plot of the number of messages vs. the number of nodes when adding one new node 2202, 5 new nodes 2204, and 10 new nodes 2206 during the reconfiguration phase. FIG. 23 shows a plot illustrating churn latency according to an embodiment of the invention. To measure the effect of churn in embodiments of the invention, the number of messages transmitted to add one party 2302, five parties 2304, or ten parties 2306 to each committee can be measured when the network size may be changing. As shown in FIGS. 22 and 23 the number of message grows roughly linearly with the size of the network and the number of parties that churn. Higher churn rate can also increase latency, but much less than previous systems and methods since churn of different parties and different committees happen in parallel. The network size may not affect the latency for handling the churn since the parties in the corresponding committee may deal with the churn. In some embodiments, a new node can attempt to join the computer network, but if the new node attempts to join in the middle of an epoch, the request to join may not be accepted and then the new node may transmit another request to join at the end of the epoch. This process can be affected by the randomness chosen for churn and likely caused the small spike in the latency for 300 nodes. The protocol of Elastico cannot handle churn in an incremental manner and requires reinitilization of all committees.

Since embodiments of the invention may shard the blockchain, the storage at each party may be equal to the (1/# of committees) fraction of the total ledger size. In a network of 5,000 nodes with 50 committees, each node may store about 6 MB after proposing 1,000 blocks of size 1 MB to the network. In contrast, Bitcoin, Elastico, and ByzCoin all require each participating node to store roughly 270 MB of data after 1,000 blocks. Therefore, each node according to embodiments of the invention may store about 45× less data. This can be an advantage of embodiments of the invention over the existing blockchain protocols.

Figure 24:
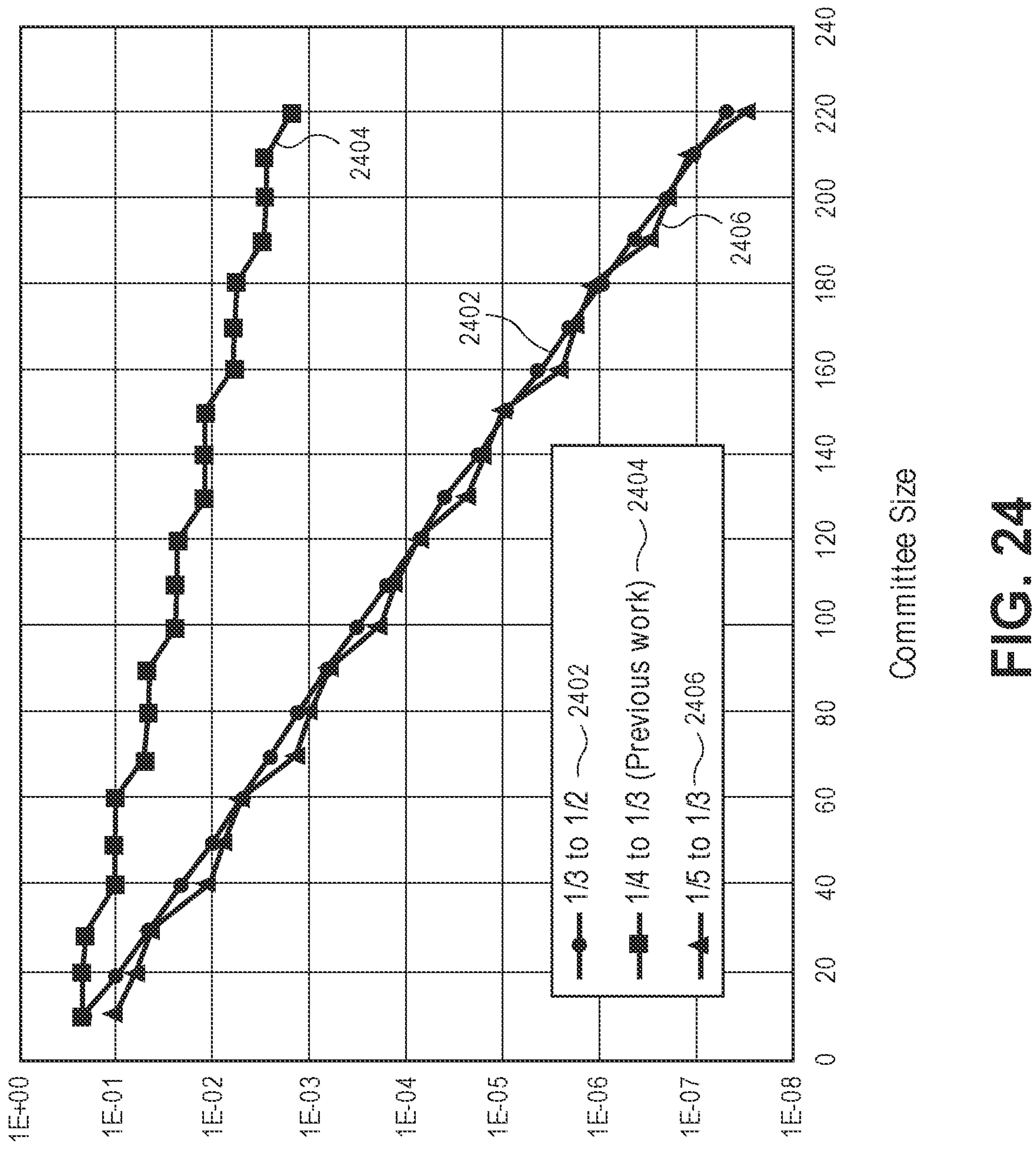
FIG. 24 shows a plot illustrating failure probability according to an embodiment of the invention.

FIG. 24 shows a plot illustrating failure probability according to an embodiment of the invention. The failure probability in embodiments of the invention shown in ⅓ to ½ 2402 can be lower than previous work (i.e., ¼ to ⅓) for committees of size 20 to 220 nodes.

Figure 25:
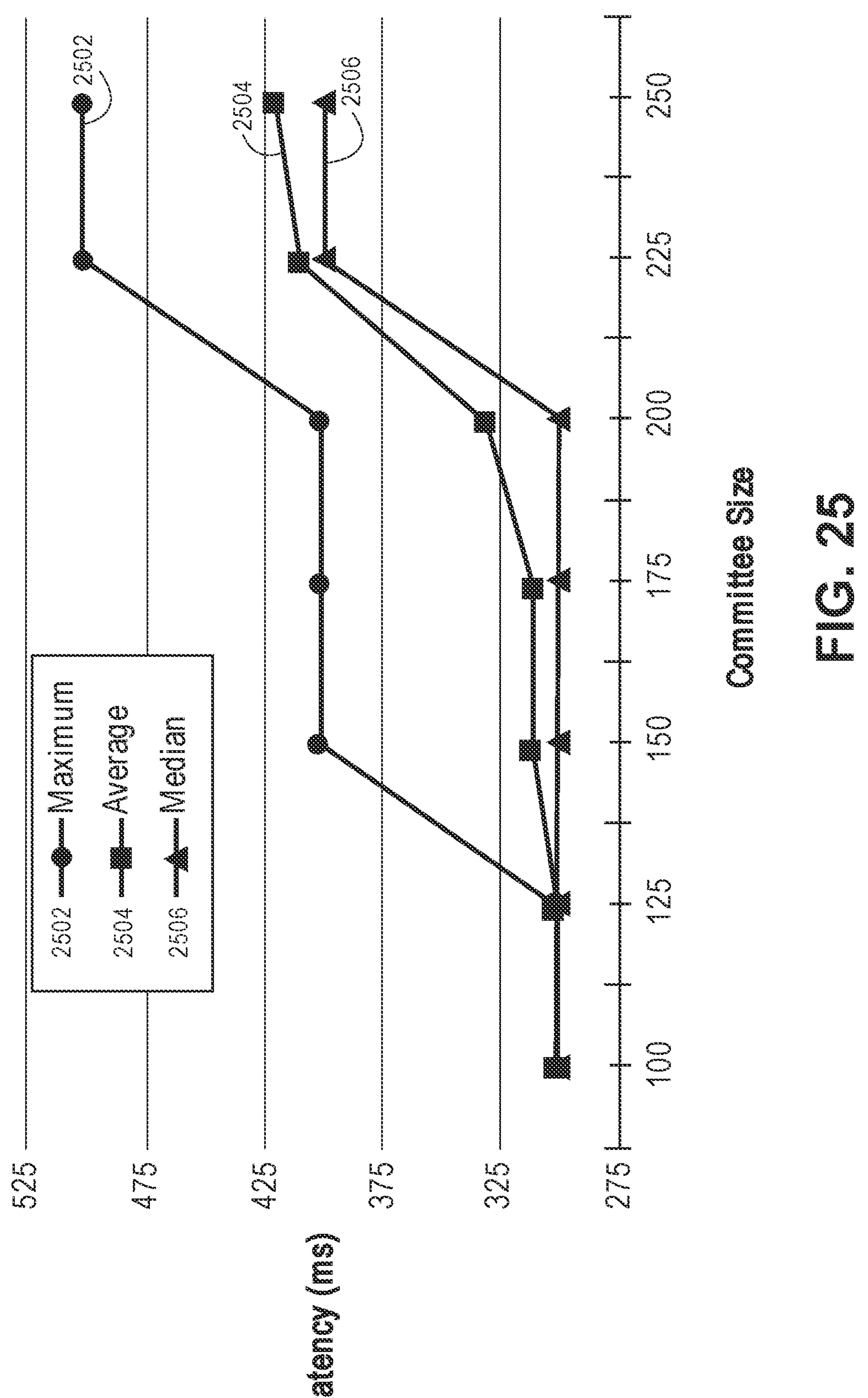
FIG. 25 shows a plot illustrating latency vs. committee size according to an embodiment of the invention.
Figure 26:
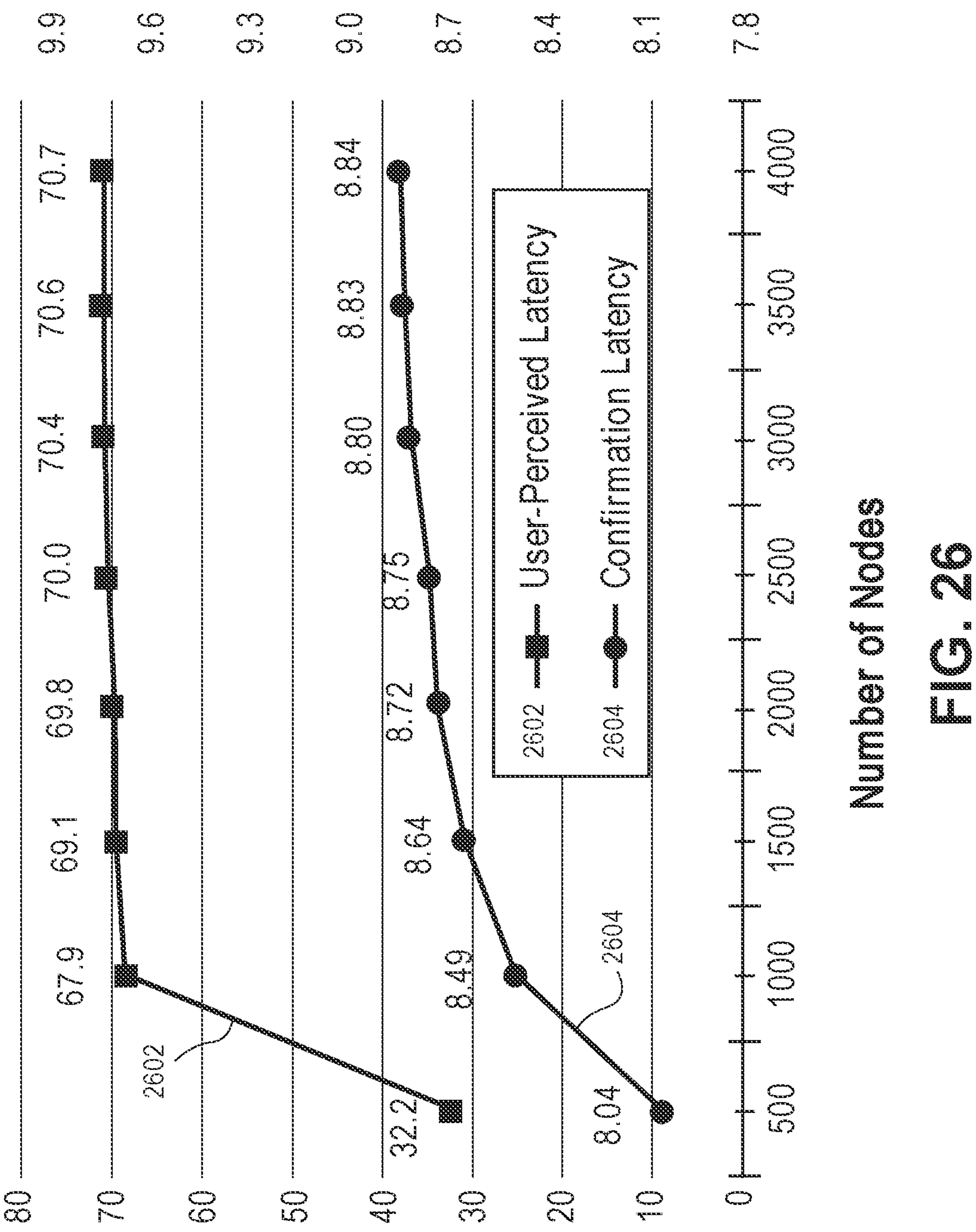
FIG. 26 shows a plot illustrating user-perceived latency vs. number of nodes according to an embodiment of the invention.

FIG. 25 shows a plot illustrating latency vs. committee size according to an embodiment of the invention. FIG. 25 includes a maximum latency 2502, an average latency 2504, and a median latency 2506. FIG. 26 shows a plot illustrating user-perceived latency vs. number of nodes according to an embodiment of the invention. FIG. 26 includes a user-perceived latency 2602 and a confirmation latency 2604.

The latency of processing a transaction can be measured using two metrics: confirmation latency and user-perceived latency. The former measures the delay between the time that a transaction is included in a block of transactions until the time that the block is added to a ledger, such that its presence on the ledger can be confirmed by any (honest) node of the computer network. In contrast, user-perceived latency measures the delay between the time that a user (i.e., client computer) sends a transaction, tx, to the computer network until the time that tx can be confirmed by any (honest) node in the system.

FIG. 26 shows both latency values measured for various network sizes. The user-perceived latency 2602 only increases by 2.8 seconds as the number of nodes in the computer network increases from 1000 nodes to 4000 nodes. The small increase in the user-perceived latency 2602 allows for users of client computers to receive a confirmation in a similar amount of time as the computer network grows in size. While the client-perceived latency is roughly 8 times more than the confirmation latency, both latencies remain about the same for networks larger than 1,000 nodes. In comparison, Elastico and OmniLedger report confirmation latencies of roughly 800 seconds and 63 seconds for network sizes of 1,600 and 1,800 nodes respectively. At a network sizes of 1,500 to 2000, embodiments of the invention have a confirmation latency of 8.64 to 8.72 seconds.

Figure 27:
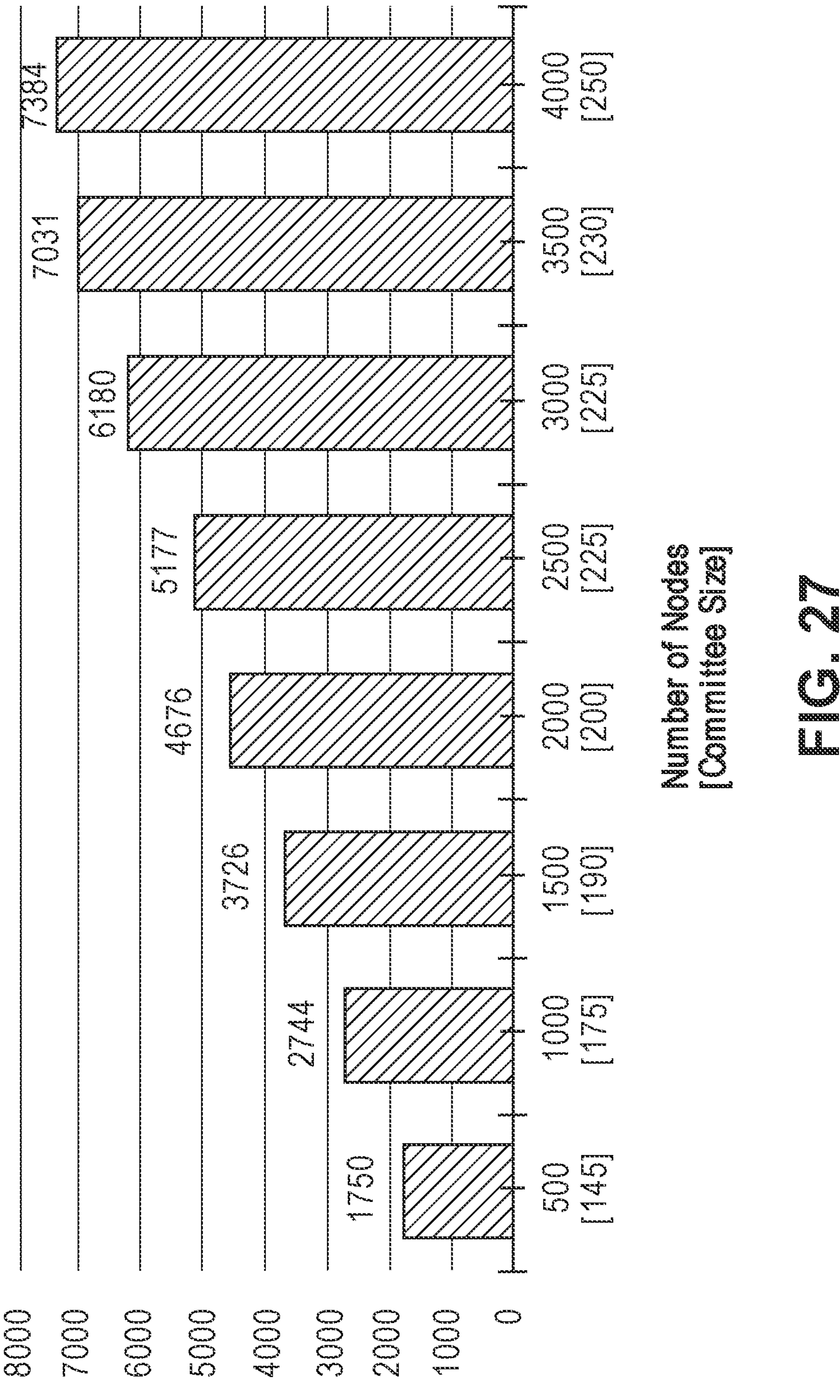
FIG. 27 shows a plot illustrating transactions per second vs. committee size according to an embodiment of the invention.

Next, throughput scalability can be discussed. FIG. 27 shows a plot illustrating transactions per second vs. committee size according to an embodiment of the invention. The number of transactions processed per second by methods according to embodiments of the invention can be measured to evaluate the impact of sharding as the network size is increased from 500 nodes to 4,000 nodes for variable committee sizes such that the failure probability of each epoch remains smaller than $2*10^{-6}$ (i.e., time-to-failure of more than 1,300 years). For a network size of 4,000, a committee size of 250 can be considered, which results in an epoch failure probability of less than $6*10^{-7}$ (i.e., time-to-failure of more than 4,586 years). As shown in FIG. 27, doubling the network size increases the capacity of embodiments of the invention by 1.5-1.7 times. Unfortunately, none of the previous sharding-based protocols report throughput scalability with network size, an important measure of how well the system can scale up its processing capacity with its main resource, the number of participants.

Next, the block size can be discussed. FIG. 28 shows a plot illustrating transactions per second vs. block size according to an embodiment of the invention. FIG. 28 includes throughput 2802 and latency 2804 of the computer network at block sizes ranging from 128 KB to 8192 KB. The throughput and latency of methods according to embodiments of the invention can be measured with various block sizes between 512 KB and 8,192 KB for a computer network comprising 4,000 nodes. As shown in FIG. 28, larger block sizes generally result in higher throughput, but also result in higher confirmation latency. To obtain a latency of less than 10 seconds, common in most mainstream payment systems, while obtaining the highest possible throughput, embodiments of the invention can use a block size of 2,048 KB, which results in a throughput of more than 7,000 tx/sec and a latency of roughly 8.7 seconds.

CONCLUSION

A new highly scalable consensus protocol can offer open membership and a distributed public ledger. Transaction latency can be improved through the use of a distributed ledger design that partitions the blockchain across several sharding committees. Embodiments of the invention may use an efficient setup protocol to establish honest sharding committees, additionally optimized with new analysis. Methods according to embodiments of the invention can handle churn and introduce minimum changes across committee membership without affecting transaction latency. Embodiments of the invention also feature several improved protocols for atomic broadcast and network routing. Finally, an empirical evaluation demonstrates that methods according to embodiments of the invention can scale smoothly to network sizes of 5,000 nodes and can show better performance than existing systems such as Bitcoin and Elastico.

Embodiments of the invention have a number of advantages. For example, embodiments allow for a blockchain to be sharded among a number of node committees. Each node committee can store a different partition of the blockchain, thus greatly reducing the amount of data stored on each node compared to previous systems and methods.

Additionally, a committee can verify a block comprising interactions and store the block in the committee's partition of the blockchain. The committee does not need to broadcast the block to every node in the computer network and then have every node in the computer network verify the block, as in previous systems and methods. Thus, embodiments of the invention can determine if a block is valid in less communications than previous systems and methods.

Furthermore, embodiments of the invention handle a higher throughput than previous systems such as Elastico and OmniLedger. Embodiments, of the invention also provide for smaller latency, smaller storage at each node, and longer time to fail all while having a larger network size than previous methods (see Table 2 above).

Embodiments of the invention provide for additional advantages. For example, embodiments of the invention allow for new nodes to join the computer network without reconfiguring every node in the computer network as in previous systems and methods. As such, embodiments of the invention provide for a way to reconfigure a few nodes in a few committees while preventing malicious takeovers, such as a Sybil attack.

FURTHER DETAILS

Atomic Broadcast

In this section, the process of sparsification, described herein, can be discussed. Sparsification may not change the correctness and security of the atomic broadcast protocol. n may be the number of blocks or leaf nodes in a Merkle tree and t may be the fraction of dishonest nodes. The reconstruction stage may fail if there can be a node in the tree for which the hash at that node is distributed to only corrupted parties. A tree node can be sparsified if the hash $T(M_i, M_j)$ at the node is not sent along with all of the leaves that require that hash for verification of the block. All nodes up to some level i, can be sparsified. s, which can be the size of the subset of parties that can be sent to each sparsified node to allow, can be calculated with probability at least $2^{-c}$, that the node can be sent to at least one honest party. Let l(x) count the number of leaf nodes in the sub-tree rooted at node x, and u(x) count the number of corrupted nodes in the sub-tree rooted at node x.

There may be two ways to distribute the intermediate nodes to parties. The first method, which may have a simpler analysis, can be to choose s parties at random from the entire set of parties to which to send each leaf node. The second method can be that the parties which send each intermediate node can be a subset of the parties that would have sent the node in the normal atomic broadcast protocol.

First, the case where an intermediate node can be distributed to any party can be discussed. If a node can be distributed to s parties at random, the probability that only corrupted parties receive the node can be at most $t^s$. Therefore, taking the union bound over all $2^{i+1}-1$ nodes sent, $$(2^{i+1}-1)t^s < 2^{i+1}t^s \le 2^{-c}$$

$$(i+1)\ln 2 + s\ln t \le -c\ln 2$$

$$s \ge \frac{(c+i+1)\ln 2}{\ln t}$$

Consider the case wherein an intermediate node can be distributed to parties that could possibly have received it in a normal broadcast. A given node can be sparsified if its subtree has more than s leaves. Subtrees rooted at level i can have at least $2^{\lfloor log_2 n \rfloor}-i$ leaves, therefore $s<2^{\lfloor log_2 n \rfloor}-i$. For a node x, with l(x)>s, the assignment of parties to leaves in the subtree can be treated as sampling without replacement from all of the possible parties. For any single randomly selected party, the probability that that party is corrupted can be at most t. Therefore, by Hoeffding's inequality, for $\delta \ge 0$, $$Pr[u(x)/l(x) \ge \delta + t] = Pr[u(x)/l(x) - t \ge \delta] < e^{-2s\delta^2}$$

Next, the number of corrupted nodes in subtrees can be bound at level i. Specifically, let j<i, x and y be sibling nodes on level j+1, and z be their parent on level j. The leaves of z can be the union of the leaves of x and leaves of y. Let $u(x)/l(x)<\alpha$, and $u(y)/l(y)<\alpha$. Then $(u(x)+u(y))/(l(x)+l(y)) \le \alpha$. If the proportion of corrupted nodes of all subtrees rooted at level i are bound, then the bound can hold inductively for all subtrees rooted at levels i−1, . . . , 1. There are $2^i$ subtrees rooted at level i, therefore $$Pr\left[\bigcup_{xissparsified} l(x)/u(x) > \delta + t\right] < 2^i e^{-2s\delta^2}$$

The other source of failure can be if all of the s nodes sampled from a single subtree are all corrupted nodes. Given that the proportion of corrupted nodes in any subtree can be at most t+δ, taking the union bound over all $2^{i+1}$−sparsified nodes can give us the probability for any node, the probability that all parties sampled for that node are corrupted as at most $(2^{i+1}-1)(\delta+t)^s$.

Therefore, taking the union bound over the two sources of failure, the probability that the broadcast fails with an honest sender can be at most $2^i e^{-2s\delta^2}+(2^{i+1}-1)(\delta+t)^s<2^i(e^{-2s\delta^2}+2(\delta+t)^s)$.

First, δ can be chosen as a function of t to minimize the above expression. $2^i$ can be independent of δ and t. Minimizing an expression may be equivalent to minimizing its logarithm. Therefore, it may be equivalent to minimize $-2s\delta^2+s\ln(2(\delta+t))$. Factoring out s, $-2\delta^2+\ln(2(\delta+t))$ can be minimized. Since t can be a fixed parameter, takin the derivative with respect to 6 and setting it to zero can result in $$-4\delta + \frac{1}{\delta+t} = 0,$$

and thus $-4\delta^2-4f\delta+1=0$ which can have solutions at $$\delta = \frac{1}{2}\left(-t \pm \sqrt{t^2+1}\right).$$

In some embodiments, δ<0 may be removed. This can be checked to determine if it is a minimum, since $$\frac{d^2}{d\delta^2} - 2\delta^2 + \ln(2(\delta+t)) = -4 - \frac{1}{(\delta+t)^2} < 0.$$

Going back to the overall expression, and solving for the value of s:

$$2^i\left(e^{-2s\delta^2} + 2(\delta+t)^s\right) \le 2^{-c}$$

$$-2s\delta^2 + \ln 2 + s\ln(\delta+t) \le (-c-i)\ln 2$$

$$s\left(2\delta^2 - \ln(\delta+t)\right) \ge (c+i+1)\ln 2$$

$$s \ge \frac{(c+i+1)\ln 2}{2\delta^2 - \ln(\delta+t)}$$

Given t, i, and c, a solution for the value of s can be determined. This scenario may include a larger value of s than if any party could receive an intermediate node. An advantage of confining intermediate nodes to be sent by parties that could possibly have sent them is that there can be less computation and a smaller memory cost. When any party can send any intermediate node, the corrupted parties can fabricate hashes for any node that can be sparsified. Though the hashes may not end up in the final Merkle tree, the reconstructor can still consider them. If i is the maximum layer sparsified, the memory usage can be $\mathcal{O}(n2^i)=\mathcal{O}(n^2)$, and the computation cost for reconstruction can be $\mathcal{O}(n^2 2^i)=\mathcal{O}(n^3)$. If parties are restricted in the intermediate nodes they can send, each party can send at most $\mathcal{O}(\log n)$ hashes that can be considered. The memory usage can be $\mathcal{O}(ni)=\mathcal{O}(n\log n)$, because every party can send one candidate for each layer. The computation cost can be $$\sum_{j=1}^{i} 2^{j-1}\left(\frac{n}{2^j}\right)^2$$

summing over the rows, and taking into account the number of intermediate nodes, in each row along with the number of possible candidates can be reconstructed. This can simplify to $$\sum_{j=1}^{i} \frac{1}{2}\frac{n^2}{2^j} = \frac{n^2}{2}\sum_{j=1}^{i}\frac{1}{2^j} = O(n^2)$$

Thus far, this may not yet be an optimal value for i in order to minimize communication. The solution to optimize i may not have a closed form, as it can be $$s(2^{(i+1)}-1) + (\log_2 n - i)n$$

which can be the total number of hashes that can be sent by the sender. The derivative of the previous expression with respect to i may be $$\frac{ds}{di}(2^{i+1}-1)+s(2^{i+1}\ln 2)-n$$

Since s may be a linear function of i, given either strategy of distributing intermediate hashes, ds/di can be constant. However, the previous expression also tells us that the sparsification may not provide better asymptotic bounds. If n is multiplied by 2 (thereby increasing the depth of the tree by one), i can be increased by less than 1 for the above expression to remain 0 because $s2^{i+1}=\Theta(i2^i)$. Therefore, the optimal number of sparsified layers can be sublinear in the depth of the tree. Therefore, the number of hashes sent for every level in the Merkle tree can be equal. Since the number of sparsified layers can be sublinear in the depth of the tree, the communication cost can be asymptotically dominated by the hashes in the unsparsified levels of the tree closer to the leaves.

Bounded Cuckoo Rule

In this section, the adjust protocol according to embodiments of the invention that may maintain the balancing and honesty properties of the committees in the computer network can be discussed.

This section may describe a modification of a proof associated with the Cuckoo rule and therefore may use similar assumptions and terminology. The parties may join and leave one by one in each round. At any time during the protocol, the fraction of dishonest parties to honest parties can be equal to c. The protocol may start from a stable state with n parties partitioned into m committees which can satisfy the balancing and honesty conditions.

The system may first map each party to a point in [0,1) randomly using a hash function, to map the parties to committees. Then, the range [0,1) can be partitioned into k-regions of size k/n and a committee can be the group of parties that can be assigned to clog n k-regions for constants c and k. A party can be called new while it is in the committee where it was assigned when the new party joined the computer network. At any time after that, the party can be referred to as an old party, even if the party changes committees. The age of a k-region can be the amount of time that has passed after a new party has been placed in that k-region. The age of a committee can be the sum of the ages of its k-regions. Moreover, recall that the set of active committees can be the m/2 committees with highest number of nodes in them.

For any fixed active committee C and at any time, the age of any active committee C can be within $$(1\pm\delta)\frac{nc\log n}{2k}$$

with high probability.

$y_i$ can be the age of k-region called $R_i$ and $$Y=\sum_{i=1}^{i=clogn} y_i$$

$y_i$ can be the age of C. In some embodiments, at any point during the protocol, half the committees can be active, so the region for the new party may be determined from half of the k regions. Thus, $$Pr[y_i=t]=\frac{2k}{n}\left(1-\frac{2k}{n}\right)^{t-1}$$

can be geometrically distributed with probability $$\frac{2k}{n}.$$

Thus, $$E[y_i]=\frac{n}{2k}$$

and $$E[Y]=\frac{nc}{2k}c\log n.$$

Y can be concentrated around E[Y] meaning that Y may be between $(1\pm\delta)E[Y]$.

Next, the maximum age for k-regions in an active committee can be discussed. Any k-region in active committees can have an age at most $\lambda(n/2k)\log n$. The probability that a k-region $R_i$ can be evicted at any round may be 2k/n, since at a given round there may be m/2 active committees. As a result, half of the k-regions can accept a new join (i.e., a new node). If the committee does not become an inactive committee during this time, the probability can be independent of other rounds. Note that this condition can consider the worst case scenario, since otherwise the committee can become inactive during this time. Hence, the probability that $R_i$ has age at least $\lambda(n/2k)\log n$ may be $(1-2k/n)^{\lambda(n/k)\log n}\leq e^{-2k/n\lambda(n/2k)\log n}=n^{-\lambda}$.

In some embodiments, any fixed party v in an active committee can be displaced at most $(1+\delta)\lambda$ log n times within $\lambda(n/2k)\log n$ rounds. The party can be placed in an active committee with probability %. Half of the committees may be considered active committees after one new party joins the committee. This condition may be the worst case scenario in which half of the inactive committees may have a number of parties close to being active in the next round. For example, an inactive committee may have a number of parties close to being active in the next round if an active committee comprises 50 nodes and the inactive committee comprises 49 nodes. An indicator random variable can be $z_t=1$ if the party p can be replaced in t, otherwise the indicator random variable can be 0.

$$Pr[z_t=1]=1/2\frac{2k}{n}$$

since at any time the computer network can randomly choose a region to evict from all active regions. Let $$Z = \sum_{t=0}^{t=\lambda(n/2k)\log n} z_t,$$

wherein $$E[Z] = \lambda(n/2k)\log n\left(\frac{k}{n}\right) = 1/2\lambda\log n.$$

Using Chernoff bound, Z<(1+δ)E[Z] with high probability.

t may be the maximum number of dishonest parties at any point in the system. At any time, a fixed committee may have within (1−t/n)(1±δ)clog nk/2 old honest parties and $$\frac{t}{n-t}(1 \pm \delta)c\log nk/2$$

old dishonest parties with high probability. In some embodiments, at any suitable time during the protocols described herein, all committees can satisfy the balancing and honesty conditions. Next, the balancing and honest properties for one committee can be discussed, however the balancing and honest properties may apply to any number of committees.

The number of new parties in each committee may be at most clog n. The number of old parties is shown above. In some embodiments, the maximum number of parties in each committee can be $$c\log n + c/2(1+\delta)\left(3 - \frac{t}{n} + \frac{t}{n-t}k\right)\log n$$

and the minimum load can be c/2(1−δ)log n.

For honest committees, k may be determined such that $$\frac{t}{n-t} < 1 - 1/k,$$

any committee may have (1−t/n)(1−δ)clognk/2 honest and $$\frac{t}{n-t}(1+\delta)c\log nk/2$$

dishonest parties with high probability. Note that these values may be for the worst case scenario, wherein the adversary may target a committee of size (clog n)k/n.

Expanders

In this section, an analysis for the parameters in the setup protocol, described herein, can be discussed. Consider two fixed subsets of nodes T s L and S⊆R. Every node in L may represent one of the n parties and every node in R may represent a committee which may be selected based on the edges incident to the node from L. Also, T may represent a largest coalition of faulty parties and S may represent a subset of committees. Let ε(T, S) denote an event wherein every node in S can have more than a $$\frac{|T|}{|L|} + \delta$$

fraction of its edges incident to nodes in T.

N may denote the number of edges between T and S. The number of edges incident to S can be equal to $d_R$|S|. By linearity of expectation, $$[N] = \frac{|T|}{|L|}d_R|S|.$$

In some embodiments, the edges to S can be added one-by-one. $\{X_i\}$ can denote a sequence of random variables such that $X_i$=1 if the i-th edge can be incident to T. The sequence $\{Z_i=[N|X_0, \ldots, X_i]\}$ may defines a Doob martingale, wherein $Z_0$=[N]. If any of the trials is altered, N may changes by at most one. For some positive δ, the failure event ε may happen when:

$$N > \left(\frac{|T|}{|L|} + \delta\right)d_R|S| = [N] + \delta d_R|S|.$$

By Azuma's inequality, $$Pr(\mathcal{E}(T, S)) = Pr(N - [N] > \delta d_R|S|) \le 2e^{-\delta^2 d_R|S|/2}$$

By union bound over possible subsets T and S, $$Pr(U_{T\subseteq L, S\subseteq R}) \le 2^{|L|}2^{|R|}2e^{-\delta^2 d_R|S|/2} \le 2e^{|L|+|R|-\delta^2 d_R|S|/2} \quad (3)$$

$p_i$ may be bound by $$d_{R_i} = \lceil L_i^{\alpha} \rceil \text{ and } |S_i| = \lceil R_i/3 \rceil,$$

and substituting Equation 1 in Equation 2. For example, for n=5000, $\alpha_1$=0.912, $\beta_1$=0.766, $\gamma_1$=0.1, and δ=⅙ may result in $p_1 \le 2^{-90}$. This choice of parameters can result in a sampler graph at the first level of an election graph with l levels and $R_1$=2363, $d_{R_1}$=681, and $|S_1|$=788. Note that $d_{R_1}$ may also denotes a size of committees in the first level of the election network.

In a sampler graph with a random assignment of honest parties and adversarial assignment of dishonest parties, the probability that the committees in any subset of size |R'| being corrupted can be less than $\beta 2^{|L|}2^{|R|}(e^{-\mu_b}(e\mu_b/X)^x + e^{-\mu_g}(e\mu_g/(2\times))^{2X})^{|R'|}$.

In some embodiments, the sampler graph selection process can be seen as a classic balls-and-bins process: $|L|d_L$ balls (parties) can be thrown independently and uniformly at random into |R| bins (committees). Without loss of generality, first throw all dishonest parties (bad balls) then all the honest parties (good balls).

For a fixed committee C, $X_g$ may be a random variable that can represent a maximum number of dishonest parties assigned to C. $X_b$ may be a random variable that can represent a minimum number of honest parties assigned to C. $\mu_g$ and $\mu_b$ may be an expected number of honest and dishonest parties per committee respectively.

The distribution of the number of (good/bad) balls in a bin can be approximately Poisson with a mean $\mu_b=d_L|L|/4$ and $\mu_g=3d_L|L|/4$. $\tilde{X}$ may be a Poisson random variable approximating X, i.e., μ=[X]=[X̃]. The following can be Chernoff bounds for Poisson random variables:

$$Pr(\tilde{X} \geq x) \leq e^{-\mu}(e\mu/x)^x, \text{ when } x > \mu \tag{4}$$

$$Pr(\tilde{X} \leq x) \leq e^{-\mu}(e\mu/x)^x, \text{ when } x < \mu \tag{5}$$

x can be a threshold. A committee may be determined to be good if $X_g>2x$ and $X_b<x$. In some embodiments, a good committee may have twice the honest parties than a bad committee. This definition may be an underestimation and may not count some of the good committees. Based on this definition, a committee can be determined to be bad if $X_g<2x$ or $X_b\geq x$.

The probability that a fixed committee may be determined to be bad may be:

$$e^{-\mu_b}(e\mu_b/x)^x + e^{-\mu_g}(e\mu_g/(2x))^{2x} \tag{6}$$

In some embodiments, a group of committees may be of size |R'|, the probability that all of committees of the group of committees can be determined to be bad may be, $(e^{-\mu_b}(e\mu_b/x)^x+e^{-\mu_g}(e\mu_g/(2x))^{2x})^{|R'|}$.

In some embodiments, the adversary can choose bad parties and bad committees. In this case, to find the probability that all the committees in any subset of size |R'| being corrupted may be performed by a union bound over all the possible adversarial choices:

$$Pr(U_{T\subseteq L,S\subseteq R}) \leq 2^{|L|}2^{|R|}\left(e^{-\mu_b}(e\mu_b/x)^x + e^{-\mu_g}(e\mu_g/(2x))^{2x}\right)^{|R'|} \tag{7}$$

In other embodiments, the adversary may not have the same probability of success for all actions. Thus, strategies that may be worse than another strategy can be considered and, in some embodiments, can remove them from the union bound since it may not be beneficial for the adversary to choose such strategies. In some embodiments, the following processes may occur: 1) the good parties may be assigned randomly to committees; 2) the adversary may assign α fraction of bad parties to the committees such that the assignment can corrupt a maximum number of committees; and 3) the adversary may assign the remaining 1−α bad parties such that each party can be assigned to at least one good committee. Another strategy that does not follow the previous process may be that the adversary can assign a bad party to all bad committees at step (3) may be a poor choice for the adversary since assigning bad nodes to a committees that may already be bad cannot increase the chance of adversary to corrupt a new committee.

The probability that a set of size |R'| has only bad committees in it after throwing all good parties and a fraction of the bad parties may be, $$\left(e^{-\mu_{\alpha b}}(e\mu_{\alpha b}/x)^x + e^{-\mu_g}(e\mu_g/(2x))^{2x}\right)^{|R'|} \tag{8}$$

The fraction of strategies that the adversary can ignore, due to the step three rule described above:

$$\beta = \frac{|R'|!(|R'| - \log n)!}{|R|!(|R| - \log n)} \tag{9}$$

Thus, in some embodiments, in a union bound, this fraction may be removed, $$Pr(U_{T\subseteq L,S\subseteq R}) \leq \beta 2^{|L|}2^{|R|}\left(e^{-\mu_b}(e\mu_b/x)^x + e^{-\mu_g}(e\mu_g/(2x))^{2x}\right)^{|R'|} \tag{10}$$

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a first node in a first committee of nodes in a computer network, a request including a node identifier to join a committee by a second node, the first committee managing a first shard of a main blockchain;

providing, by the first node of the first committee to the second node, a proof of work process, the proof of work process being a function for which the second node provides an input to produce a solution;

receiving, by first node of the first committee, the solution to the proof of work process from the second node, wherein the second node performs the proof of work process to produce the solution, wherein a plurality of nodes in the first committee verifies the solution;

generating, by the first node of the first committee, a random string;

determining, by the first node, a second committee of nodes for the second node using the random string, the second committee managing a second shard of the main blockchain;

introducing, by the first node to the second committee determined using the random string, the second node, wherein the second committee displaces a node to allow the second node to join the second committee; and communicating, by the first node, information regarding the second node being in the second committee to other nodes in the computer network by broadcasting an IP address and a second committee identifier of the second node to the other nodes in the computer network, wherein the nodes in the first committee have addresses including their IP addresses and a first committee identifier that identifies the first committee of nodes, and the nodes in the second committee have addresses including their IP addresses and the second committee identifier that identifies the second committee of nodes, the first committee identifier and the second committee identifier being different, wherein the first committee of nodes is a leader committee and the nodes in the second committee of nodes are determined by hashing a random value generated by the first committee of nodes and the IP addresses of the nodes in the second committee to form a hashed value, and using a predetermined number of bits of the hashed value, and wherein the nodes in the second committee of nodes broadcast their IP addresses and the second committee identifier to the nodes in the first committee of nodes.

2. The method of claim 1, wherein the second committee displaces a random number of nodes of the second committee based on the random value generated by the leader committee.

3. The method of claim 2, wherein displaced nodes are assigned to random inactive committees.

4. The method of claim 1, wherein the first node is a leader node of the first committee.

5. The method of claim 1, wherein the plurality of nodes in the first committee verify the solution when the solution solves the proof of work process, is less than a predetermined security value, and is received within a predetermined amount of time.

6. The method of claim 5, wherein the first node is a leader node of the first committee.

7. The method of claim 1, wherein at least two thirds of nodes in each committee in the computer network are non-malicious nodes.

8. A first node comprising:

a processor;

a memory device; and a computer-readable medium coupled to the processor, the computer-readable medium comprising code executable by the processor for implementing a method comprising:

receiving, by the first node in a first committee of nodes in a computer network, a request including a node identifier to join a committee by a second node, the first committee managing a first shard of a main blockchain;

providing, by the first node of the first committee to the second node, a proof of work process, the proof of work process being a function for which the second node provides an input to produce a solution;

receiving, by first node of the first committee, the solution to the proof of work process from the second node, wherein the second node performs the proof of work process to produce the solution, wherein a plurality of nodes in the first committee verifies the solution;

generating, by the first node of the first committee, a random string;

determining, by the first node, a second committee of nodes for the second node using the random string, the second committee managing a second shard of the main blockchain;

introducing, by the first node to the second committee determined using the random string, the second node, wherein the second committee displaces a node to allow the second node to join the second committee; and communicating, by the first node, information regarding the second node being in the second committee to other nodes in the computer network by broadcasting an IP address and a second committee identifier of the second node to the other nodes in the computer network, wherein the nodes in the first committee have addresses including their IP addresses and a first committee identifier that identifies the first committee of nodes, and the nodes in the second committee have addresses including their IP addresses and the second committee identifier that identifies the second committee of nodes, the first committee identifier and the second committee identifier being different, wherein in the method, the first committee of nodes is a leader committee and the nodes in the second committee of nodes are determined by hashing a random value generated by the first committee of nodes and the IP addresses of the nodes in the second committee to form a hashed value, and using a predetermined number of bits of the hashed value, and wherein the nodes in the second committee of nodes broadcast their IP addresses and the second committee identifier to the nodes in the first committee of nodes.

9. The first node of claim 8, wherein in the method, the second committee displaces a random number of nodes of the second committee based on a random value generated by the leader committee.

10. The first node of claim 9, wherein in the method, displaced nodes are assigned to random inactive committees.

11. The first node of claim 8, wherein the first node is a leader node of the first committee.

12. The first node of claim 8, wherein in the method the plurality of nodes in the first committee verify the solution when the solution solves the proof of work process, is less than a predetermined security value, and is received within a predetermined amount of time.

13. The first node of claim 12, wherein the first node is a leader node of the first committee.

14. The first node of claim 8, wherein at least two thirds of nodes in each committee in the computer network are non-malicious nodes.

* * * * *